(12) United States Patent
Sem-Jacobsen et al.

(10) Patent No.: US 9,379,971 B2
(45) Date of Patent: Jun. 28, 2016

(54) METHOD AND APPARATUS FOR DETERMINING PATHS BETWEEN SOURCE/DESTINATION PAIRS

(71) Applicant: Simula Innovation AS, Lysaker (NO)

(72) Inventors: Frank O. Sem-Jacobsen, Minnesund (NO); Olav Lysne, Bekkestua (NO); Hung Quoc Vo, Oslo (NO); Amund Kvalbein, As (NO)

(73) Assignee: Simula Inovation AS, Lysaker (NO)

( * ) Notice: Subject to any disclaimer, the term of this patent is extended or adjusted under 35 U.S.C. 154(b) by 368 days.

(21) Appl. No.: 13/630,826

(22) Filed: Sep. 28, 2012

(65) Prior Publication Data

US 2013/0308444 A1  Nov. 21, 2013

Related U.S. Application Data

(60) Provisional application No. 61/645,937, filed on May 11, 2012.

(51) Int. Cl.
*H04L 12/721* (2013.01)
*H04L 12/931* (2013.01)
*H04L 12/751* (2013.01)
*H04L 12/705* (2013.01)
*H04L 12/703* (2013.01)
*H04L 12/803* (2013.01)

(52) U.S. Cl.
CPC .............. *H04L 45/34* (2013.01); *H04L 45/02* (2013.01); *H04L 47/125* (2013.01); *H04L 49/358* (2013.01); *H04L 45/12* (2013.01); *H04L 45/18* (2013.01); *H04L 45/28* (2013.01)

(58) Field of Classification Search
USPC ......... 370/218, 229, 235, 237, 238, 241, 248, 370/252, 254, 255, 392, 465; 709/224, 238
See application file for complete search history.

(56) References Cited

U.S. PATENT DOCUMENTS

| | | | | |
|---|---|---|---|---|
| 5,812,549 | A * | 9/1998 | Sethu | 370/389 |
| 6,874,032 | B2 * | 3/2005 | Gersht et al. | 709/235 |
| 7,724,674 | B2 * | 5/2010 | Lysne | 370/238 |
| 2002/0067693 | A1 * | 6/2002 | Kodialam et al. | 370/216 |
| 2002/0067720 | A1 * | 6/2002 | Garcia-Luna-Aceves et al. | 370/389 |
| 2002/0101869 | A1 * | 8/2002 | Garcia-Luna-Aceves et al. | 370/389 |
| 2002/0141346 | A1 * | 10/2002 | Garcia-Luna-Aceves et al. | 370/238 |
| 2004/0193729 | A1 * | 9/2004 | Saraph | 709/241 |
| 2005/0111465 | A1 * | 5/2005 | Stewart | 370/400 |

(Continued)

OTHER PUBLICATIONS

Vo et al., Permutation Routing for Increased Robustness in IP Networks, May 21-25, 2012, Springer, Networking 2012: 11th International IFIP TC 6 Networking Conference, Prague, Czech Republic, Proceedings, Part I, pp. 217-231.*
Glass et al., The Turn Model for Adaptive Routing, Computer Architecture, 1992, IEEE, Proceedings., The 19th Annual International Symposium on, pp. 278-287.*

(Continued)

*Primary Examiner* — Benjamin H Elliott, IV
*Assistant Examiner* — Eric Nowlin
(74) *Attorney, Agent, or Firm* — Oblon, McClelland, Maier & Neustadt, L.L.P.

(57) ABSTRACT

Described herein are a method and device for determining paths in a network topology. The method and device provide a source/destination pair representing a source and a destination in the network topology, provide a channel list comprising a topological ordering of channel identifiers representing communication channels in the network topology, and provide at least one path connecting the source and the destination based on the channel list.

44 Claims, 33 Drawing Sheets

(56) References Cited

U.S. PATENT DOCUMENTS

| | | | |
|---|---|---|---|
| 2007/0053342 A1* | 3/2007 | Sierecki | H04L 45/10 370/351 |
| 2007/0070883 A1* | 3/2007 | Lysne et al. | 370/218 |
| 2007/0253403 A1* | 11/2007 | Kodialam | H04L 45/00 370/351 |
| 2008/0049609 A1* | 2/2008 | Chao et al. | 370/218 |
| 2008/0232347 A1* | 9/2008 | Chao et al. | 370/351 |
| 2010/0182934 A1* | 7/2010 | Dobbins et al. | 370/254 |
| 2012/0044837 A1* | 2/2012 | Ibanez Fernandez et al. | 370/256 |
| 2012/0140631 A1* | 6/2012 | Klausler | 370/235 |
| 2012/0170582 A1* | 7/2012 | Abts et al. | 370/392 |

OTHER PUBLICATIONS

Dally et al.; Deadlock-Free Adaptive Routing in Multicomputer Networks Using Virtual Channels, Apr. 1993, IEEE, IEEE Transactions on Parallel and Distributed Systems, vol. 4, No. 4, pp. 466-475.*

Starobinki et al., Application of Network Calculus to General Topologies Using Turn-Prohibition, Jun. 2003, IEEE, IEEE/ACM Transactions on Networking, vol. 11, No. 3, pp. 411-421.*

Skeie et al., LASH-TOR: A Generic Transition-Oriented Routing Algorithm, Proceedings. Tenth International Conference on Parallel and Distributed Systems, 2004. ICPADS 2004, IEEE, pp. 595-604, Jul. 7-9, 2004.*

Extended European Search Report issued Sep. 17, 2013 in European Patent Application No. 12189314.3.

William J. Dally, et al., "Deadlock-Free Adaptive Routing in Multicomputer Networks Using Virtual Channels", IEEE Transactions on Parallel and Distributed Systems, vol. 4, No. 4, XP 000381816, Apr. 1, 1993, pp. 466-475.

William J. Dally, et al. "Deadlock-Free Message Routing in Multi-processor Interconnection Networks", IEEE Transactions on Computers, vol. C-36, No. 5, May 1987, 7 pgs.

Olav Lysne, et al. "A Methodology for Deriving Deadlock-Free Dynamic Network Reconfiguration Processes", 30 pgs.

* cited by examiner

| Node | Incoming interface | Next-hop | Primary |
|---|---|---|---|
| 2 | 4 → 2 | 1 | Yes |
| | | 3 | No |
| | 3 → 2 | 1 | Yes |

| Node | Incoming interface | Next-hop | Primary |
|---|---|---|---|
| 3 | 5 → 3 | 1 | Yes |
| | | 2 | No |
| | 2 → 3 | 1 | Yes |
| | | 2 | No |

METHOD AND APPARATUS FOR DETERMINING PATHS BETWEEN SOURCE/DESTINATION PAIRS

CROSS-REFERENCE TO RELATED APPLICATIONS

This application is based upon and claims the benefit of priority under 35 U.S.C. §119(e) from U.S. Ser. No. 61/645,937, filed May 11, 2012, the entire contents of which are incorporated herein by reference.

FIELD OF THE EMBODIMENTS OF THE INVENTION

The present embodiments of the invention relates to a method and apparatus for determining paths between source/destination pairs.

DISCUSSION OF THE BACKGROUND

Intelligent routing has been applied to various fields in recent years. For example, such routing has been implemented for large area networks such as the Internet and to small area networks such as (on-chip) networks for supercomputers.

In the field of large area networks, the last few years have witnessed the adoption of the Internet as the preferred transport medium for services of critical importance for business and individuals. In particular, an increasing number of time-critical services such as trading systems, remote monitoring and control systems, telephony and video conferencing place strong demands on timely recovery from failures. For these applications, even short outages in the order of a few seconds will cause severe problems or impede the user experience. This has fostered the development of a number of proposals for more robust routing protocols, which are able to continue packet forwarding immediately after a component failure, without the need for a protocol re-convergence. Such solutions add robustness either by changing the routing protocol so that the routing protocol installs more than one next-hop towards a destination in the forwarding table, or by adding backup next-hops a posteriori to the forwarding entries found by a standard shortest path routing protocol. Unfortunately, few of these solutions have seen widespread deployment, due to added complexity or incompatibility with existing routing protocols.

In the field of small area networks, high-performance and cluster computing systems have become more common. These systems rely heavily on the efficiency of the interconnection network. In latter years, the sizes of such systems have become so big that the network also needs to be able to function in the presence of faulty components. This has led to the study and implementation of various methods for routing around faults that appear while the system is running.

Such fault tolerant routing consists of two elements. The first is a method for finding a routing function that is efficient for semi-regular topologies, i.e. topologies such as meshes, tori, and fat-trees where some components have been removed due to malfunctions. Ideally this method should be fast—so that the system can commence normal operation as soon as possible after the fault. Furthermore, it should be efficient, so that the degradation of performance in the presence of the fault is minimal. Finally, it should not require more virtual channels for deadlock freedom than the routing algorithm needs for the fault free case. The second element of fault tolerant routing is a method for transitioning between the old and the new routing function without causing deadlock. It is well known that even if the old and the new routing functions are deadlock free by themselves, an uncontrolled transition between the two can cause deadlocks.

Unfortunately, there is a huge gap between the ideal described above and the current state of the art. Computing a new routing function when a fault has occurred is not at all fast. For systems such as Ranger, Atlas, and JuRoPa that are based on InfiniBand and use the OFED OpenSM subnet manager, the execution time for the routing algorithms (minhop, Up*/Down*) is in the range of hundreds of seconds to 15 min. Furthermore, the routing functions that come out of the recalculation are based on Topology Agnostic methods, that disregard the carefully planned routing strategies, which have been made for the fault free case. For this reason, they either require additional virtual channels, or they lead to a severe drop in performance, or both. Regarding reconfiguration between the old and the new routing function, the picture is equally bleak. Even though several mechanisms for deadlock free dynamic reconfiguration have been proposed, none of them are implemented in current hardware. Runtime reconfiguration in Infiniband simply updates the forwarding tables in the switches in the network with the values calculated by the routing function and makes no provisions for guaranteeing a deadlock free transition. A common solution to this problem is to use static reconfiguration. This requires the entire fabric to be drained of all traffic and shut down before the reconfiguration commences. A far more efficient solution is to change the routing tables in the network on-the-fly. This requires careful handling by the routing algorithm of the transient dependencies that occur when the routing tables are updated.

SUMMARY OF THE INVENTION

With regard to the field of large area networks, the present embodiments presents an intelligent routing method designated as Permutation Routing as novel and flexible approach for calculating multiple loop-free next-hops in networks with traditional hop-by-hop forwarding.

Permutation Routing is based on the observation that routing in any network consists of using a set of resources (links and nodes) in sequence. A routing strategy can therefore be expressed as a permutation of the nodes that are involved in traffic forwarding to a destination. Routing will be loop-free as long as traffic can only be forwarded in one direction with respect to the node ordering in this permutation. One important goal is to use Permutation Routing to create a routing that maximizes single link fault coverage.

Permutation Routing can be used to create various routing strategies. For instance, Permutation Routing can provide a simple backtracking algorithm that constructs a permutation of routers for each destination, and a simple forwarding rule that enables generation of forwarding tables based on the permutations. The properties of the resulting routing are determined by the constraints that are used at each step in the permutation construction. The input to the construction algorithm is the topology information that is collected by a standard link state routing protocol, and hence no new control plane signaling is needed with Permutation Routing.

Remarkably, permutation routing can easily be integrated with existing intradomain routing protocols, and can be used to augment the shortest path routing tables with additional forwarding entries. The constraints in the permutation construction can be designed so that the resulting routing is compatible with normal shortest path routing, while still offering significantly more forwarding options than the existing LFA. With multiple loop-free alternates for a given primary next-hop, OSPF or IS-IS may employ some of them as unequal-cost primary paths and the rest as back-up paths. In the case of multiple primary paths, packets can be distributed evenly among paths or with more intelligent load balancing methods.

With regard to the field of small area networks, the present embodiments present a novel mechanism for intelligent routing. The mechanism is in essence topology agnostic, and it is designed with a plug-in architecture to enable topology specific additions that increase the fault tolerance for the specific topology. For meshes, tori, and fat-trees it is able to guarantee toleration of one link fault, and it has a good probability distribution for the toleration of multiple faults. The mechanism is able to quickly react and reconfigure the network after a topology change. Another characteristic of the mechanism is that it only changes the paths for the flows that are directly disconnected by the change. Finally, the mechanism does not require any additional virtual channels, and the new paths for the disconnected flows are compatible with the existing paths in the network in such a way that deadlock free dynamic reconfiguration is guaranteed. The reconfiguration mechanism is compatible with existing technology such as Infini-Band as it requires no specific functionality in the network elements. The algorithm is completely contained in the node responsible for configuring the network, and it can therefore easily be implemented and be put into production.

Accordingly, the present invention provides, inter alia, in an embodiment, a method of determining paths in a network topology. The method includes a step of providing a source/destination pair representing a source and a destination in the network topology, providing a channel list comprising a topological ordering of channel identifiers representing communication channels in the network topology, and providing at least one path connecting the source and the destination based on the channel list.

In an embodiment of the method the step of providing a channel list further includes the steps of selecting from the topology a first path connecting the source and destination, identifying channel identifiers for channels along the first path, determining dependencies between the channel identifiers based on a deadlock-free routing algorithm, and constructing the channel list by topologically ordering the channel identifiers according to the dependencies.

In an embodiment of the method, any dependency from one channel to another in the channel list only points to a channel identifier with a higher position in the channel list.

In an embodiment of the method the steps of selecting and identifying further includes the steps of receiving an indication of a failure of the first path in the topology, and identifying channel identifiers for the failed path.

In an embodiment of the method the second path avoids the failure.

In an embodiment of the method the step of providing a source/destination pair includes the step of selecting the source/destination pair from the topology based on a pre-defined traffic pattern provided by an application.

In an embodiment of the method the step of providing a source/destination pair includes the step of selecting the source/destination pair from the topology based on traffic load for at least one network router or switch.

An embodiment of the method further includes storing the at least one provided path in a routing table.

An embodiment of the method further includes replacing, in a routing table, the first path with the at least one provided path.

In an embodiment of the method the step of determining dependencies further includes steps of generating a new valid channel list in which channels dependencies from the first path are removed, and generating at least one path based on the new valid channel list.

In an embodiment of the method the step of generating the new valid channel list further includes the step of moving the target channel of a dependency to a higher position in the channel list, and repeating the step of moving for any following dependencies.

In an embodiment of the method the step of providing at least one path further includes the step of searching the topology to create a route around the first path using only legal turns.

In an embodiment of the method, the searching utilizes a shortest path algorithm.

In an embodiment of the method the step of providing at least one path further includes the step of searching the topology to create a route around the first path using legal turns, and if necessary illegal turns.

In an embodiment of the method the shortest path algorithm is Dijkstra shortest path algorithm.

In an embodiment of the method the shortest path algorithm obtains the shortest path between the source and the destination considering constraints of the channel list and any pre-existing routing table entries for the source and destination.

In an embodiment of the method the shortest path algorithm is implemented on a reverse path from the destination to the source.

In an embodiment of the method the shortest path algorithm utilizes a cost function which considers a number of hops, a number of illegal turns performed on the path from the source to the destination, and an index of all illegal turns utilized by the shortest path algorithm.

In an embodiment of the method the step of providing at least one path further includes the steps of selecting, from a pre-computed set of paths, at least one path compatible with the channel list.

The present invention provides, inter alia, in an embodiment, an additional method of determining paths in a network topology. The additional method including steps of providing at least one source/destination pair, each pair representing a source and a destination in the topology, providing a node list comprising a topological ordering of node identifiers representing communication nodes in the network topology, and providing at least one path connecting the source and the destination based on the node list.

In an embodiment of the additional method the step of providing a node list further includes the steps of a) selecting a first position in the node list, b) selecting a destination from the at least one source/destination pairs, c) associating the selected destination with the first position, d) determining a subset of nodes, the subset comprising nodes directly connected to the destination, e) selecting a current position in the node list higher than the first position, f) selecting, based on a constraint function, a next node from the subset, g) associating the next node with the current position, h) for each selected node in the subset, extending the subset with a next subset including further nodes connected to the selected node, i) selecting a further position in the node list higher than the first and current positions, the further position hereafter being the current position, and j) repeating steps f)-i) until all nodes in the topology have been associated with a position in the node list.

In an embodiment of the additional method further includes the steps of selecting a source from the topology, identifying the position of the source in the node list, generating at least one path from the selected source to the destination based on traversing the node list from the identified position to the first position.

In an embodiment of the additional method, the constraint function is defined to realize a routing objective.

In an embodiment of the additional method the step of generating the at least one path further includes the step of generating a plurality of paths.

In an embodiment of the additional method, the routing objective comprises an objective to maximize routing choices at each node.

In an embodiment of the additional method, the routing objective comprises an objective to balance the traffic load of each link at each node.

An embodiment of the additional method further includes the step of storing the at least one path connecting the source and the destination in one or more routing tables in at least one network router or switch.

In an embodiment of the additional method the step of providing at least one path further includes the step of generating at least one path connecting the source and the destination of each pair based additionally on a predefined traffic pattern utilizing the at least one path.

In an embodiment of the additional method the step of providing at least one path further includes the step of generating at least one path connecting the source and the destination of each pair based additionally on a traffic load utilizing the at least one path.

In an embodiment of the additional method the step of providing at least one path further includes the step of selecting, from a pre-computed set of paths, at least one path compatible with the node list.

In an embodiment of the additional method the step of associating further includes the step of storing an identifier of the node at the current position in the node list.

The present invention provides, inter alia, in an embodiment, a further additional method of determining paths in a network topology. The further additional method including the steps of providing at least one source/destination pair, each pair representing a source and a destination in the topology, providing a channel list comprising a topological ordering of channel identifiers representing communication channels in the network topology, and providing at least one path connecting the source and the destination based on the channel list.

In an embodiment of the further additional method the step of providing a channel list further includes the steps of a) selecting a first position in the channel list, b) selecting a destination from the at least one source/destination pairs, c) associating the selected destination with the first position, d) determining a subset of channels, the subset comprising channels whose egress node is the destination, e) selecting a current position in the channel list higher than the first position, f) selecting, based on a constraint function, a next channel from the subset, g) associating the next channel with the current position, h) for each selected channel in the subset, extending the subset with a next subset including further channels whose egress node is the ingress node of the selected channel, i) selecting a further position in the channel list higher than the first and current positions, the further position hereafter being the current position, and j) repeating steps f)-i) until all channels in the topology have been associated with a position in the channel list.

An embodiment of the further additional method further comprises the steps of selecting a source from the topology, identifying channels whose ingress node is the source, identifying positions associated with the identified channels, and generating at least one path from the selected source to the destination based on traversing the channel list from the identified positions to a position associated with a channel whose egress node is the destination.

In an embodiment of the further additional method the constraint function is defined to realize a routing objective.

In an embodiment of the further additional method the step of generating the at least one path includes the further step of generating a plurality of paths.

In an embodiment of the further additional method the routing objective comprises an objective to maximize routing choices at each node.

In an embodiment of the further additional method the routing objective comprises an objective to balance the traffic load of each channel.

An embodiment of the further additional method includes the step of storing the at least one path connecting the source and the destination in one or more routing tables in at least one network router or switch.

In an embodiment of the further additional method the step of providing at least one path further includes the step of generating at least one path connecting the source and the destination of each pair based additionally on a predefined traffic pattern utilizing the at least one path.

In an embodiment of the further additional method the step of providing at least one path further includes the step of generating at least one path connecting the source and the destination of each pair based additionally on a traffic load utilizing the at least one path.

In an embodiment of the further additional method the step of providing at least one path further includes the step of selecting, based on the channel list, the at least one path from a pre-computed set of paths.

In an embodiment of the further additional method each associating comprises storing an identifier of the channel at the current position in the channel list.

The present invention provides, inter alia, in an embodiment, an additional method of determining paths in a network topology including providing a plurality of source/destination pairs, each pair representing a source and a destination in the network topology, providing a channel list comprising a topological ordering of channel identifiers representing communication channels in the network topology, and providing at least one path connecting the source and the destination based on the channel list.

The present invention provides, inter alia, in an embodiment, an additional method of determining paths in a network topology including the steps of providing a plurality of source/destination pairs representing at least one source and a plurality of destinations in the topology, for each destination: providing a node list comprising a topological ordering of node identifiers representing communication nodes in the network topology, and providing at least one path connecting the source and the destination based on the node list.

The present invention provides, inter alia, a device for determining paths in a network topology. The device provides a source/destination pair representing a source and a destination in the network topology, provides a channel list comprising a topological ordering of channel identifiers representing communication channels in the network topology, and provides at least one path connecting the source and the destination based on the channel list.

The present invention provides, inter alia, a device for determining paths in a network topology. The device provides at least one source/destination pair, each pair representing a source and a destination in the topology, provides a node list comprising a topological ordering of node identifiers representing communication nodes in the network topology, and provides at least one path connecting the source and the destination based on the node list.

The present invention provides, inter alia, a device for determining paths in a network topology. The device provides at least one source/destination pair, each pair representing a source and a destination in the topology, provides a channel list comprising a topological ordering of channel identifiers representing communication channels in the network topology, and provides at least one path connecting the source and the destination based on the channel list.

It is to be understood that both the foregoing general description of the invention and the following detailed description are exemplary, but are not restrictive, of the invention.

BRIEF DESCRIPTION OF SEVERAL VIEWS OF THE DRAWINGS

Other objects, features and advantages of the present invention will become more apparent from the following detailed description when read in conjunction with the accompanying drawings, in which:

FIG. 11 illustrates routing tables of incoming interfaces of two exemplary nodes;

DETAILED DESCRIPTION OF THE INVENTIONS

Figure 1:
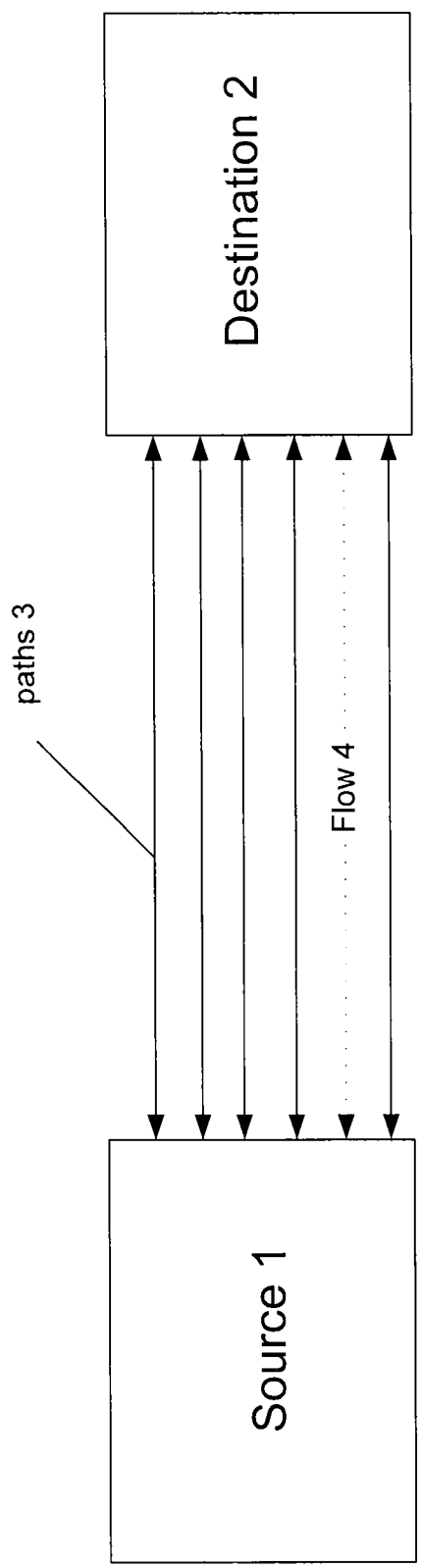
FIG. 1 illustrates a view of a source/destination pair.

Referring now to the drawings wherein like reference numbers designate identical or corresponding parts throughout the several views and more particularly to FIG. 1 thereof, there is illustrated a general illustration of a source/destination pair 1,2. Between the source/destination pair 1,2 are shown multiple paths 3, some paths having a flow 4.

A path 3 is a sequence of links and switches that connect a source/destination pair 1,2. The data that is sent from the source to the destination along a path 3 is a flow 4. A source/destination pair 1,2 may have more than one path 3 between them, and they may have zero or more active flows 4.

The present disclosure includes multiple embodiments covering both the field of small area networks and the field of large area networks.

In one embodiment applicable to, at least, the field of large area networks, the concepts of source/destination pairs are discussed in the context of capturing scenarios where source/destination pairs need to have more than one path.

In another embodiment applicable to, at least, the field of small area networks, the concepts of source/destination pairs are discussed in the context situations where source/destination pairs have 0 or 1 flows.

In the first embodiment, which can be applied to the field of large area networks, for example, there is described the example of Permutation Routing, which can be used to create various routing strategies. For instance, Permutation Routing can provide the ability to implement robust routing schemes such as Next-Hop Optimal Routing.

Routing, in the present context, refers to the assignment of a set of next-hops for each destination node in each switch or router node. In this example, traffic transiting a node is treated in the same way as traffic originating at the node. In the present example, routing is designed to be loop-free, and hence a given routing corresponds to a Directed Acyclic Graph (DAG) rooted at each destination node consisting of the links and nodes involved in packet forwarding. With multipath routing, each node may have several outgoing links in the DAG for a destination. A routing where all links are included in each DAG is referred to as a full connectivity routing. With a given network topology, many different high or full connectivity routings can normally be constructed.

However, they will have different properties with respect to failure recovery and load balancing.

Figure 2:
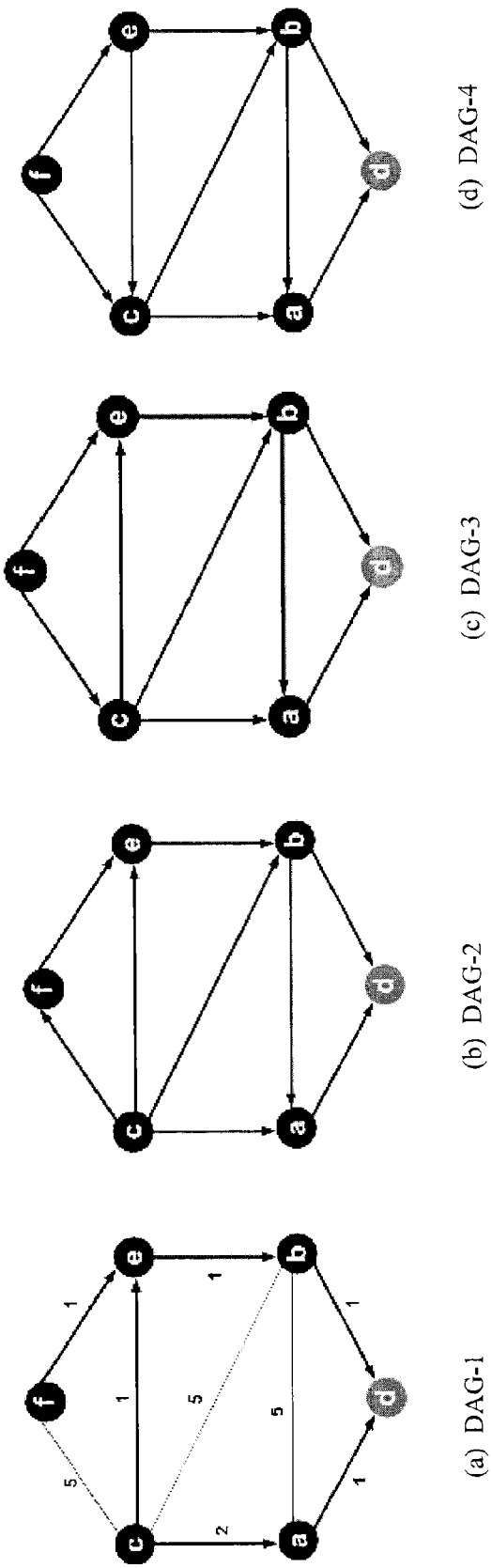
FIGS. 2a-d illustrate a network topology with different Directed Acyclic Graphs.

FIGS. 2a-d show a simple network topology, with 4 different DAGs for the destination node d. In FIG. 2a, DAG-1 is given by shortest path routing with equal-cost multi-path routing ("ECMP") using the link weights indicated in the figure. Node c can split its traffic over two next-hops, while the other nodes have only a single next-hop towards d. Links (a, b), (c, b) and (c, f) are left idle, and are neither used for backup or load balancing. The DAGs in FIG. 2b, FIG. 2c and FIG. 2d are all full-connectivity routing graphs, where all links can be used for packet forwarding. They differ, however, in their distributions of next-hops. In DAG-2, shown in FIG. 2b, there are three nodes (a, e and f) that have only a single next-hop towards d. DAG-3, shown in FIG. 2c, has only two such nodes (a and e). DAG-2 and DAG-3, shown in FIGS. 2b and 2c, respectively, are both compatible with shortest path routing, because they contain all directed links of DAG-1 shown in FIG. 2a. DAG-4, shown in FIG. 2d, is not compatible with shortest path routing. In particular, by changing the direction of the link (c, e), the number of nodes with a single next-hop has been reduced to one (the minimum value).

To maximize the single link fault coverage and load-balancing capabilities of a network, it is helpful to ensure that there is more than one next-hop available for as many S-D pairs (i.e. source-destination pairs) as possible. This leads to the following optimization criterion for Next-Hop Optimal Routing (NHOR).

An NHOR is a full-connectivity routing that maximizes number of S-D pairs that have at least two next-hops towards a destination.

As illustrated by the example above, an NHOR will not always be compatible with shortest path routing. For that reason, the Shortest-Path compatible NHOR (NHOR-SP), which is a full-connectivity routing that maximizes number of S-D pairs that have at least two next-hops while containing the DAG calculated by a shortest path algorithm, can be used.

Permutation Routing can be described by a series of functions which illustrate the operation of this novel routing scheme.

For instance, considering a network modeled as a connected graph $G=(V, E)$ where V is a set of nodes and $E \subseteq V \times V$ is the set of links (edges) in the network's topology. A connected link from node i to node j is denoted by (i,j).

The assignment of next-hops for each destination can be considered individually. For a destination $d \in V$, let $R_d = (V, E_d)$ be a routing function for packets destined to destination d, where $E_d$ is a set of directed links constructed on E. In $R_d$, node j is called a next-hop of node i if there exists a directed link between node i and node j, denoted by (i→j). Thus, $R_d$ is a DAG rooted at destination d.

The routing function $R_d$ contains all valid paths to d, and each path can be considered as a sequence of nodes from a specific source to d. At each node, packet forwarding is the process of sending packets to a next-hop in such a sequence.

Permutation Routing can be used as a tool to find such sequences with the goal of realizing NHOR.

For a given network topology $G=(V, E)$, a permutation P of nodes is an arrangement of all nodes in V into a particular order.

Node j<node i is set to denote that node j occurs before node i in permutation P. The goal is to construct permutations that realize a certain routing strategy.

A permutation P is a routing permutation for $R_d$ if all next-hops of each node occur before it in P: $\forall (i \rightarrow j) \in E_d: j<i$.

According to this definition, the destination node d will always be the first node in a routing permutation for $R_d$. Nodes further out in the routing permutation will be topologically farther from the destination.

In addition, any loop-free routing function $R_d$ can always be represented by a routing permutation in which d is at the left-most position.

This is the case because a loop-free routing function $R_d = (V, E_d)$ is a DAG, rooted at d. When $i \in V$ is arranged into a sequence such that if $E_d$ contains a directed link (i→j), then j appears before i in that sequence, such an arrangement can be calculated by a topological sort algorithm. Destination $d \in V$ is the only node that does not have any outgoing link. Following the above ordering, node d, hence, has been placed at the first position of the sequence.

In general, there can be more than one valid routing permutation for one routing function $R_d$. Starting with a routing permutation P, another valid routing permutation P' can be generated by swapping two consecutive nodes that are not connected by a directed link to each other. For instance, both permutations {d a b e c f} and {d b a e c f} are valid routing permutations for DAG-1, shown in FIG. 2a.

In the reverse process, routing tables can be generated from a routing permutation, given a forwarding rule that defines the relationship between neighboring nodes. In the present example a greedy forwarding rule is utilized for constructing the routing table, in which all topological neighbors of a node that occur before the node, in the routing permutation, are installed as next-hops. Note that this forwarding rule will result in a full connectivity routing, where all links in the topology are potentially used for traffic forwarding to all destinations. This will maximize the potential for load balancing and failure recovery. More restrictive forwarding rules could also be considered, which would result in a sparser DAG. This can sometimes be beneficial in order to avoid excessively long paths, or to limit the number of next-hops for a particular destination.

With the given forwarding rule, different routing permutations will result in routing functions with different robustness characteristics.

Finding a routing permutation that can realize NHOR is considered to be NP-hard (non-deterministic polynomial-time hard). However, the present embodiment presents an algorithm that produces routing permutations that approximate NHOR.

In the algorithm, which can be implemented by a microprocessor, a topology $G=(V, E)$ of N nodes (|V|=N) is considered. All of the N nodes are uniquely identified by a number from 1 to N. In addition, $P=\{p_1, p_2, \ldots, p_N\}$ is a set of N variables in a fixed order from $p_1$ to $p_N$, with respective domains $D=\{D_1, D_2, \ldots, D_N\}$. $D_1$ is set as the candidate set for each variable $p_i$. A candidate set consists of the nodes that can be assigned to variable $p_i$.

A routing permutation P is constructed by successively assigning a node $u \in D_i$ to each variable $p_i \in P$. Such assignment is said to be valid if it satisfies a specific constraint function C(u) which is defined to realize the selected routing objective.

Figure 3:
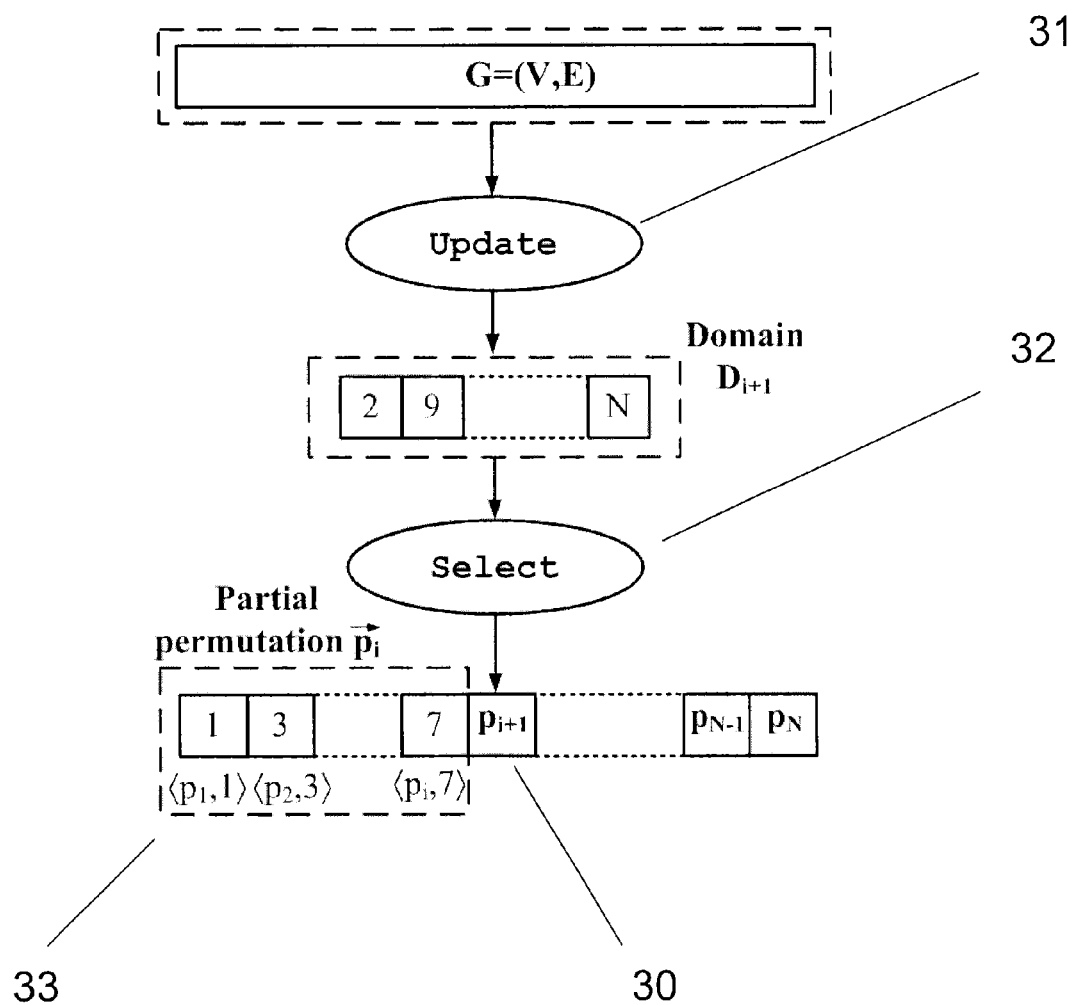
FIG. 3 illustrates the basic assignment procedure for a backtracking algorithm.

FIG. 3 illustrates the basic assignment procedure for variable $p_{i+1}$ 30 in which two key functions Update 31 and Select 32 work as filters to control the assignment. In the figure, each pair $<p_i, u_i>$ 33 represents an assignment of the node $u_i$ to variable $p_i$. The assignment of nodes to a subset of variables $\{p_1, p_2, \ldots, p_i\} \subseteq P$ given by $\{<p_1, u_1>, \ldots, <p_i, u_i>\}$ is called partial routing permutation with i nodes. For simplicity, this is abbreviated to $\vec{p}_i$.

This basic assignment procedure has been embedded into the backtracking algorithm to obtain the routing permutation P. The algorithm calls function Select 32 (with built-in constraint function C(u)) which goes through $D_i$ to find a valid node for the current variable $p_i$. If Select 32 succeeds in finding a valid assignment, the algorithm calls function Update 31 to generate domain $D_{i+1}$ and proceeds to next variable $p_{i+1}$. Otherwise, a backtrack step will be executed to revisit the variable $p_{i-1}$. The algorithm terminates if a routing permutation P of N nodes, also denoted by $\vec{p}_N$, is found or a failure notification returns if all backtracks are examined but no solution is found under C(u).

If the constraint function C allows it, the backtracking algorithm will find one routing permutation P among all possible solutions by searching through the search space shaped by the number of variables in P and their domains of values. In a naïve implementation, the domain for variable $p_{i+1}$ consists of (N−i) nodes that have not been placed in $\vec{p}_i$.

Figure 4:
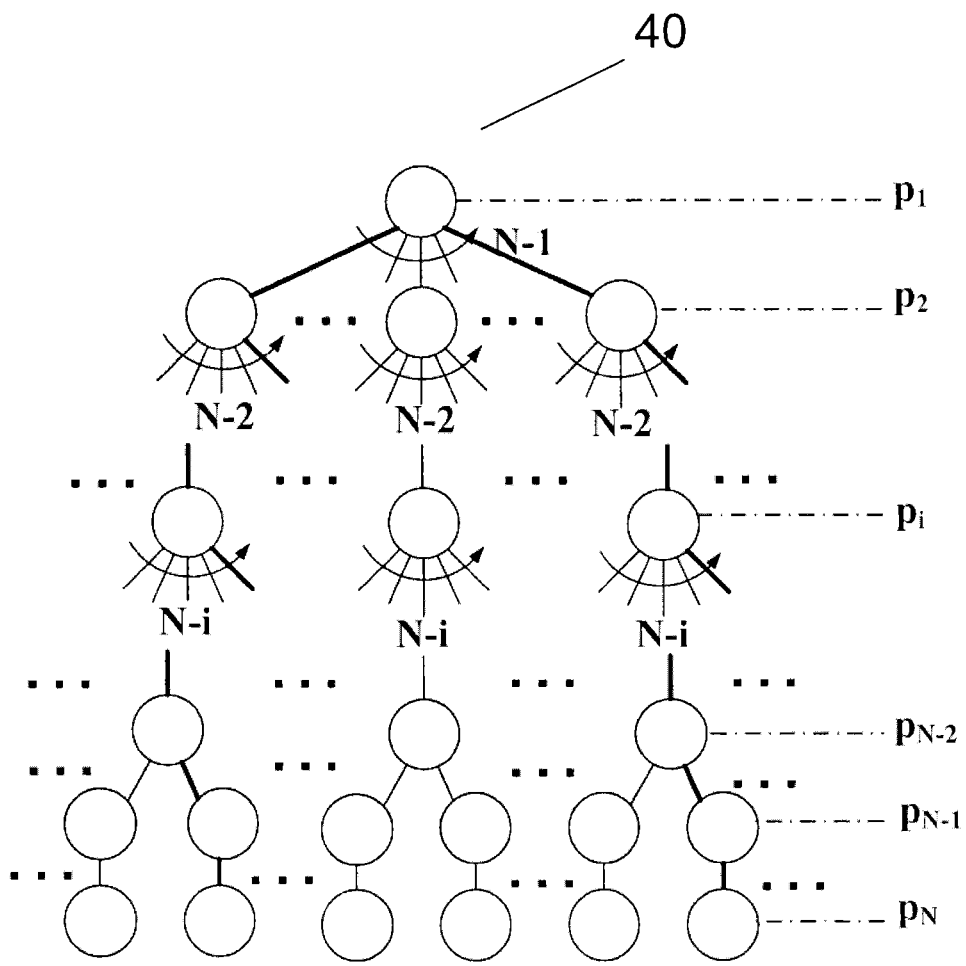
FIG. 4 illustrates a tree representing the search space S of a permutation assignment problem.

Based on that observation, the search space S of the permutation assignment problem has a form of a tree of depth N 40 rooted at the initial state <$p_1$, d> as illustrated in FIG. 4. Solutions $\vec{p}_N$ are located at the tree's leaves. Two connected states in the search space refer to two instances of $p_i$ and $p_{i+1}$. Assume that t operations are needed on average to move from state $p_i$ to state $p_{i+1}$. The complexity in the best case when no backtrack step is needed (backtrack-free) is O(t×N). In the other extreme, if there is only one solution and the "wrong" choice is always made, the complexity would be O(t×N!).

The naïve implementation described above results in high computational complexity, and is only feasible for small topologies. Hence, it is useful to guide the search in order to avoid exploring the entire search space. For instance, in one aspect of the present embodiment, the constraint function C(u) may be simple, in order to reduce computational complexity. In another aspect of the present embodiment, the domain $D_i$ may be limited by taking C(u) into account.

The aspects of the present embodiment described above can be used to construct two high robustness routings that approximate NHOR and NHOR-SP. Specifically, these routing schemes are labeled approximate NHOR and approximate NHOR-SP.

With Permutation Routing using greedy forwarding, a node in $p_i$ (i>2) has at least two next-hops if it has at least two topological neighbors that occur before it in the routing permutation. The Approximate NHOR ("ANHOR") algorithm maximizes the number of nodes where this is the case.

The partial routing permutation $\vec{p}_i$ represents a loop-free routing sub-graph towards destination d, denoted by $R_d^i = (V(\vec{p}_i), E_d(\vec{p}_i))$ where $V(\vec{p}_i)$ is the set of i nodes in $\vec{p}_i$ and $E_d(\vec{p}_i)$ is the set of directed edges formed by applying the greedy forwarding rule defined in section 3 on $\vec{p}_i$. To achieve highly robust routing, the node selected for variable $p_{i+1}$ to form the partial routing permutation $\vec{p}_{i+1}$ is the node with the maximum number of topological neighbors already placed in $\vec{p}_i$. Correspondingly, the number of directed edges of the routing sub-graph formed by the partial routing permutation $\vec{p}_{i+1}$, resulted from the assignment <$p_{i+1}$, u>, is maximized:

$$|E_d(\vec{p}_{i+1})| = \max_{u \in D_{i+1}} |E_d(\vec{p}_i, <\vec{p}_{i+1}, u>)| \quad (1)$$

For a more efficient implementation, a counter c[u] can be maintained for each node u. This counter denotes the number of outgoing links from u to $\vec{p}_i$. In other words, c[u] corresponds to the number of next-hops node u will have if it is selected as the next assignment in the routing permutation. The constraint function $C_{ANHOR}(u)$ is derived to realize the expression (1) noted above as follows:

$$C_{ANHOR}(u) = \begin{cases} \text{True} & \text{if } c[u] = \max_{v \in D_{i+1}} c[v] \\ \text{False} & \text{otherwise} \end{cases}$$

The constraint function $C_{ANHOR}(u)$ implies that the domain $D_{i+1}$ includes all nodes that have at least one topological neighbor in $\vec{p}_i$. The domain is, therefore, updated following the recursive relation:

$$D_{i+1} = D_i \cup \{v \in V | (u,v) \in E\} \setminus \{u\} \quad (2)$$

where u is the node that has been assigned to variable $p_i$ in the i-th assignment.

The computational complexity of ANHOR is the product of the average number of operations to make a move between two successive states and the total number of states visited in the search space.

The constraint function $C_{ANHOR}(u)$ gives a backtrack-free algorithm for all connected input topologies.

This reality can be illustrated by contradiction. For instance, when the algorithm with the constraint function $C_{ANHOR}(u)$ is not backtrack-free, this means that constraint function returns False for all $u \in D_{i+1}$ at some iteration. That can not happen because all nodes in domain $D_{i+1}$ always have at least one next-hop in $\vec{p}_i$ and that would always accord with $c[u] = \max_{v \in D_{i+1}} c[v] = 1$.

Given the backtrack-free property of the present algorithm, the complexity of calculating a permutation for each destination is O(|E|+N×|D|), where |D| denotes the average size of the domain. Typically, |D| depends solely on the average node degree of the network topology. In dense topologies, the total complexity of calculating routing permutations for all destinations can approach $O(N^3)$. The backtrack-free property also provides low memory consumption because it does not need to store temporary partial routing permutations.

In the example of Approximate NHOR-SP (ANHOR-SP), $R_d^{SP} = (V, E_d^{SP})$ denotes the shortest path tree towards destination d. A routing permutation P whose routing function $R_d = (V, E_d)$ is an ANHOR-SP if $R_d$ satisfies two constraints in following order:

1. $R_d$ contains $R_d^{SP}$, meaning all routing choices for any node in $R_d^{SP}$ are also valid routing choices for the same node in $R_d$.

2. ANHOR-SP uses the same selection criterion as ANHOR in order to maximize the number of S-D pairs with at least two next-hops.

The construction of such a routing permutation P is based on the assignment procedure described in FIG. 3. To this end, the shortest path compatibility constraint is implemented in function Update 31 to limit the size of domain $D_{i+1}$ for variable $p_{i+1}$ and the connectivity constraint will be formalized by a constraint function $C_{ANHOR-SP}(u)$ and realized in function Select 32. Clearly, the constraint function $C_{ANHOR-SP}(u)$ is identical to $C_{ANHOR}(u)$.

The next node in routing permutation P is selected among nodes that have all their shortest path next hops towards d already placed in $\vec{p}_i$. Formally, $R_d^{SP,i} = (V(\vec{p}_i), E_d^{SP}(\vec{p}_i))$ is the shortest path tree of $V(\vec{p}_i)$ nodes and $R_d^{SP,i} \subseteq R_d^{SP}$. The domain $D_{i+1}$ for variable $p_{i+1}$ includes all nodes u such that the assignment $<p_{i+1}, u>$, resulting in $\vec{p}_{i+1}$, fulfills:

$$R_d^{SP,i+1} \subseteq R_d^{SP}$$

$c_{sp}[v]$ is the number of shortest path next-hops placed in $\vec{p}_i$ and $n_{sp}[v]$ is the total number of shortest path next-hop that can be calculated from $R_d^{SP}$ of node v. The domain $D_{i+1}$ for variable $p_{i+1}$ follows the recursive relation:

$$D_{i+1} = D_i \cup \{v \in V | c_{sp}[v] = n_{sp}[v]\} \setminus \{u\} \qquad (3)$$

where u is the node that has been assigned to variable $p_i$.

The constraint function $C_{ANHOR-SP}(u)$ gives backtrack-free algorithm for all connected input topologies.

For instance, constraint function $C_{ANHOR-SP}(u)$ always returns True unless $D_i$ is empty. $D_i$ can never be empty before all nodes have been placed in the permutation. If $D_i$ is empty, there is no node that has all its shortest path descendants in $\vec{p}_i$. In other words, the shortest path DAG $R_d^{SP}$ can be followed from any node that has not been placed and a next-hop node that is not placed in $\vec{p}_i$ can always be found. However $D_i$ being empty is impossible. Specifically, since $R_d^{SP}$ is connected and loop-free, any path along the shortest path DAG will eventually reach the destination, which is the first node that was placed in the permutation.

The computational complexity of ANHOR-SP towards one destination includes two parts: the shortest path calculation using Dijkstra's algorithm and routing permutation construction. Due to the property of backtrack-freedom, with sparse topologies the complexity of second part towards one destination would be $O(|E|+|E_d^{SP}|+N \times |D|)$ where $|D|$ denotes the average size of the domain. In dense topologies, the total complexity of calculating routing permutations for all destinations can approach $O(N^3)$.

Thus, with a low computational complexity, ANHOR-SP can be implemented on a per-router basis in Open Shortest Path First (OSPF) or Intermediate System To Intermediate System (IS-IS) networks. To ensure a consistent permutation routing in the entire network, constraint function $C_{ANHOR-SP}(u)$ will return the same node in each assignment among possible selections. This tie can be broken by letting the highest router ID be selected. The highest router ID denotes the largest number numerically. For instance, 192.168.1.2 would be higher than 172.16.3.2, and 172.16.3.2 would also be higher than 172.16.2.1.

The presently disclosed algorithms have been applied to a large area network scenario and the advantageous results have be measured. In particular, the performance of the proposed algorithms have been evaluated by measuring how well the algorithms realize NHOR with respect to NHOR being a full-connectivity routing that maximizes number of S-D pairs that have at least two next-hops towards a destination.

Since multipath routing leads to path inflation, the path length distribution is also measured. ANHOR and ANHOR-SP are compared to standard shortest path routing with ECMP, and to Loop Free Alternate Routes ("LFA").

In the present example, six representative network topologies from the Rocketfuel project have been selected for the evaluation. The topologies are listed in Table 1 in increasing order of their average node degrees.

TABLE 1

Network topologies

| AS | Name | Nodes | Links | Avg. Degree |
| --- | --- | --- | --- | --- |
| 1221 | Telstra ™ (au) | 104 | 151 | 2.90 |
| 1755 | Ebone ™ (eu) | 87 | 161 | 3.70 |
| 3967 | Exodus ™ (us) | 79 | 147 | 3.72 |
| 3257 | Tiscali ™ (eu) | 161 | 328 | 4.07 |
| 6461 | Abovenet ™ (us) | 138 | 372 | 5.40 |
| 1239 | Sprint ™ (us) | 315 | 972 | 6.17 |

The results for ECMP and LFA depended heavily on the link weight settings used in the topologies. To obtain realistic link weight settings, a local search heuristic was run with a link load objective function, using a traffic matrix generated by a gravity model. For AS1239 (Sprint™), unit link weights were used, because the above noted local search heuristic did not scale to a topology of this size.

Figure 5:
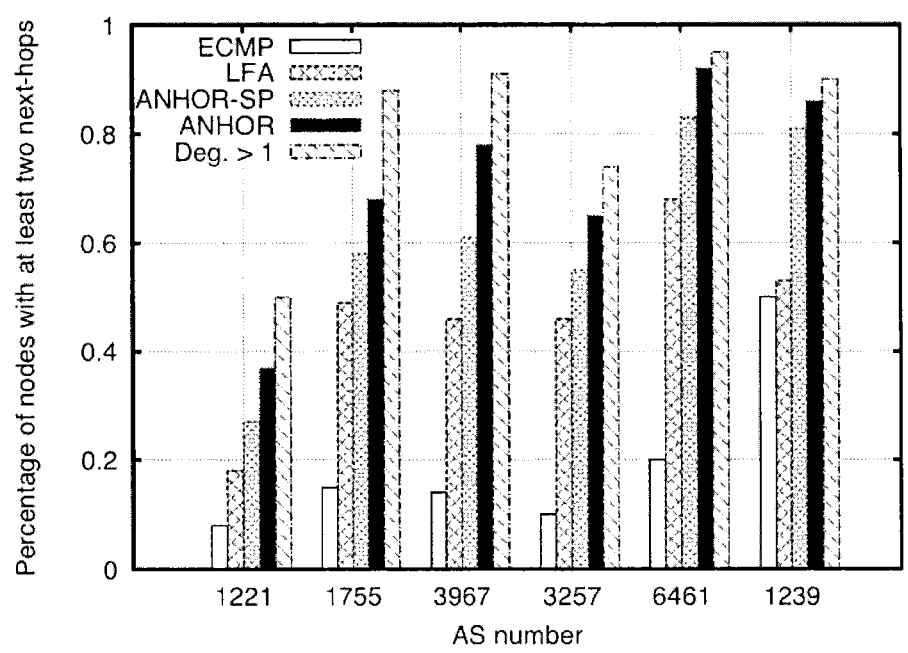
FIG. 5 illustrates the percentage of nodes having at least two next-hops for different routing methods.

In order to evaluate the robustness, multipath capability was considered. FIG. 5 shows the fraction of nodes with at least two next-hops with the different routing methods. It can be observed that the multipath capability varies strongly between topologies; it is generally higher in more well-connected networks. ANHOR achieves a significant improvement over ECMP and LFA in all networks.

It should be noted that the number of next-hops achieved with ANHOR is independent of the link weight settings, while ANHOR-SP is constrained to including the shortest paths in the routing. ANHOR-SP performance is close to ANHOR, and gives a clear improvement over LFA (by up to 28% in AS1239). This shows that Permutation Routing can give a significant gain compared to existing solutions, while being compatible with shortest path routing with realistic link weight settings.

For reference, FIG. 5 also shows the fraction of nodes in each topology with a node degree larger than 1. Nodes with a degree of 1 can not have more than 1 next-hop to any destination.

Figure 6:
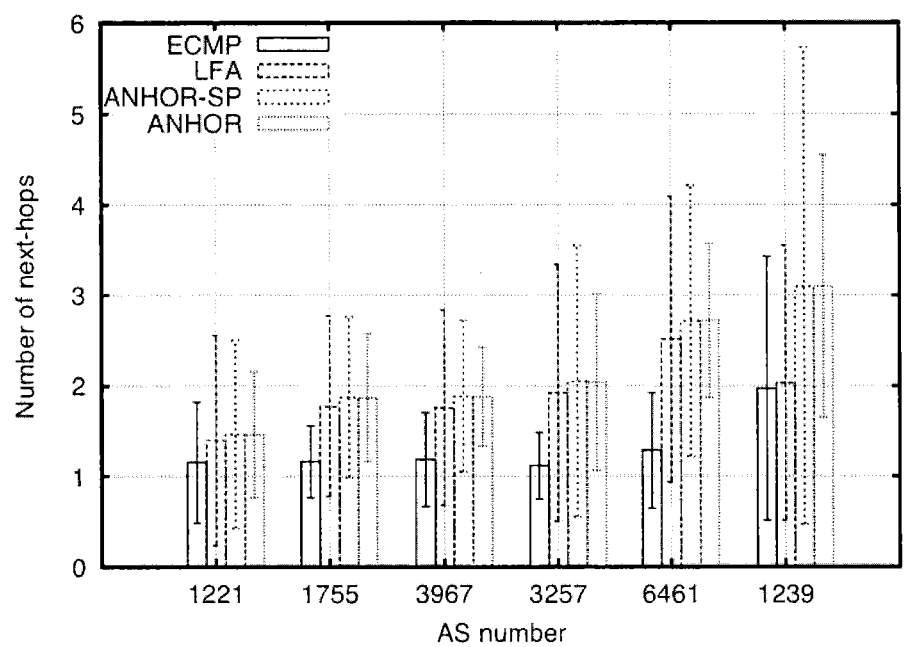
FIG. 6 illustrates the mean and variance for the number of next-hops for different topologies.

FIG. 6 shows the mean and variance for the number of next-hops at each router in the six topologies reviewed in the present example. For increased robustness and load-balancing, it is generally good to have a high mean and a low variance in the number of next-hops. If this variance is high, it means that a few nodes have a high number of next-hops, while others might be left with only one.

Both ANHOR and ANHOR-SP produce full connectivity routings, which means that the mean number of next-hops across all S-D pairs will be equal to half the average node degree in the topology. The mean is somewhat lower for LFA and ECMP, meaning that some links are not used for packet forwarding. The variance, however, is lower with ANHOR than with ANHOR-SP and LFA. This shows how ANHOR achieved a better (more uniform) next-hop distribution than the other routings.

There are good reasons to limit the number of next-hops that are installed in the forwarding table for a particular destination. Installing more than a few next-hops will not give much benefit with respect to robustness or load-balancing. It will, however, require faster memory in the forwarding table, and may lead to the unnecessary inclusion of paths that are much longer than the shortest path.

Hence, an example is considered in which the number of next-hops for a particular destination is limited to at most K. A Routing Efficiency coefficient is defined, which denotes the fraction of bidirectional links that are used for traffic forwarding with a given K.

$$RE = 2 \times |E_d(K)| / |E| \quad (4)$$

where $|E_d(K)|$ is the number of directed links in the routing DAG when each node can have at most K next-hops and $|E|$ is the number of bidirectional links in the network topology. According to this definition, $0 \leq RE \leq 1$.

Table 2 shows the RE values for three values of K in the selected topologies. The given value is the average over all S-D pairs. It can be seen that for all routing methods, a higher K gives a higher RE value. ANHOR and ANHOR-SP give the highest RE values, sometimes with a significant improvement over ECMP and LFA even for K=2. The RE values in more well-connected topologies (AS1239) are lower than in sparse topologies. Such topologies contain a high number of nodes with a very high degree (39% nodes has their degrees greater than 15 in AS1239), and a low K will hence exclude many valid (but often unnecessary) paths.

TABLE 2

| | | \multicolumn{6}{c}{Routing Efficiency coefficient} | | | | | |
|---|---|---|---|---|---|---|---|
| | | AS1221 | AS1755 | AS3967 | AS3257 | AS6461 | AS1239 |
| K = 2 | ECMP | 0.74 | 0.61 | 0.61 | 0.54 | 0.43 | 0.49 |
| | LFA | 0.80 | 0.79 | 0.77 | 0.77 | 0.62 | 0.49 |
| | ANHOR-SP | 0.86 | 0.84 | 0.85 | 0.76 | 0.67 | 0.58 |
| | ANHOR | 0.94 | 0.90 | 0.95 | 0.81 | 0.81 | 0.60 |
| K = 3 | ECMP | 0.76 | 0.62 | 0.62 | 0.54 | 0.46 | 0.56 |
| | LFA | 0.86 | 0.90 | 0.87 | 0.82 | 0.77 | 0.57 |
| | ANHOR-SP | 0.92 | 0.95 | 0.94 | 0.88 | 0.85 | 0.75 |
| | ANHOR | 0.98 | 0.99 | 1.00 | 0.95 | 0.95 | 0.80 |
| K = 4 | ECMP | 0.77 | 0.62 | 0.63 | 0.54 | 0.47 | 0.60 |
| | LFA | 0.90 | 0.94 | 0.91 | 0.88 | 0.85 | 0.61 |
| | ANHOR-SP | 0.96 | 0.99 | 0.97 | 0.93 | 0.93 | 0.65 |
| | ANHOR | 1.00 | 1.00 | 1.00 | 0.99 | 0.99 | 0.92 |

Figure 7:
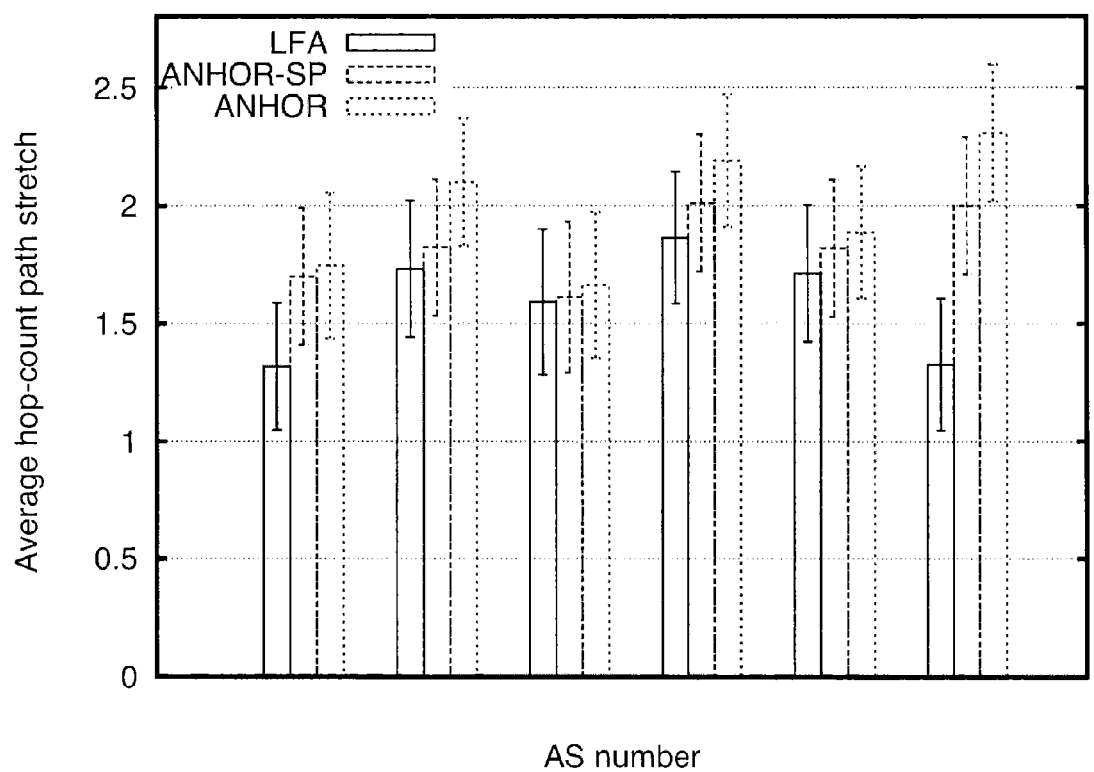
FIG. 7 illustrates the average path stretch regarding for different routings.

High path diversity increases robustness and allows for more load balancing. However, it has a cost in terms of path inflation and increased load in the network if traffic is sent over non-shortest paths. When considering the distribution of path lengths, hop counts should be considered since this metric is independent of the link weight settings. FIG. 7 shows the average path stretch regarding K=3 with different routings, where the length of each valid path has been normalized with the shortest path length for that S-D pair. The superior path diversity in ANHOR and ANHOR-SP can be observed but comes at the cost of some path inflation. Nevertheless, the average path lengths are still comparable to those of shortest path routing. It should be noted that the path inflation introduced with multipath routing can be ameliorated with more intelligent load balancing methods.

The complexity of the disclosed algorithms depends on the number of nodes, links and on how efficiently the size of the candidate set can be reduced. The average size of candidate set turns out to be approximately 5 times (AS1755) to 12 times (AS1239) higher than their corresponding average node degrees in the exemplary topologies.

Figure 8:
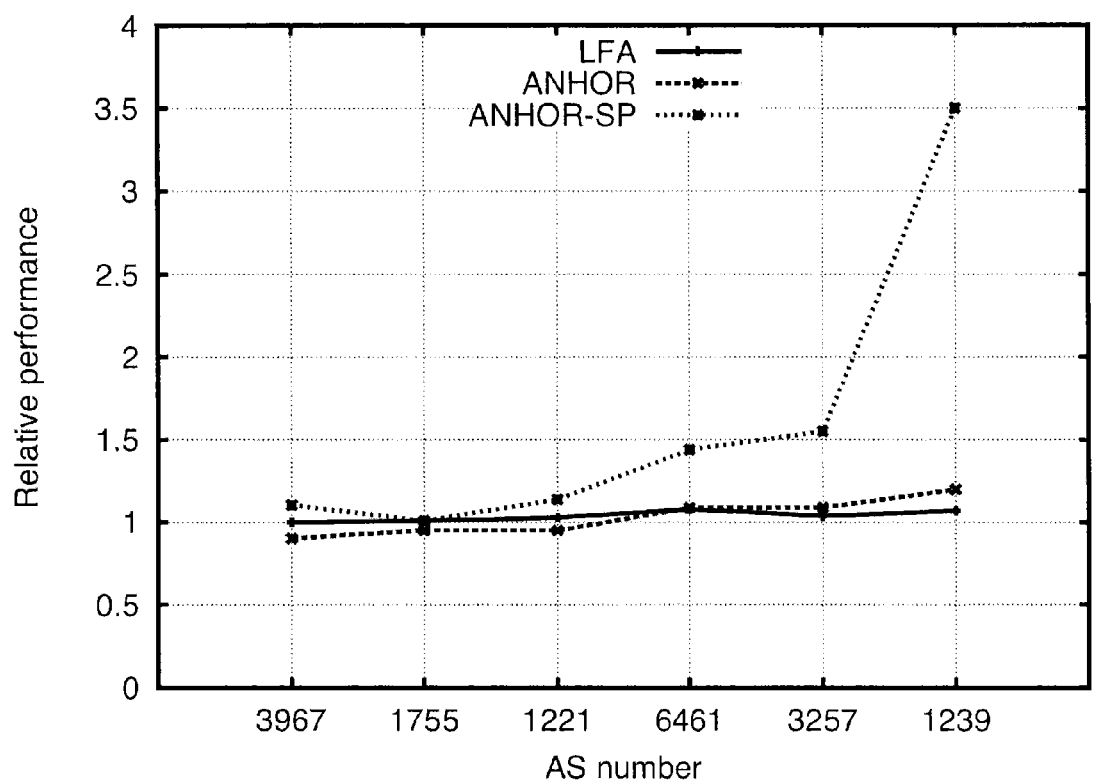
FIG. 8 illustrates the relative running time for different topologies.

FIG. 8 shows the relative running time of each routing method as compared with ECMP, across six topologies. The AS topologies are listed in an increasing order of number of nodes. The results are achieved with an Intel Core 2 CPU 6300 @ 1.86 GHz machine. ANHOR has a low running time that is comparable to a normal ECMP routing computation. For all destinations, the total time difference is less than 10% for all topologies. As for ANHOR-SP, calculating routing permutations for all destinations takes four times less time than ECMP. Across all topologies, the memory consumption never exceeds 6 MB.

The present embodiment presents Permutation Routing as a method for increased robustness in IP networks with traditional hop-by-hop forwarding. The present embodiment can also be used to generate routings that give a significant boost in number of nodes that have at least two forwarding options to a destination. The present embodiment is able to add robustness. This is the case, at least, because Permutation Routing bases its construction solely on topology information and hence no new control plane signaling is required. In addition, Permutation Routing allows a tunable K where $K \geq 1$ while still being compatible with traditional link-state routing protocols. In the same category, Protection Routing presents a two-phase heuristic to produce a routing for a given traffic demand in a centralized routing system. In phase 1, the heuristic seeks to minimize number of unprotected nodes towards a destination while minimizing a cost function. Although Routing Permutations share the goal of minimizing the number of nodes with only one forwarding option, next-hops can be evenly distributed among nodes rather than performing traffic optimization for a specific traffic demand. Finding a routing that optimizes for a given load function is less important for the Internet where traffic matrix elements vary significantly with time. Instead, in the Internet context, the available forwarding options can be optimized for more intelligent load balancing methods that are more responsive to traffic variation.

The Permutation Routing is an approach for calculating more robust routing while being compatible with existing links state routing protocols. An algorithm can be used to construct routing permutations. Routings that optimize different objectives can be implemented by modifying the selection criteria that are used in the construction algorithm.

Permutation Routing is to maximize the survivability in a network with traditional hop-by-hop forwarding. In addition, as is noted above, permutation routings outperform existing multipath approaches such as ECMP and LFA in terms of robustness and path diversity. In addition, the complexity of calculating routing permutations is comparable to that of standard link state routing.

Figure 9A:
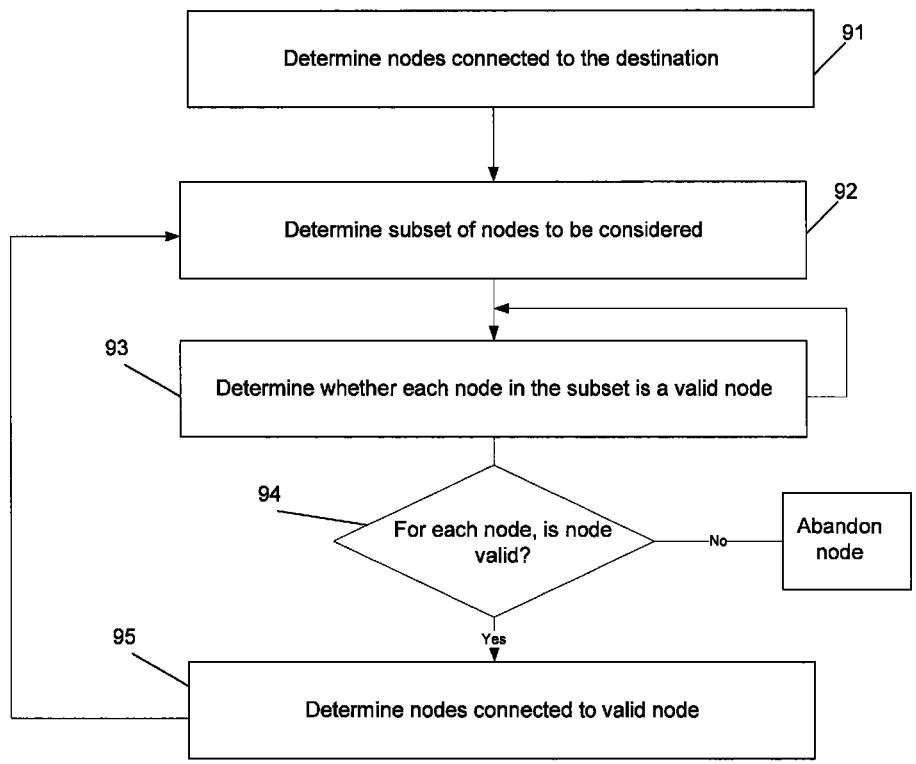
FIG. 9A illustrates a method of implementing permutation routing according to one embodiment of the present disclosure.

The method of implementing permutation routing is described with respect to the flow chart illustrated in FIG. 9A.

In step 91, determine the nodes connected to the destination.

In step 92, determine the subset of nodes to be considered.

In step 93, determine for each of the nodes in the subset, whether the node is a valid node, if so, proceed to next step, if not, abandon the respective node.

In step 94, for each valid node in the subset, determine a next step set of nodes connected thereto.

In step 95, for each next step node in the next step set of node return to step 92.

In the ANHOR and ANHOR-SP schemes, the subset of nodes to be considered in step 92 is reduced. In addition, the determination of whether the node is a valid node in step 93 is based on a further function $C_{ANHOR}(u)$ or $C_{ANHOR-SP}(u)$.

Once the paths are determined they can be stored in one or more routing tables in respective routers/switches. The permutations can be obtained using a distributed algorithm that creates the routing tables in the routers/switches. Hybrid solutions of this is also available. For instance, the paths can be decided by applications using the paths. For example, an application for streaming media data, e.g. a film, or a sports event, may result in a choice of different paths than an application for transferring files, such as Dropbox™.

Figure 9B:
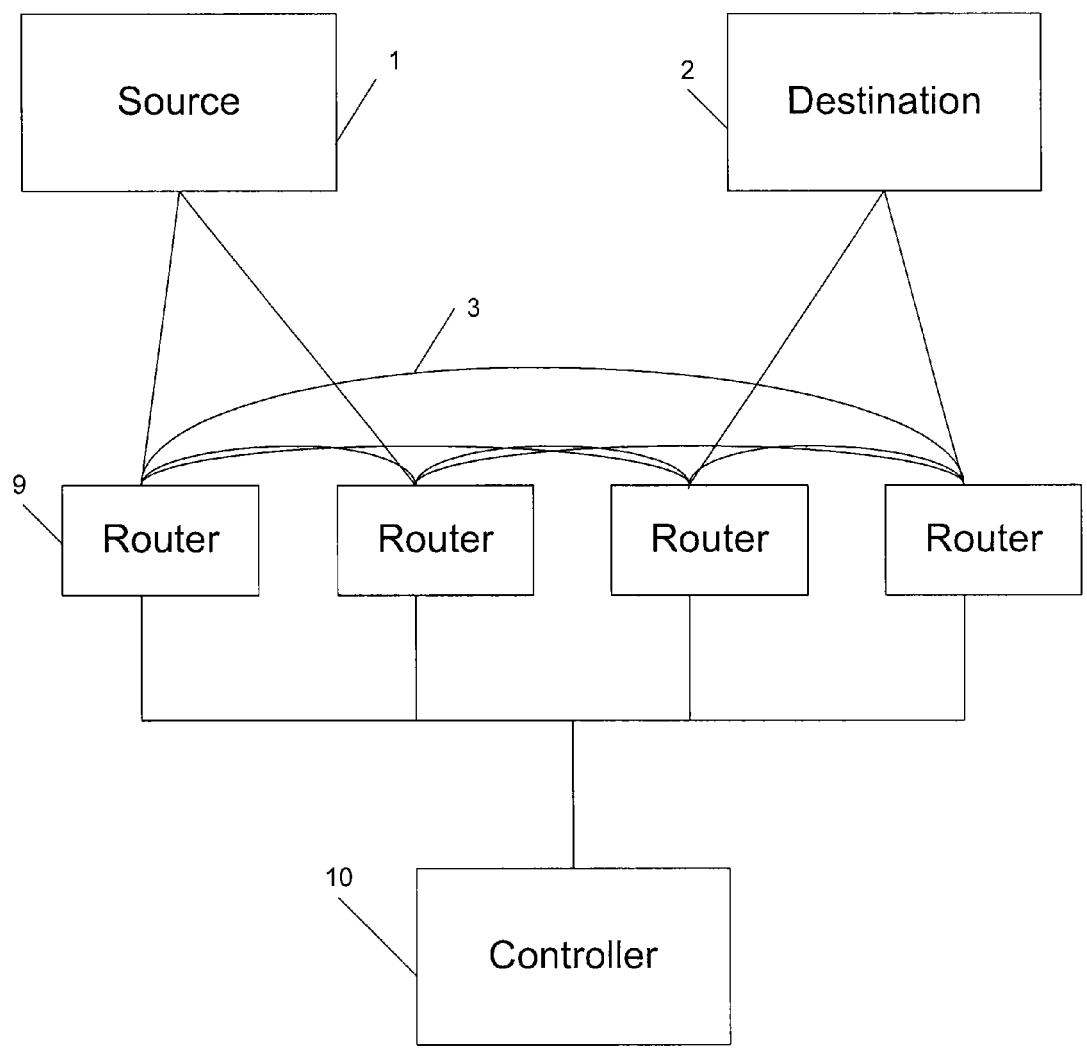
FIG. 9B illustrates a block diagram according to one embodiment of the present disclosure.

FIG. 9B illustrates a microprocessor implemented controller 10 which determines the routes based on the ANHOR and ANHOR-SP schemes. For instance, the controller 10 determines the routes between the source 1 and destination 2 and distributes the determined paths to the routers 9. The controller 10 thus maximizes the number of paths between each source 1 and destination 2 pair, such that packets do not loop in the network. This maximization provides toleration of faults in the network and avoids problems created by looping.

As is noted above, in the field of large area networks, Permutation Routing can provide the ability to implement additional robust routing schemes. In the present embodiment, there is described a new routing method that combines the concept of routing permutations with interface-specific forwarding. This interface based Permutation Routing aims to maximize the fast rerouting coverage for IP networks by giving multiple loop-free alternates for each incoming interface of the router. In addition, the interface based Permutation Routing method shares with ECMP and LFA certain features. For instance, the present interface based Permutation Routing method does not require the network operator to change the traditional hop-by-hop forwarding strategy that is optimized for the fault free case. Further, the method does not require addition of fault-information included in the packet header and does not suffer from routing loops, even when there are multiple faulty components in the network. Finally, the interface based Permutation Routing method works with the existing standard link state routing protocols such as OSPF or IS-IS.

As is noted above, Permutation Routing is a highly flexible approach for calculating multiple loop-free next-hops in networks with the traditional hop-by-hop forwarding. Permutation Routing is based on the fact that any routing strategy can be expressed as a permutation (sequence) of nodes that are involved in traffic forwarding to a destination. The routing ensures that loops are avoided when packets are forwarded in one direction towards destination regarding to node ordering in the permutation. Correspondingly, a simple forwarding rule is proposed to generate forwarding tables based on permutations. Permutation Routing only takes the topology information that is collected by a standard link state routing protocol as the input for its construction, and hence no new control plane signaling is needed.

This Permutation Routing is used in the present embodiment to create a robust routing that maximizes the number of interface-destination (I-D) pairs that have more than one available next-hop. A backtracking algorithm is used to construct the ordering of nodes in the permutation. The properties of the resulting routing are determined by defined constraints which are used to govern the creation of the permutation. Permutation Routing is a powerful abstraction that can be used to implement many different routing objectives for IP networks with either node specific forwarding or interface specific forwarding.

Conventional topologies are inconvenient for directly calculating an interface based routing, where next-hops associate with an incoming interface. According, in the present embodiment the given topology is pre-processed to achieve a new directed graph, from which routing tables for incoming interfaces are easily computed. Specifically, each node in the new graph represents a directed link of the original topology and the connectivity among those nodes is induced from the connectivity of the given topology. The graph transformation allows existing routing algorithms, e.g. ECMP and LFA, and Permutation Routing to be reused to construct routing tables for incoming interfaces with different degree of robustness.

Interface specific forwarding has the ability to increase routing robustness for IP networks. The present embodiments implement interface specific forwarding using Interface Next-hop Optimal Routing (iNHOR) as the main objective function for a robust interface based routing.

To help ease the description, networking terms are introduced herewith that will be used in the following embodiment. A directed link from node i to node j, denoted by (i→j), is an incoming interface to node j and an outgoing interface of node i. A routing is an assignment of a set of next-hops for each destination node for each traffic source. A routing is loop-free in the present embodiment and hence a given routing corresponds to a Directed Acyclic Graph (DAG) rooted at each destination node consisting of the links and nodes involved in packet forwarding. With multipath routing, each node may have several outgoing links in the DAG for a destination.

In IP networks with interface-specific forwarding, packets are routed based on both the incoming interface and the destination address in the IP header. To do that, each line-card in the router will maintain its own distinct forwarding table that maps each network destination to eligible outgoing interfaces. These forwarding tables are distributed by a routing controller 100 shown in FIG. 19B, where routing protocols (e.g. OSPF or IS-IS) are used to populate the routing tables. In one embodiment, the forwarding engines are integrated into interface cards in the distributed mode. In interface based routing, packets for a given destination can be forwarded in both directions of a bidirectional link without necessarily causing loops. This ability can help increase robustness over traditional IP routing especially when the network topologies are not well-connected.

Figure 10:
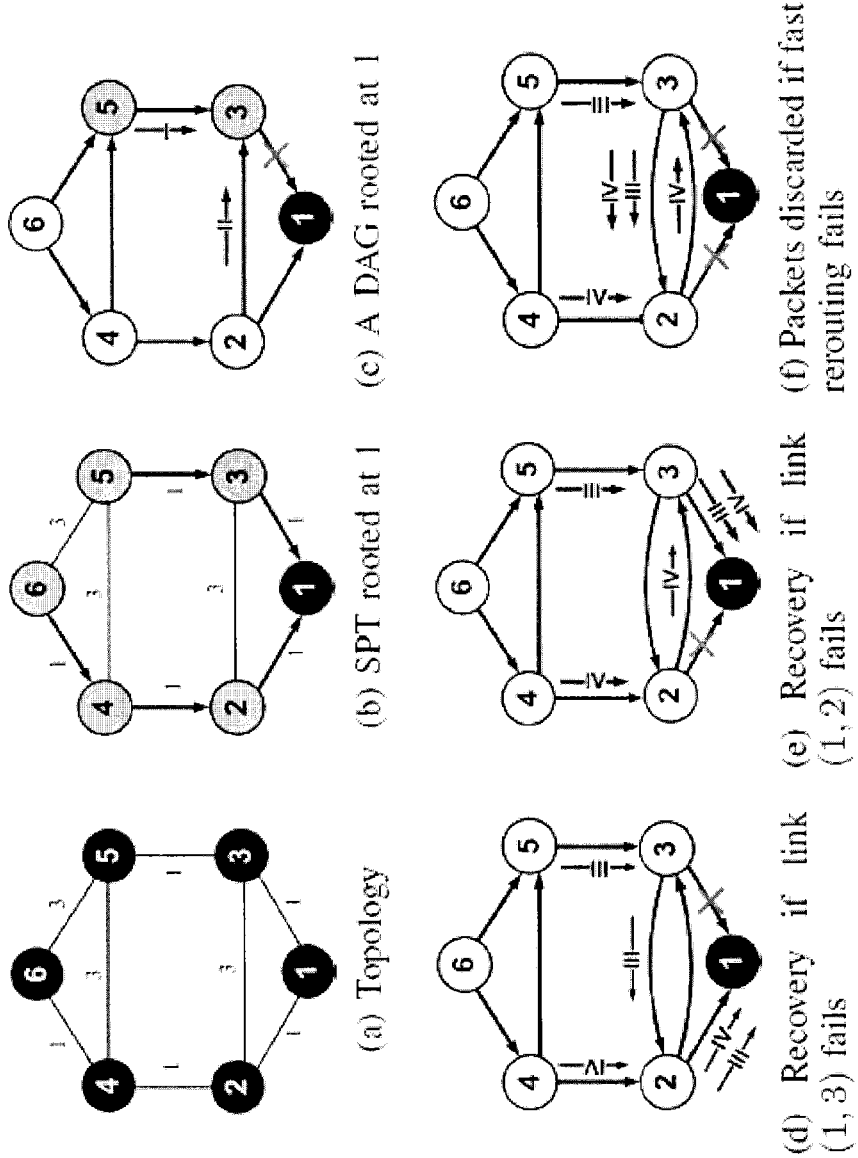
FIG. 10 illustrates fast rerouting in node base routing and interface based routing.

For instance, FIG. 10*a* illustrates a simple topology with six nodes and eight bidirectional links with their corresponding link weights. FIG. 10*b* is a shortest path tree (SPT) rooted at destination 1. Shortest path trees are usually sparse and thus less robust against network component failures. Provided that a node is fast reroute protected if it has at least two next-hops, no node in FIG. 10*b* is protected (gray shadowed nodes). Other routing methods, e.g. LFA, can improve SPT by growing non-shortest path branches to form a better-connected routing graph, mandatorily a DAG. FIG. 10*c* illustrates such a DAG rooted at node 1. FIG. 10*c* is the most robust loop-free routing graph that traditional IP routing can provide on the given topology because growing any more directed link will cause loops. For example, if link (1, 3) fails, node 3 must discard its incoming traffic. Any attempt to reroute packets to node 2 would form a loop between node 2 and node 3, until link (1, 3) recovers from the failure. Consequently, node 3 and node 5 are not protected for possible single failures in the example of FIG. 10*c*.

These problems are addressed and rerouting accomplished successfully in the network using interface-specific forwarding as shown in FIG. 10d and FIG. 10e. In FIG. 10d, the failure of link (1, 3) does not interrupt data flow III from node 5. Instead, node 3 routes flow III to node 2. Being aware of the incoming interface of flow III, node 2 forwards it to destination 1. Similarly, the failure of link (1, 2), in FIG. 10e, triggers node 2 to reroute incoming flow IV to node 3, from which it would be successfully delivered at node 1. The two scenarios, FIG. 10d and FIG. 10e, will be fulfilled if routing tables towards destination 1 are installed at interfaces of node 2 and node 3 as in FIG. 11. Note that those next-hops indicated as primary are used when they are available.

If both link (1, 3) and link (1, 2) fail at the same time, both flows will be discarded at node 2. Flow IV travels on path 4→2→3→2 before it would be stopped at node 2. Loops will not occur when each interface is equipped with loop-free next-hops towards the destination and the incoming flow is discarded when there is no available next-hop for the corresponding incoming interface.

In order to maximize the fault tolerance and load-balancing capabilities of a network, a routing should provide more than one available next-hop for as many I-D pairs as possible. In addition, such routing will contain the shortest path tree to be compatible with the standard link state routing protocols. In light of the features, the following optimization criterion has been developed for Interface Next-hop Optimal Routing (iNHOR).

Definition 1:

Given a routing, the outgoing interface on the shortest path tree is called the primary interface (pI) and the outgoing interfaces not on the shortest path tree are called secondary interfaces (sI). An iNHOR is an interface based routing that contains the shortest path tree and satisfies the two following conditions in order:

1) The number of pI-D pairs that have at least two next-hops is maximized.

2) The number of sI-D pairs that have at least two next-hops is maximized.

Nodes employ their primary interfaces to forward packets when the network is fault-free. The secondary interfaces are used as back-ups for fast rerouting purposes when a primary interface fails. The definition implies that fault tolerance capability is maximized for primary interfaces first and thereafter for secondary interfaces.

iNHOR is able to increase robustness for IP networks especially when line-cards have loop-free routing forwarding tables. Therefore a method is discussed herewith that helps construct DAGs for interfaces directly from given a topology.

The network topology is modeled as a directed graph G=(V, E) where V is the set of nodes and E is the set of directed links (edges). Let N and M denote the cardinality of set V and E, respectively. The directed link (u→v) consists of the head node u and the tail node v. Let $\mathcal{G}=(\mathcal{V}, \mathcal{E})$ be the directed graph generated from G by employing two following transformation definitions.

Definition 2:

Each directed link in E has been transformed into a node in $\mathcal{V}$.

The node in $\mathcal{V}$, which is directed link (u→v) in E, is denoted by [u, v]. Let $\mathcal{H}$ (|u, v|) and $\mathcal{T}$ (|u, v|) be two operators which apply on the node [u, v] to extract head node and tail node of the corresponding directed link (u→v).

Definition 3:

Two nodes i, j[1]∈V form a directed edge (i→j) in $\mathcal{E}$ if and only if $\mathcal{H}$ (i)= $\mathcal{T}$ (j).

[1] For convenience, nodes are sometimes denoted in the new directed graphs with single letters.

Following Def. 2 and Def. 3 in that sequence, the directed graph $\mathcal{G}=(\mathcal{V}, \mathcal{E})$ has been identified thoroughly. Let A $\mathcal{G}=(a_{ij})$ be the adjacency-matrix that represents for $\mathcal{G}$:

$$a_{ij} = \begin{cases} 1 & H(i) = T(j) \\ 0 & \text{otherwise} \end{cases}$$

Following theorems describe some consequences of the defined graph transformation. Theorem 1 and Theorem 2 prove that the transformation rules preserve subset relationship and acyclic property of a directed graph while Theorem 3 provides the cardinalities of the sets of nodes and links of the transformed graph for the given topology.

Theorem 1:

Let $G_1=(V_1, E_1)$ and G=(V, E) be two directed graphs and $\mathcal{G}_1=(\mathcal{V}_1, \mathcal{E}_1)$ and $\mathcal{G}=(\mathcal{V}, \mathcal{E})$ be two transformed graphs, with respect to Def. 2 and Def. 3 in such order, of $G_1$ and G, respectively. If $G_1 \subseteq G$, then $\mathcal{G}_1 \subseteq \mathcal{G}$.

Proof:

It is proved that $\mathcal{V}_1 \subseteq \mathcal{V}$ and $\mathcal{E}_1 \subseteq \mathcal{E}$ hold.

(i) It is trivial that $\mathcal{V}_1 \subseteq \mathcal{V}$ because $\mathcal{E}_1 \subseteq \mathcal{E}$.

(ii) Assuming that arbitrary directed links (a→b)∈$E_1$ and (b→c)∈$E_1$, (|a, b|→|b, c|)∈$\mathcal{E}_1$ are present in the transformed domain. Because $E_1 \subseteq E$, then (a→b)∈E and (b→c)∈E and (|a, b|→|b, c|)∈$\mathcal{E}$ in the transformed domain. That means $\mathcal{E}_1 \subseteq \mathcal{E}$.

Theorem 2:

The transformed graph, with respect to Def. 2 and Def. 3 in such order, of a directed acyclic graph is also a directed acyclic graph.

Proof:

The proof is by contradiction. D is denoted by the given directed acyclic graph and $\mathcal{D}$ by the directed graph generated from D with respect to Def. 2 and Def. 3 in such order. It is assumed that $\mathcal{D}$ contains a loop, namely the loop is |a, b|→|b, c|→ . . . →[y, z]→[z, a] where a, b, c . . . y, z are nodes in D. In addition, the loop implies that there exists a path a→b→c . . . →y→z→a which is another loop in D. Since D is directed acyclic graph, the assumption is broken.

Theorem 3:

Given directed graph G=(V, E), the directed graph $\mathcal{G}=(\mathcal{V}, \mathcal{E})$ generated from G with respect to Def. 2 and Def. 3 in such order is satisfied:

1) $\mathcal{N}$ =M where $\mathcal{N}$ is the number of nodes in $\mathcal{V}$.

2) $\mathcal{M} = \sum_{u=1}^{N} d_u^2$ where $\mathcal{M}$ is the number of links in $\mathcal{E}$ and $d_u$ is the network degree of node u∈V.

Proof:

(1) is trivial due to the Def. 2.

(2) is proved by examining each node u∈V. Let $d_u$ be the network degree of node u and $N_G(u)=\{v \in V: (u \to v) \in E\}$ be the set of neighboring nodes of u. It is observed that there are $d_u$ directed link incident at u and $d_u$ directed links departing from u. Via Def. 3, each node $[v_k, u] \in V$, where $u \in N_G(v_k)$, will have $d_u$ neighboring nodes. Therefore, in $\mathcal{G}$, there are $d_u$ nodes and $d_u^2$ directed links involving node u. That means number of links $\mathcal{M} = \sum_{u=1}^{N} d_u^2$.

Although $\mathcal{G}=(\mathcal{V}, \mathcal{E})$ may appear to be a proper graph for calculating a loop-free routing tables towards a certain destination node, it is, however, infeasible since $\mathcal{G}$ does not include any node that can corresponds to the real destination node. For the routing computation purpose $\mathcal{G}$ is modified and $\mathcal{G}_u = (\mathcal{V}_u, \mathcal{E}_u)$ is denoted by the modified transformed graph. $\mathcal{V}_u$ results from adding virtual node u into $\mathcal{V}$ and $\mathcal{E}_u$ results from augmenting $\mathcal{E}$ with virtual directed links that depart from nodes $[v_i, u]$ ($u \in N_G(v_i)$) and terminate at virtual node u while taking away from $\mathcal{E}$ those directed links that depart from nodes $[v_i, u]$ and terminate at nodes $[u, v_j]$ ($v_j \in N_G(u)$).

Those removed directed links will not contribute to routing towards u.

$$\begin{cases} \mathcal{V} = \mathcal{V} \cup \{u\} \text{ where } u \in V \\ \mathcal{E}_u = \{\mathcal{E} \cup \{([v_i, u] \to u)\}\} / \{([v_i, u] \to [u, v_j])\} \end{cases}$$

Figure 12:
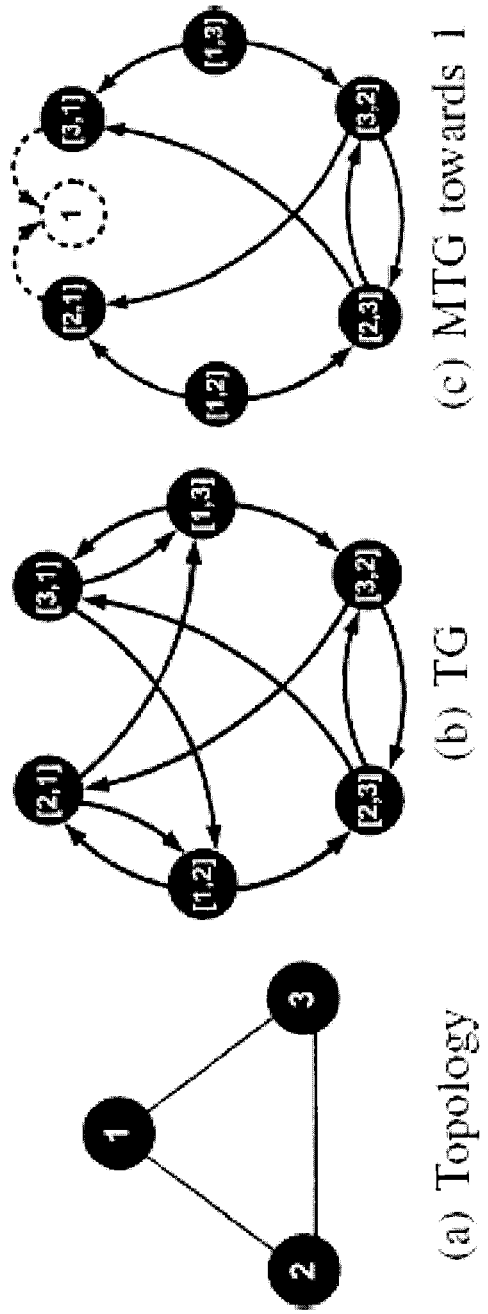
FIG. 12 illustrates a topology and a corresponding transformed graph and modified transformed graph.

FIG. 12b shows the directed graph generated from the topology in FIG. 12a. The transformed graph (TG) includes 6 nodes and 12 directed links. It is larger than the original topology in both the number of nodes and in the number of directed links. FIG. 12c is the modified transformed graph (MTG) towards node 1 with the added virtual node 1 and two virtual links in dotted lines.

An existing node based routing algorithm can be applied for traditional IP forwarding on the directed graph $\mathcal{G}_u$ to extract routing entries at each node in $\mathcal{V}$ towards destination u. The resulting routing table at each node is the actual routing table for each incoming interface.

However, a more robust interface based routing for IP networks can be applied using iNHOR. For instance, let $\mathcal{G}_d = (\mathcal{V}_d, \mathcal{E}_d)$ be the modified transformed graph for the destination d, which is calculated from the given network topology. A routing function for destination d is determined using $R_d = (V, E_d)$ where $V = \mathcal{V}_d$ and $E_d \subset \mathcal{E}_d$. In $R_d$, node j is called a next-hop of node i if there exists a directed link between node i and node j. $R_d$ will be a DAG rooted at destination d.[2]

[2] $R_d$ is also used to denote this DAG.

Looking at the assignment of next-hops for each destination individually without a loss of generality, it can be seen that the routing function $R_d$ contains all valid paths to d, each of which is a sequence of nodes from the specific source to d. At each node, the packet is forwarded to a next-hop in such a sequence.

Permutation Routing can be used as a tool to find such sequences with the goal of realizing iNHOR. This can be seen through the following definitions.

Definition 4:

For a given MTG towards d, $\mathcal{G}_d = (\mathcal{V}_d, \mathcal{E}_d)$, a permutation P of nodes is an arrangement of all nodes in $\mathcal{V}_d$ into a particular order.

Writing j<i to denote that j occurs before i in P, the goal is to construct permutations that realize a certain routing strategy.

Definition 5:

A permutation P is a permutation routing for $R_d$ if all next-hops of each node occur before it in P: $\forall (i \to j) \in E_d$; j<i.

According to this definition, the destination node d will always be the first node in a routing permutation for $R_d$. Nodes further out in the routing permutation will be topologically farther from the destination. Following lemma confirms the existence of such sequence of all nodes in $R_d$.

Lemma 1:

Any loop-free routing function $R_d$ can always be represented by a sequence of nodes in which d is at the left-most position.

Proof:

A loop-free routing function $R_d = (V, E_d)$ is a DAG, rooted at d. Let arrange $i \in V$ into a sequence such that if $E_d$ contains a directed link (i→j), then j appears before i in that sequence. Such an arrangement can be calculated by a topological sort algorithm.

Destination $d \in V$ is the only node that does not have any outgoing links. Following the above ordering, node d has been placed at the left-most position of the sequence.

In general, there could be more than one valid permutation routing for one routing function $R_d$. Starting with a permutation routing P, another permutation routing P' can be generated by swapping two consecutive nodes that are not connected by a directed link to each other.

In the reverse process, routing tables can be generated from a permutation routing, given a forwarding rule that defines the relationship between neighboring nodes. A greedy forwarding rule has been used for constructing the routing table in the present example. This rule causes all directional neighbors of a node that occur before it in the routing permutation to be installed as next-hops. This will maximize the potential for load balancing and failure recovery. More restrictive forwarding rules could also be considered, which would result in a sparser DAG. This can sometimes be beneficial in order to avoid excessively long paths, or to limit the number of next-hops for a particular destination.

Since permutation routing has been proven to represent a routing function, such routing function will be identified when its corresponding permutation routing is constructed. Moreover, permutation routing can realize iNHOR. However finding this permutation routing is an NP-hard problem. Thus, an algorithm is needed to produce permutation routings that approximate iNHOR. This algorithm is described as follows.

For instance, with respect to a generic algorithm, let $P = \{p_1, p_2, \ldots, p_{\mathcal{N}'}\}$ be a set of $\mathcal{N}'$ variables in a fixed order from $p_1$ to $p_{\mathcal{N}'}$, with respective domains $D = \{D_1, D_2, \ldots, D_{\mathcal{N}'}\}$. $D_i$ is referred to as the candidate set for each variable $p_i$. A candidate set consists of the nodes that can be assigned to variable $p_i$. Note that $\mathcal{N}'$ is the number of nodes in the MTG.

A routing permutation P is constructed by successively assigning a node $u \in D_i$ to each variable $p_i$. Such assignment is said to be valid if it satisfies a specific constraint function C(u) which is defined to realize the selected routing objective.

Figure 13:
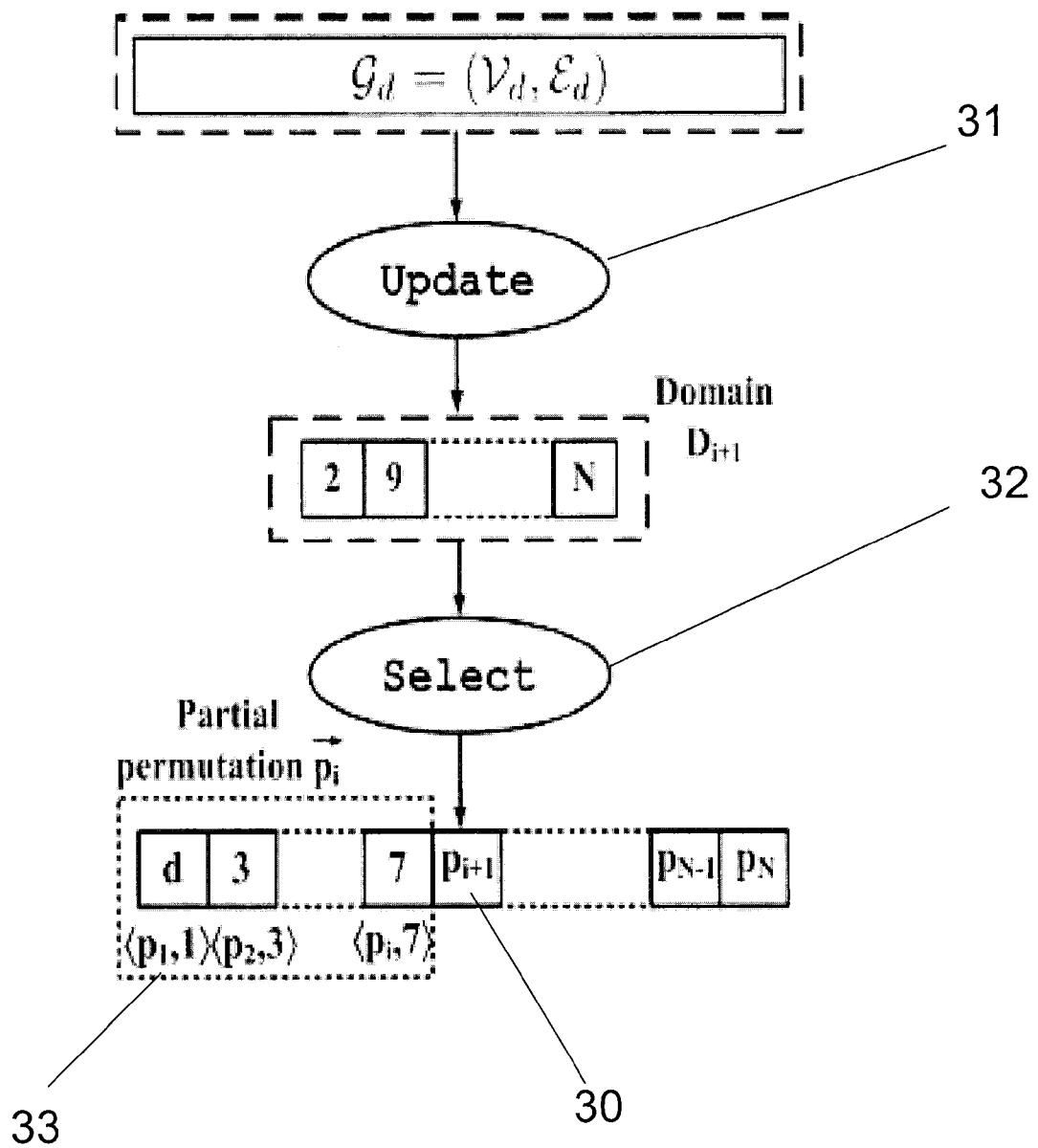
FIG. 13 illustrates the basic assignment procedure for a backtracking algorithm in the present embodiment.

FIG. 13 illustrates the basic assignment procedure for variable $p_{i+1}$ 30 in which two key functions Update 31 and Select 32 work as filters to control the assignment. Like reference numbers with FIG. 3 have been used as the backtracking algorithm used in the present embodiment is the same. In FIG. 13, each pair $\langle p_i, u_i \rangle$ 33 represents an assignment of the node $u_i$ to variable $p_i$. The assignment of nodes to a subset of variables $\{p_1, p_2, \ldots, p_i\} \subseteq P$ given by $\{\langle p_1, u_1 \rangle, \ldots, \langle p_i, u_i \rangle\}$ is called partial routing permutation with i nodes. For simplicity, this is abbreviated to $\vec{p}_i$.

This basic assignment procedure has been embedded into the backtracking algorithm (Algorithm A) shown below to obtain the routing permutation P. The algorithm calls function Select 32 (with built-in constraint function C(u)) which goes through $D_i$ to find a valid node for the current variable $p_i$ (line 6). If Select 32 succeeds in finding a valid assignment, the algorithm calls function Update 31 to generate domain $D_{i+1}$ (line 11) and proceeds to next variable $p_{i+1}$. Otherwise, a backtrack step will be executed to revisit the variable $p_{i-1}$ (line 8). The algorithm terminates if a routing permutation P of $\mathcal{N}'$ nodes, also denoted by $p_{\mathcal{N}'}$, is found or a failure notification returns if all backtracks are examined but no solution is found under C(u).

---

ALGORITHM A

Input: MTG $\mathcal{G}_d = (\mathcal{V}_d, E_d)$
Output: Either a solution or failure notification
1   $\mathcal{V}'_d \leftarrow \mathcal{V}_d \setminus \{d\}$
2   i ← 1
3   $D_i \leftarrow \{d\}$
4   $D'_i \leftarrow D_i$
5   while $1 \leq i \leq \mathcal{N}'$ do
6   |       $p_i \leftarrow$ Select
7   |       if $p_i$ = null then
8   |       |       i ← i − 1
9   |       else
10  |       |       i ← i + 1
11  |       |       Update
  |       —
12  if i = 0 then
13  |       return failure
14  else
15  |       return $\vec{P}_{\mathcal{N}'}$

---

If the constraint function C allows it, the backtracking algorithm will find one permutation routing P among all possible solutions by searching through the search space shaped by the number of variables in P and their domains of values. The complexity of backtracking algorithm has a wide variety.

As was discussed in the first embodiment above, when no backtrack step is needed (backtrack-free), the complexity is $O(t \times \mathcal{N}')$ where t is the total computational complexity of functions Update and Select. In another extreme, if there is only one solution and the "wrong" choice is always made, the complexity would be $O(t \times \mathcal{N}'!)$. Hence, it is important guide the search to avoid exploring the entire search space. Two main mechanisms are used to reduce the search space:

1) C(u) should be simple to reduce the computational complexity.
2) Domain $D_i$ can be limited by taking C(u) into account.

In the present embodiment, a constraint function C(u) is used to approximate iNHOR, this approximation is called AiNHOR. From the obtained C(u), corresponding permutation routing is constructed by using described algorithm framework.

With regard to the constraint function C(u), let G=(V, E) denote the given network topology and $R_d^{spt}=(V, E_d^{spt})$ be the SPT towards the destination d. To construct permutation routing for iNHOR, both G and $R_d^{spt}$ will be transformed into new directed graphs with respect to Def. 2 and Def. 3. The resulting graphs for the destination d are $\mathcal{G}_d = (\mathcal{V}_d, \mathcal{E}_d)$ and $R_d^{spt}$, respectively. In addition, $R_d^{spt} \subseteq E_d$ (according to Theorem 1) and $R_d^{spt}$ is a DAG towards d (according to Theorem 2). $R_d^{spt}$ is called the transformed shortest path tree (TSPT).

The partial routing permutation $\vec{p}_i$ represents a loop-free routing sub-graph towards destination d, denoted by $R_d^i = (V(\vec{p}_i), E_d(\vec{p}_i))$ where $V(\vec{p}_i)$ is the set of i nodes in $\vec{p}_i$ and $E_d(\vec{p}_i)$ is the set of directed edges formed by applying the greedy forwarding rule defined above on $\vec{p}_i$. To achieve a robust routing while containing $R_d^{spt}$, the node selected for variable $p_{i+1}$ to form the partial routing permutation, $\vec{p}_{i+1}$ should be the node with the maximum number of directional neighbors already placed in $\vec{p}_i$. In addition, $\vec{p}_i$ must contain $R_d^{spt,i+1}$ which is a subset of TSPT after the (i+1)-th assignment.

Correspondingly, the number of directed edges of the routing sub-graph formed by the partial routing permutation $\vec{p}_{i+1}$, resulting from the assignment $\langle p_{i+1}, u \rangle$, are maximized:

$$|E_d(\vec{p}_{i+1})| = \max_{\forall u \in D_{i+1}} |E_d(\vec{p}_i, \langle p_{i+1}, u \rangle)| \quad (1A)$$

and $$R_d^{spt,i+1} \subseteq R_d^{spt} \quad (2A)$$

For a more efficient implementation, a counter c[u] is maintained for each node u. This counter denotes the number of outgoing links from u to $\vec{p}_i$. In other words, c[u] corresponds to the number of next-hops node u will have if it is selected as the next assignment in the routing permutation. The constraint function C(u) is derived to realize expression (1) and (2) as follows:

$$C(u) = \begin{cases} \text{True} & \text{if } c[u] = \max_{\forall v \in D_{i+1}} c[v] \\ & \text{and } R_d^{spt,i+1} \subseteq R_d^{spt} \\ \text{False} & \text{otherwise} \end{cases}$$

Constraint function C(u) is complicated and thus may not result in an efficient search. Thus, C(u) can be made more simple by not using expression (2A) in C(u). Instead, expression (2A) will be used to reduce domain $D_{i+1}$ in expression (1A). Let $D^*_{i+1}$ be the reduced domain readily for assignment (i+1)-th, the new constraint function C*(u) is re-written as follows:

$$C^*(u) = \begin{cases} \text{True} & \text{if } c[u] = \max_{\forall v \in D^*_{i+1}} c[v] \\ \text{False} & \text{otherwise} \end{cases}$$

Because $D^*_{i+1}$ is usually smaller than $D_{i+1}$, the search space would be reduced.

The derivation of domain $D^*_i$, from which a node satisfying C*(u) is selected is described as follows.

In a connected graph, expression (1A) implies that the domain $D_{i+1}$ includes all nodes that have at least one topological neighbor (following the directed edge) in $\vec{p}_i$. The domain is, therefore, updated following the recursive relation:

$$D_{i+1} = D_i \cup \{v \in \mathcal{V}_d | (v \to u) \in \mathcal{E}_d\} / \{u\} \quad (3A)$$

where u is the node that has been assigned to variable $p_i$ in the i-th assignment.

Domain $D_{i+1}$ is usually large when i increases. Expression (2A) is used to divide $D_{i+1}$ into smaller domains, providing a more efficient search. Let $D_{i+1}^a$ be the subset of $D_{i+1}$ such that $D_{i+1}^a$ contains all the candidate nodes on the TSPT which have all their shortest path next-hops towards d already placed in $\vec{p}_i$. Let $c_{sp}[v]$ be the number of shortest path next-hops placed in $\vec{p}_i$ and $n_{sp}[v]$ be the total number of shortest path next-hop that can be calculated from $R_d^{spt}$ of node v. The domain $D_{i+1}^a$ for variable $p_{i+1}$ follows the recursive relation:

$$D_{i+1}^a = D_i^a \cup \{v \in D_{i+1} | c_{sp}[v] = n_{sp}[v]\} \setminus \{u\} \quad (4)$$

where u is the node that has been assigned to variable $p_i$ in the i-th assignment.

The rest of $D_{i+1}$ includes nodes on the TSPT different from those in $D_{i+1}^a$ and nodes not on the TSPT. Let $D_{i+1}^b$ be the latter, it is calculated as follows:

$$D_{i+1}^b = D_i^b \cup \{v \in D_{i+1} | v \notin R_d^{spt}\} \setminus \{u\} \quad (5A)$$

where u is the node that has been assigned to variable $p_i$ in the i-th assignment.

| | Function Update |
|---|---|
| 1 | $D_i \leftarrow D_i \setminus \{u\}$ |
| 2 | for $v \in \mathcal{V}_d$ such that $(v \rightarrow u) \in E_d$ do |
| 3 | $\quad$ c[v] = c[v] + 1 |
| 4 | $\quad$ if $v \notin D_i$ then |
| 5 | $\quad\quad$ $D_i \leftarrow D_i \cup [v]$ |
| 6 | $D_i^a \leftarrow D_i^a \setminus [u]$ |
| 7 | $D_i^b \leftarrow D_i^b \setminus [u]$ |
| 8 | for $v \in D_i$ do |
| 9 | $\quad$ if $(v \rightarrow u) \in R_d^{spt}$ then |
| 10 | $\quad\quad$ $c_{sp}[v] \leftarrow c_{sp}[v] + 1$ |
| 11 | $\quad\quad$ if $c_{sp}[v] = n_{sp}[v]$ then |
| 12 | $\quad\quad\quad$ $D_i^a \leftarrow D_i^a \cup \{v\}$ |
| 13 | $\quad$ else |
| 14 | $\quad\quad$ $D_i^b \leftarrow D_i^b \cup \{v\}$ |
| 15 | $c_{max}^a \leftarrow \max \forall v \in D_i^a \, c[v]$ |
| 16 | $c_{max}^b \leftarrow \max \forall v \in D_i^b \, c[v]$ |

The described update domain process is implemented in the Update function. First node u, which has just been added in the permutation routing, is removed from $D_i$ in line 1 (and also from $D_i^a$ and $D_i^b$ in lines 6 and 7, respectively). The for loop of lines 2-5 considers all nodes v in $\mathcal{V}_d$ such that $(v \rightarrow u) \in \mathcal{E}_d$ to update $D_i$ following (3A) and counter c[v]. Another for loop of lines 8-14 goes through all nodes in $D_i$ and divides them in two groups: $D_i^a$ following (4A) and $D_i^b$ following (5A). As an input for constraint function C*(u), $\max_{\forall v \in D_i^a} c[v]$ and $\max_{\forall v \in D_i^b} c[v]$ is calculated in lines 15-16.

One node from one of two domain groups is then selected that satisfies C*(u) and is placed in the permutation. Two strategies are utilized: first choosing a node in $D_i^a$ if it is not empty or first choosing a node in $D_i^b$ if it is not empty. The resulting routing in both cases will contain TSPT. However, the latter will increase the number of next-hops for primary links because it places in the permutation all possible secondary links, which can become next-hops for primary links, before primary links. This selection strategy is implemented in the Select function.

| | Function Select |
|---|---|
| 1 | if $D_i^b \neq \emptyset$ then |
| 2 | $\quad$ $D_i'^b \leftarrow D_i^b$ |
| 3 | $\quad$ while $D_i'^b \neq \emptyset$ do |
| 4 | $\quad\quad$ an arbitrary node u from $D_i'^b$ |
| 5 | $\quad\quad$ $D_i'^b \leftarrow D_i'^b \setminus \{u\}$ |
| 6 | $\quad\quad$ if $c[u] = c_{max}^b$ then |
| 7 | $\quad\quad\quad$ return u |
| 8 | else |
| 9 | $\quad$ $D_i'^a \leftarrow D_i^a$ |
| 10 | $\quad$ while $D_i'^a \neq \emptyset$ do |
| 11 | $\quad\quad$ an arbitrary node u from $D_i'^a$ |
| 12 | $\quad\quad$ $D_i'^a \leftarrow D_i'^a \setminus \{u\}$ |
| 13 | $\quad\quad$ if $c[u] = c_{max}^a$ then |
| 14 | $\quad\quad\quad$ return u |
| 15 | return null |

The Select function will realize constraint function C*(u) with two steps in a strict order. The number of next-hops for primary links is first maximized by going through sub-domain $D_i^b$ to select a node that satisfies C*(u) (line 3-7). Note that C*(u) is simply a comparison between c[u] and pre-computed $c_{max}^b$ (line 6). If $D_i^b$ is empty, a node in $D_i^a$ is selected that satisfies C*(u) (lines 10-14). Again, C*(u) is simply a comparison between c[u] and pre-computed $c_{max}^a$ (line 13). The returned node u is assigned to variable $p_i$ in Algorithm A.

The computational complexity of AiNHOR is the product of the average number of operations to make a move between two successive states and the total number of states visited in the search space.

Proposition 1:

The selection rule defined in function Select gives a backtrack-free algorithm for all connected input directed graph.

Proof:

The proof is by contradiction. Assume that the algorithm with the selection rule defined in function Select is not backtrack-free. This could happen in two following cases:

(i) C*(u) returns False at some iteration for all $u \in D_i^b$ or for all $u \in D_i^a$ if $D_i^b$ is empty. That can not happen because all nodes in domain $D_i^b$ or domain $D_i^a$ always have at least one next-hop in $\vec{p}_i$.

(ii) Both $D_i^b$ and $D_i^a$ are empty in some iteration. It is shown here that both $D_i^b$ and $D_i^a$ can never be empty at the same time before all nodes have been placed in the permutation. If this is the case, there exists only candidate nodes on TSPT, but do not have all its shortest path descendants in $\vec{p}_i$. In other words, the shortest path DAG $R_d^{spt}$ can be followed from any node that has not been placed and always find a next-hop node that is not placed in $\vec{p}_i$. But this is impossible: since $R_d^{spt}$ is connected and loop-free, any path along the shortest path DAG will eventually reach the destination, which is the first node that was placed in the permutation.

The computational complexity of AiNHOR towards one destination includes two parts: the shortest path calculation using Dijkstra's algorithm and routing permutation construction. Due to the property of backtrack-freedom, with sparse topologies the complexity of second part towards one destination would be $O(|\mathcal{E}_d| + |E_d^{spt}| + \mathcal{N}' \times |D|)$ where |D| denotes the average size of the domains. In dense topologies, the total complexity of calculating routing permutations for all destinations can approach $O(\mathcal{N}'^3)$ where $\mathcal{N}' = M+1$ (M is the number of directed links in the given topology).

The backtrack-free property also gives a low memory consumption because it does not need to store temporary partial routing permutations.

The presently disclosed algorithms have been applied to a large area network scenario and the advantageous results have been measured. In particular, the performance of the proposed algorithms have been evaluated by measuring the routing robustness of AiNHOR in terms of the improved number of next-hops for primary interfaces and for secondary interfaces. Since adopting secondary interfaces for packet transportation can lead to path inflation, the hop-count path length distribution has also been taken into account with various allowed number of next-hops for each incoming interface. The computational complexity of the schemes has also been considered by verifying running time for the algorithms to generate routing tables for all I-D pairs.

Similar to the first embodiment noted above, six representative network topologies from the Rocketfuel project have been considered for evaluation. For each topology, all nodes that will not contribute to routing (e.g. single degree node) have been removed. The refined topologies are bi-connected graphs, listed in Table A in increasing order of their average node degrees.

TABLE A

Network topologies

| AS | Name | Nodes | Links | Avg. Degree |
|---|---|---|---|---|
| 1221 | Telstra(au) | 50 | 194 | 3.88 |
| 3967 | Exodus(us) | 72 | 280 | 3.89 |
| 1755 | Ebone(eu) | 75 | 298 | 4.00 |
| 3257 | Tiscali(eu) | 115 | 564 | 4.90 |
| 6461 | Abovenet(us) | 129 | 726 | 5.60 |
| 1239 | Sprint(us) | 284 | 1882 | 6.62 |

The transformation rules are applied on each topology to achieve new graphs from which permutation routing of interfaces is calculated. Table B shows six transformed graphs in increasing order of their average node degrees.

TABLE B

Transformed graphs

| AS | Name | Nodes | Links | Avg. Degree |
|---|---|---|---|---|
| 1755 | Ebone(eu) | 298 | 1432 | 4.80 |
| 3967 | Exodus(us) | 280 | 1372 | 4.90 |
| 1221 | Telstra(au) | 194 | 1030 | 5.30 |
| 6461 | Abovenet(us) | 726 | 5434 | 7.50 |
| 3257 | Tiscali(eu) | 564 | 4378 | 7.76 |
| 1239 | Sprint(us) | 1882 | 25988 | 13.81 |

ECMP and LFA each base a path calculation on link weights. To obtain realistic link weight settings, a local search heuristic is implemented to optimize link load objective function under traffic matrix generated by the gravity model. For AS1239, unit link weights are used, because the local search heuristic does not scale to a topology of this size. Note that permutation routing of links will work with any link weight settings. This approach is used to show the performance with "typical" link weights.

The AiNHOR scheme will now be compared with standard shortest path routings ECMP, LFA and ANHOR-SP scheme described in the first embodiment above.

The robustness of all mentioned routing methods are evaluated in terms of links, instead of nodes. Similar to what is described above with regard to permutation routing of interfaces, directed link (i→j) is called the primary outgoing interface, or simply primary link, towards destination d if node j is the next-hop of node i and (i→j) is on the SPT towards d. Otherwise, j is called the secondary next-hop of node i and (i→j) is a secondary link towards d.

Figure 14:
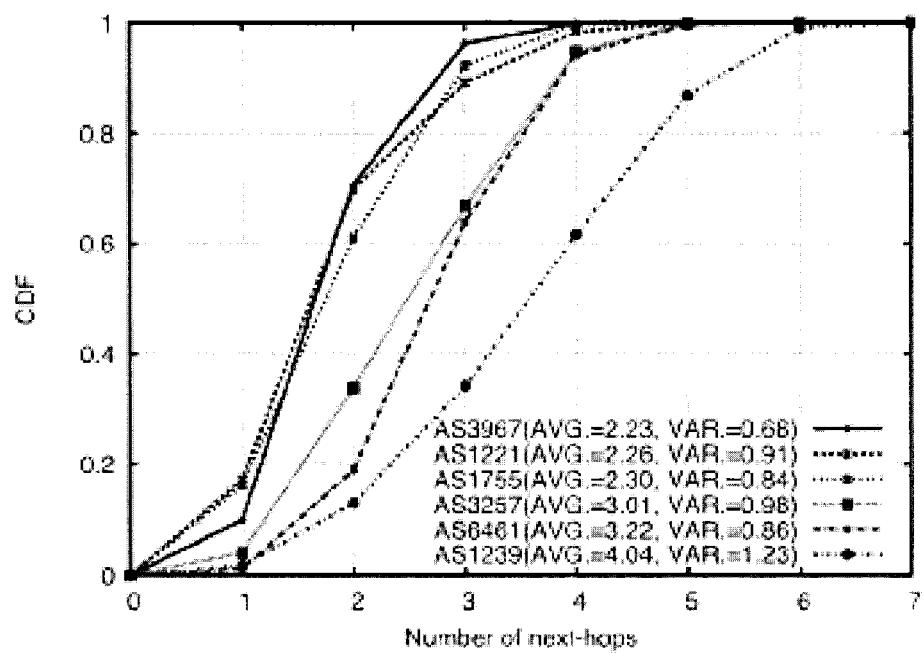
FIG. 14 illustrates a graph showing the next-hop distribution of all interface destination (I-D) pairs.

FIG. 14 shows CDF curves, average and variance values for the number of next-hops at each interface for all I-D pairs in the 6 topologies. It can be observed that both average and variance values are rather small compared to corresponding node degrees of transformed graphs. For increased robustness and load-balancing, it is, however, good for those values not to be significantly high.

Moreover, there are good reasons to limit the number of next-hops that are installed in the forwarding tables at each interface for a particular destination. Installing more next-hops will not give much benefit with respect to robustness or load-balancing. Adding more next-hops will, however, require faster memory in the forwarding table, and may lead to the unnecessary inclusion of paths that are much longer than the shortest path. Therefore, those interfaces with high number of next-hops will likely have some of their next-hops involved in packet forwarding. Thus network resources are wasted when next-hop distribution, resulting from a routing, is more spread out.

Another important property of AiNHOR is the ability to provide high fraction of number of interfaces with at least two next-hops. In FIG. 14, AiNHOR offers above 97% of all interfaces that have at least two next-hops for topologies with node degrees greater than 4. Those fractions are lower for weak-connected networks such as AS1221 and AS1755. As stated earlier, a few interfaces, which are on the shortest paths for packet forwarding, are selected when network are fault-free. The primary interfaces are then distinguished from secondary interfaces and are evaluated separately.

Figure 15:
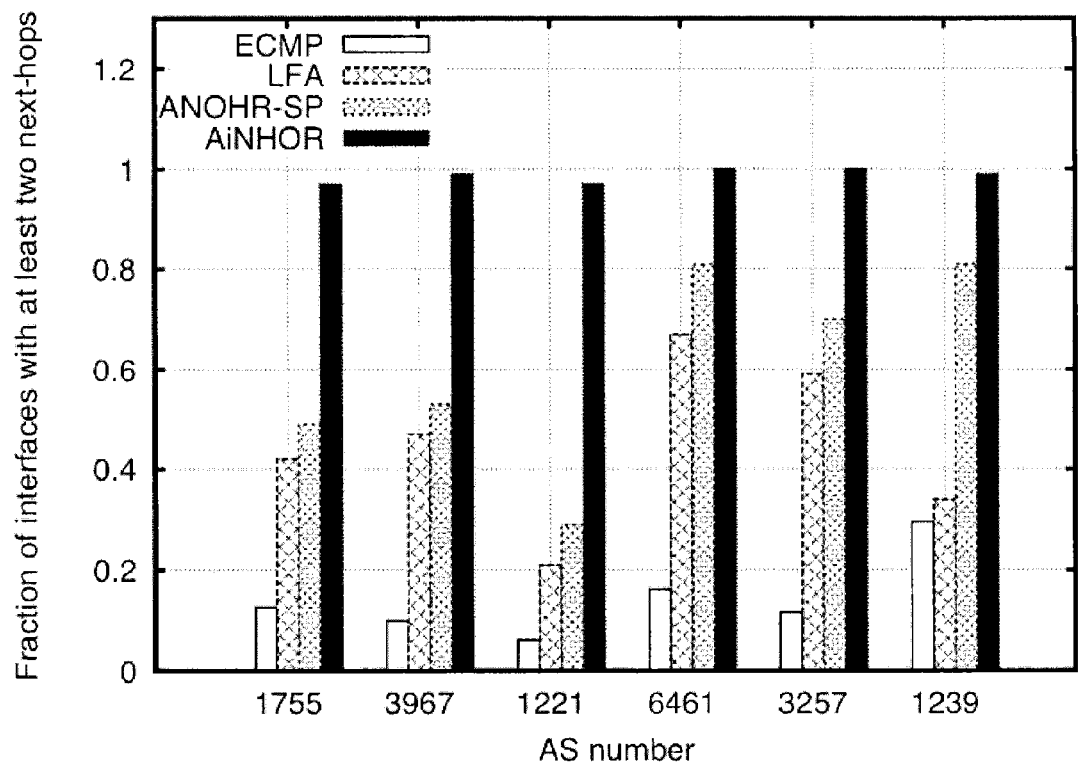
FIG. 15 illustrates a fraction of primary interface destination pairs with at least two routing options.

FIG. 15 shows fraction of primary interfaces with at least two next-hops under the AiNHOR method. It can be observed that the fractions vary slightly across six topologies and are above 97%. Specifically, AS6461 and AS3257 provide 100% primary links with two next-hops. The good results come from the properties of interface based routing and its operation on the bi-connected graph. For instance, a node with at least two outgoing links will have an increased chance of having at least two next-hops.

AiNHOR gives a clear improvement over LFA and even an improvement over ANHOR-SP. It shows that permutation routing of interfaces can provide significant gain compared to existing solutions, while being compatible with shortest path routing with realistic link weight settings.

Figure 16:
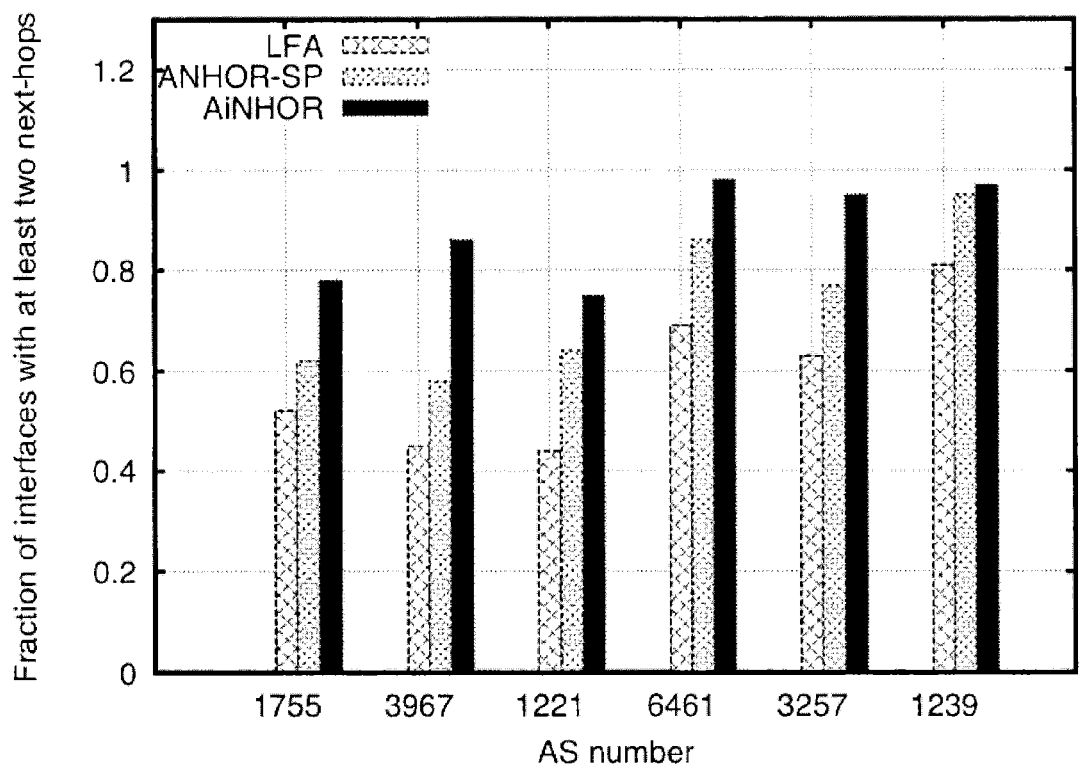
FIG. 16 illustrates a fraction of secondary interface destination pairs with at least two routing options.
Figure 17A:
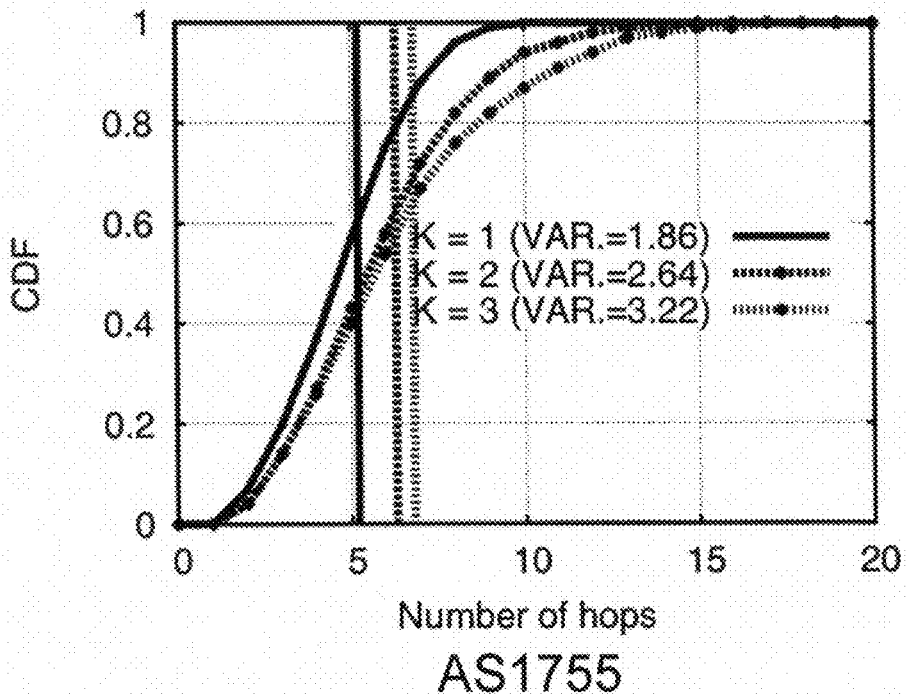
FIGS. 17A-F illustrate the path length distribution and average path length in hops.
Figure 17B:
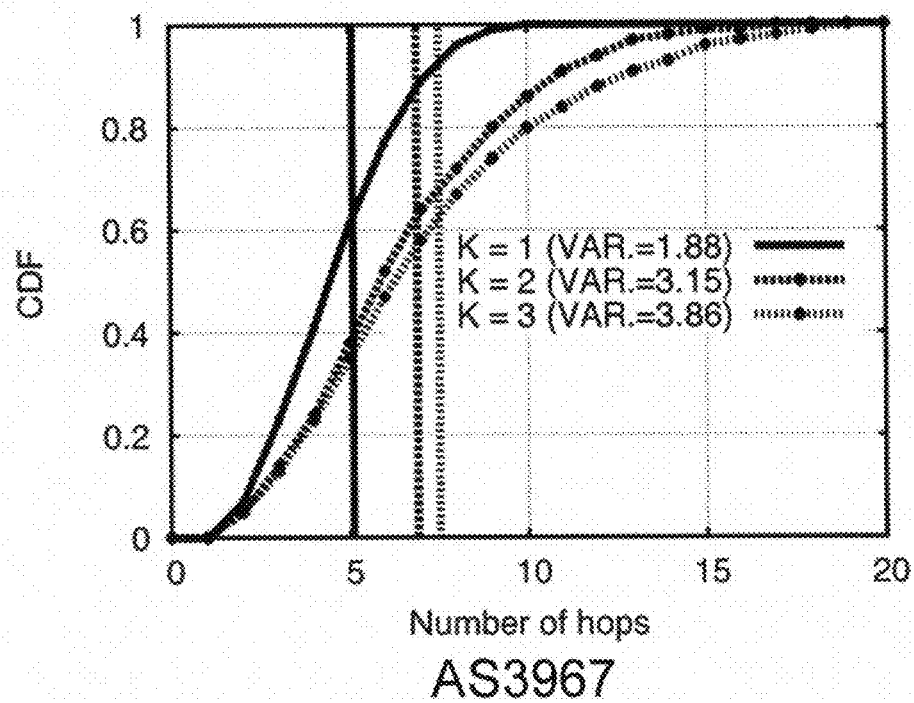
Figure 17C:
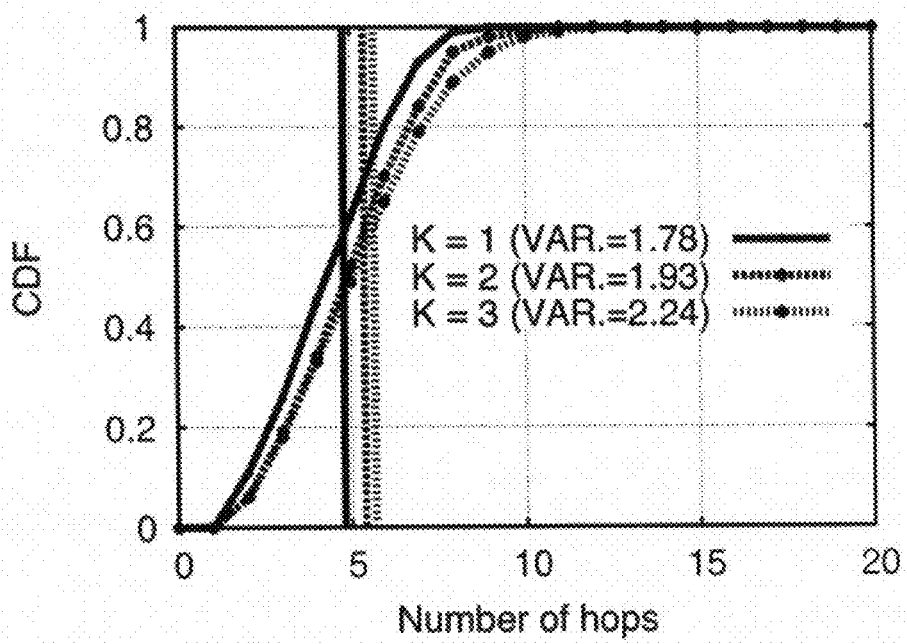
Figure 17D:
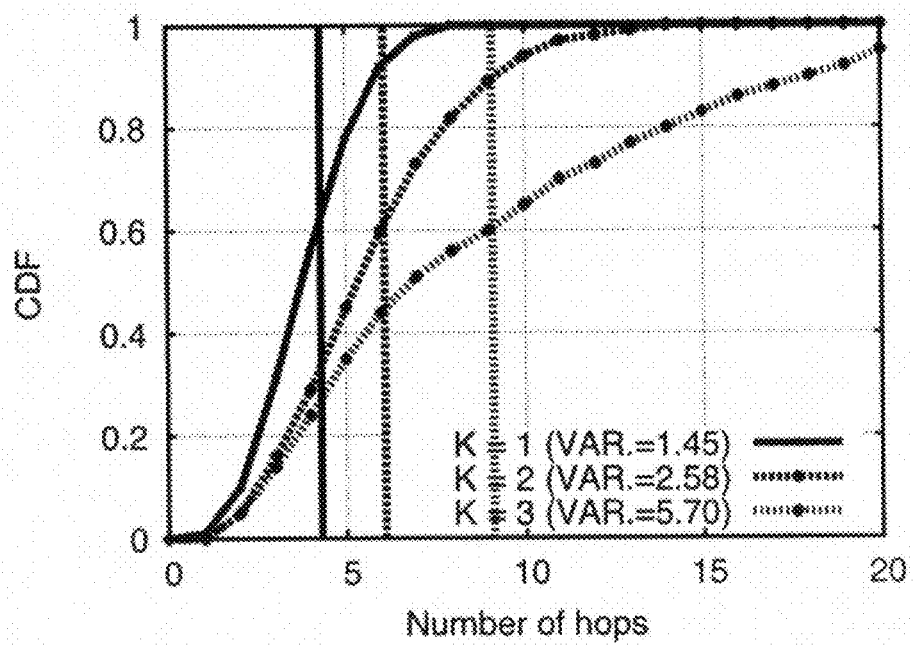
Figure 17E:
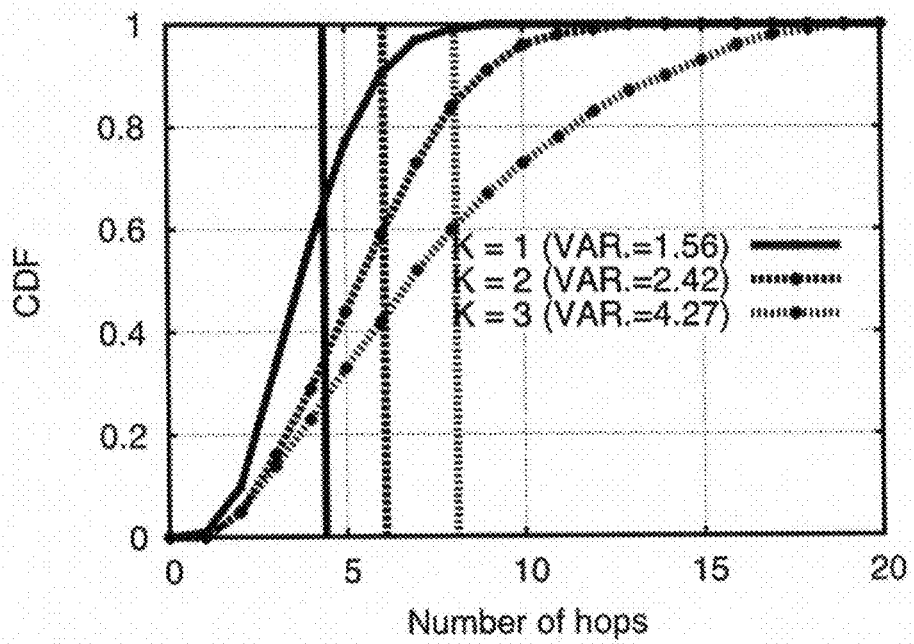
Figure 17F:
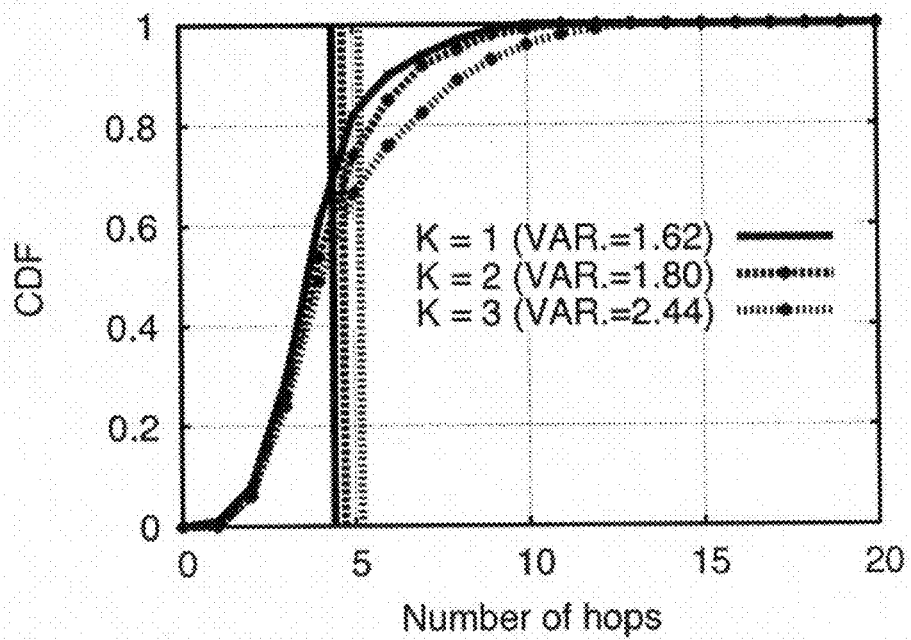

To increase fault-tolerant capability, secondary interface also will have at least two next-hops. Those next-hops might be either primary interfaces or secondary interfaces. FIG. 16 shows fractions of secondary interface with at least two next-hops of LFA, ANHOR-SP and AiNHOR. It can be observed that AiNHOR also is an improvement over LFA and ANHOR-SP. Note that the fractions of secondary interfaces are lower than those of primary interfaces shown in FIG. 15. This result reflects the optimization strategy where the fractions of the primary interfaces are maximized before those of the secondary interfaces.

AiNHOR also has significantly improved the multipath capability that allows for more load balancing or fault-tolerance. However, adopting secondary interfaces for packet forwarding possibly leads to high path inflation which can increase path failure probability and traffic load over non-shortest paths. For this reason, the distribution of path length for different allowed numbers of next-hops for each interface, denoted by K has been considered. Specifically, the path lengths in terms of hop counts have been reviewed, since this metric is independent of the link weight settings. Note that the longest path corresponding to K for each S-D pair has been measured. In other words, the upper bounds for path length for each S-D pair have been shown even though packets might travel on shorter paths in practice (where all primary links from source to the destination do not simultaneously fail).

FIG. 17 shows the distributions of path length in hop for K=1, 2 and 3. For K=1, all paths from source nodes to destinations will take the shortest paths because each node has at least one primary interface on the shortest path tree. The average value of shortest path length is the left-most vertical line in each sub-figure. Increasing K to 2 and 3 will allow more longer paths and therefore shift the average path length (vertical lines) to the right. Of all topologies, the average values only increase from 7.5% (AS1239) to 40% (AS6461) for K=2 and up to 100% (AS6461) for K=3. These path lengths are still comparable to those of shortest path routing.

The time complexity of the proposed algorithms for generating routing tables depends on the numbers of nodes and links of the given input graph and how well the sizes of the candidate sets are limited. Criteria to minimize those sets at each assignment have been implemented in the Update function.

Figure 18:
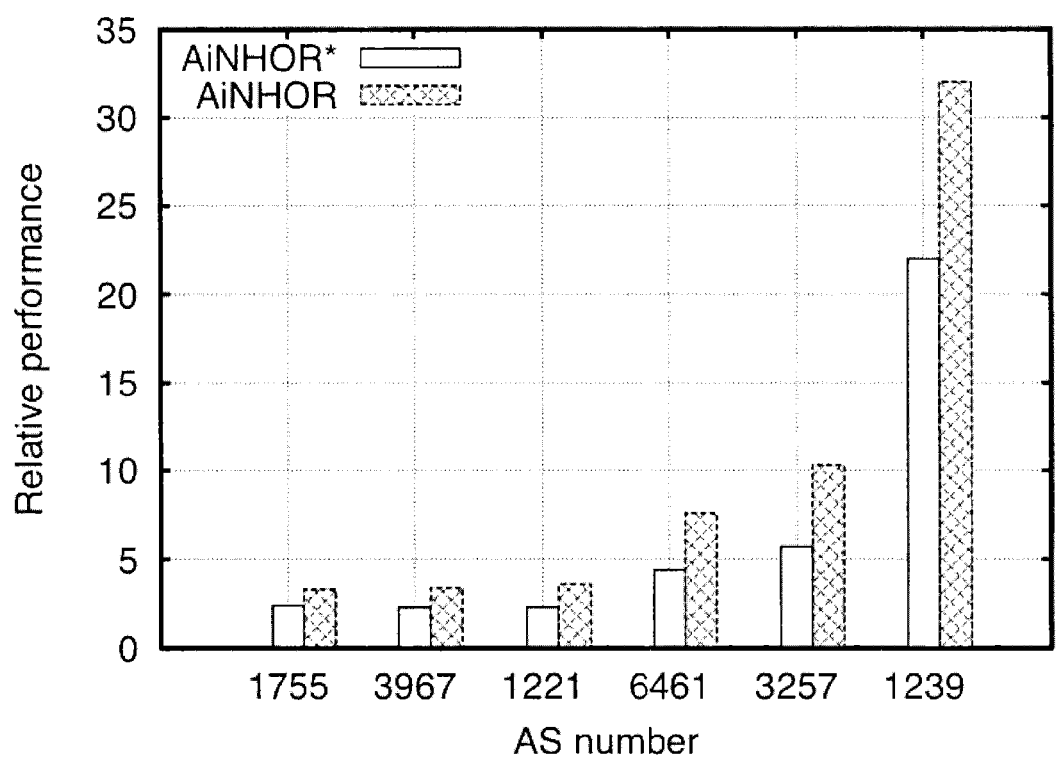
FIG. 18 illustrates a comparison of running time between two different routing schemes across multiple topologies.

FIG. 18 shows the relative running time of the AiNHOR method with respect to ECMP across six topologies. The AS topologies are listed in an increasing order of node degrees. The results are achieved with an Intel Core 2 CPU 6300 @ 1.86 GHz machine. For the first five topologies, the relative running times are less than ten times. The result for AS1239 is more than 30 times worse. Increase in both the number of nodes and the number of directed links in the transformed graph contribute to this increase. However, using this topology is still computationally feasible.

The running time can be reduced by not including shortest paths in the routing. Such a routing is denoted as AiNHOR*. In FIG. 18, AiNHOR* improves the running time by up to 30% for AS1239.

Figure 19A:
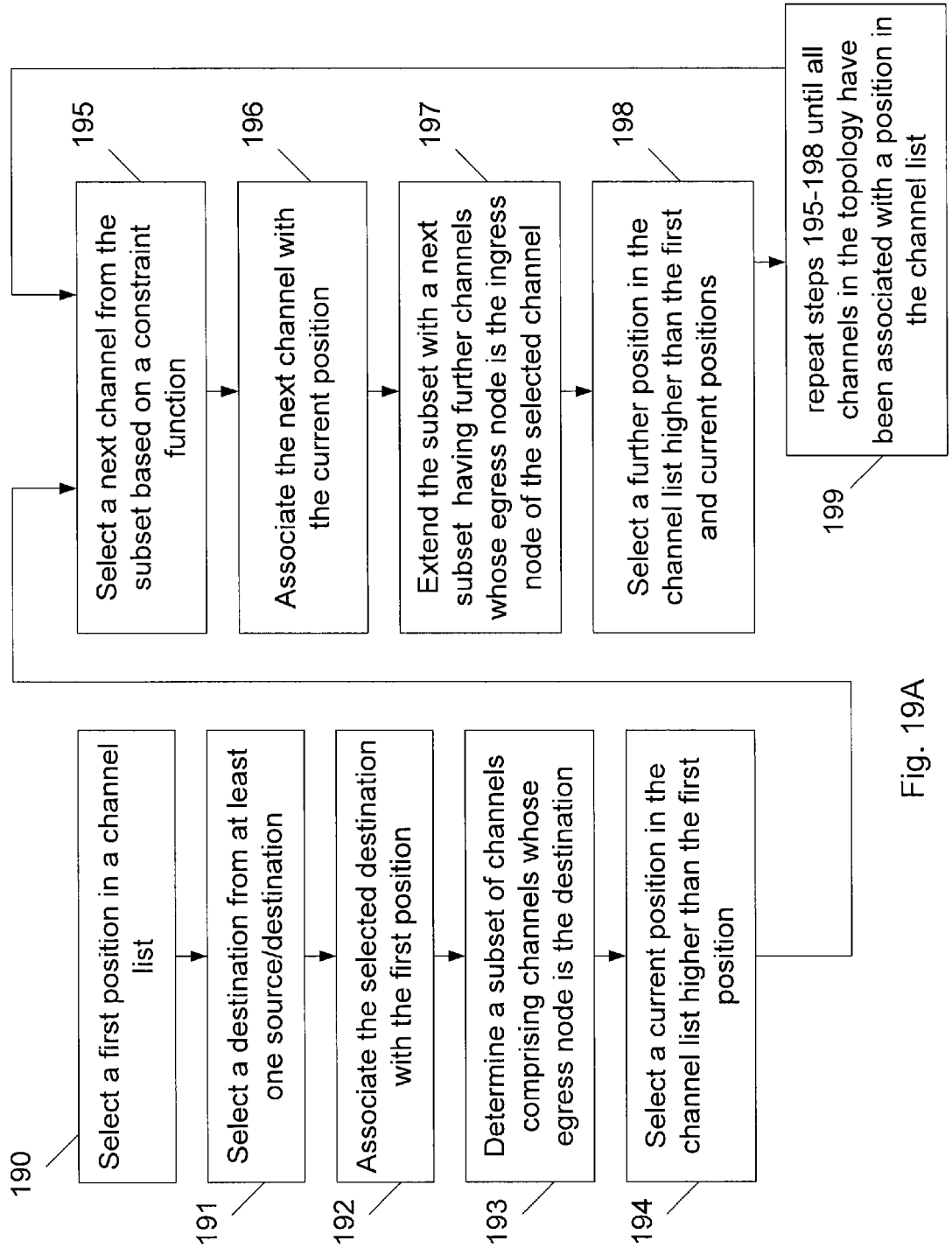
FIG. 19A illustrates a method of implementing permutation routing according to one embodiment of the present disclosure.

A method of implementing permutation routing, and particularly of implementing the generation of the channel list to be used to determine paths, is described with respect to the flow chart illustrated in FIG. 19A.

In step 190, a first position in a channel list is selected.

In step 191, a destination is selected from the at least one source/destination pairs.

In step 192, the selected destination is associated with the first position.

In step 193, a subset of channels is determined, the subset comprising channels whose egress node is the destination.

In step 194, a current position is selected in the channel list higher than the first position.

In step 195, a next channel from the subset is selected based on a constraint function $C(u)$ or $C^*(u)$.

In step 196, the next channel is associated with the current position.

In step 197, for each selected channel in the subset, the subset is extended with a next subset including further channels whose egress node is the ingress node of the selected channel.

In step 198, a further position is selected in the channel list higher than the first and current positions, the further position hereafter being the current position.

In step 199, steps 195-198 are repeated until all channels in the topology have been associated with a position in the channel list.

Once the channel list is determined at least one path connecting a source and a destination is provided based on the channel list. Once the at least one path is determined these one or more paths can be stored in one or more routing tables in respective routers/switches. The permutations can be obtained using a distributed algorithm that creates the routing tables in the routers/switches. Hybrid solutions of this is also available. For instance, the paths can be decided by applications using the paths. For example, an application for streaming media data, e.g. a film, or a sports event, may result in a choice of different paths than an application for transferring files, such as Dropbox™. It should also be noted that a node list can be created using similar methods.

Figure 19B:
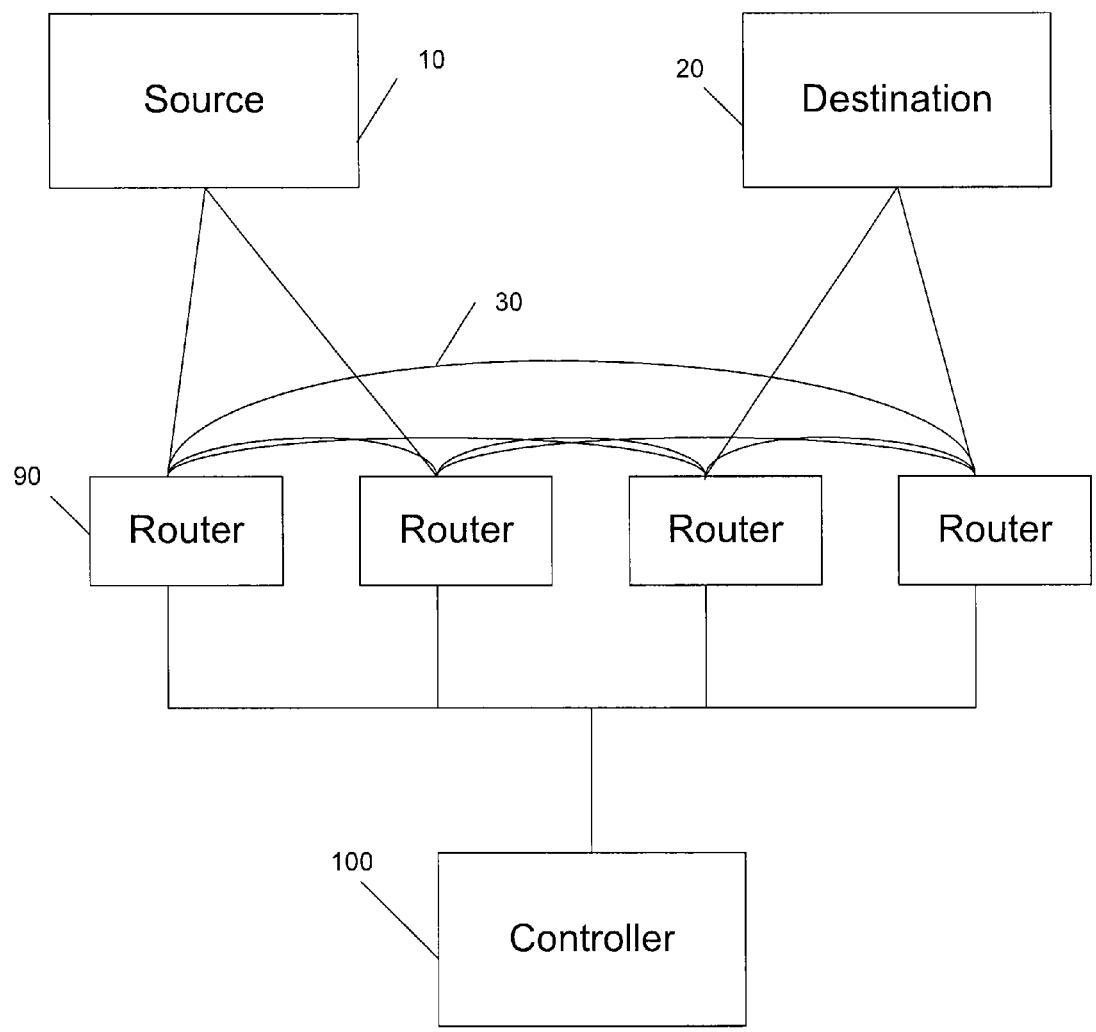
FIG. 19B illustrates a block diagram according to one embodiment of the present disclosure.

FIG. 19B illustrates a microprocessor implemented controller 100 which determines the routes based on the AiNHOR and AiNHOR* schemes. For instance, the controller 100 determines the routes between the source 10 and destination 20 and distributes the determined paths to the routers 90. The controller is programmed based on the above noted schemes. The controller 100 thus maximizes the number of paths between each source 10 and destination 20 pair, such that packets do not loop in the network. This maximization provides toleration of faults in the network and avoids problems created by looping.

With regard to the field of small area networks, the present embodiments present an intelligent routing method designated as dynamic quick reconfiguration (DQR).

The approach described herein does not require virtual channels or any complex reconfiguration protocol to enforce a progressive update of routing tables or use tokens. In addition, it does not require any topology specific or topology agnostic routing algorithm to generate the new routing function. Instead, this functionality is included in the dynamic reconfiguration mechanism in an efficient manner, with a plug-in architecture to easily support specific topologies.

In order to provide an efficient and deadlock free implementation of the DQR mechanism, a data structure is provided for handling channel dependencies in the network. Two channels (first and second) are said to be dependent if the first channel could be held while the second channel is requested.

In one embodiment, in order to create new paths to reconnect the network after a topology change (fault), the reconfiguration mechanism is initially aware of all existing dependencies in the network.

Although other methods of handling channel dependencies are possible, one method for handling channel dependencies is using a Channel Dependency Graph (CDG) which is a directed graph where the vertices V represent channels and the directed edges E represent dependencies from one vertex to another. A possible deadlock is identified as a cycle in the CDG. Using this data structure to create new paths in a network involves checking if any of the new dependencies introduced by the path into the CDG leads to a cycle. The search for a cycle in the CDG has complexity $O(|E|)$. In order to find a new deadlock free path for some source destination pair, it is necessary to explore a number of possible paths and check for cycles in the CDG for every possibility.

For a large topology, the number of possible paths from a single source destination pair is very high. For instance, in a 20×20 mesh, the largest number of shortest paths for a single source/destination pair (where source and destination are located at diagonal corners) is $$\binom{18}{19} = 3.53 \times 10^{10}.$$

The size of the problem is further increased by the fact that, for the existing channel dependencies and the set of topology changes, the only possible deadlock free paths might be non-minimal. This is clearly not a scalable algorithm.

Motivated by this, a "channel list" is introduced. The channel list represents one possible arrangement of all channels in the topology such that any dependency from one channel to another only "points upwards" in the list, i.e. to a channel with a higher position in the channel list (i.e. a higher listed channel list position). Hence, there are no dependencies to the first channel, and there are no dependencies from the last channel.

Figure 20:
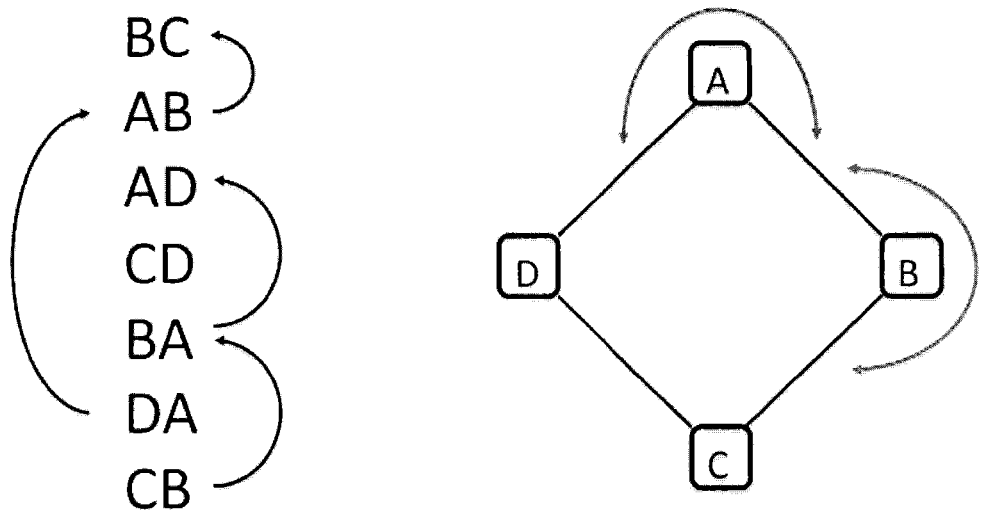
FIG. 20 illustrates a channel list formed based on dependencies from a 4-node ring.

An example channel list for a simple 4-node ring is presented in FIG. 20. In this figure, each channel is denoted by the pair source node/destination node (AB is the channel from A to B).

A channel list can be implemented as an addressable array data structure, in which the elements of the array contain channel identifiers. The elements can in addition contain channel dependencies. Alternatively, the dependencies can be derived from already existing routing tables. The order of the channel list indicates which dependencies are allowable.

It should be noted that a hash or a linked list data structure could be used instead of the array data structure but would perform the same function as the array data structure described herein.

With regard to channel dependencies in the network, there is described input and output channels. An input channel, or output channel, is referred to relative to a switch. Therefore an <input channel, output channel> pair is a pair of channels attached to the same switch, and in such a way that a stream can enter on the input channel and leave the switch through the output channel. The pair <input channel, destination node> is also relative to a switch and a stream, where a stream, whose destination is the destination node, enters the switch through the input channel. The notation <input channel, destination node> captures an element of freedom, in that the output channel from the switch to be taken by this stream is not yet decided. If an <input channel, output channel> pair is obtained, and the information, that the output channel is no longer available (or no longer operational), is obtained, the <input channel, destination node> pair may be considered instead, so that an alternative output channel can be determined.

The <input channel, output channel> pairs in the fault free case come from the streams that the application (such as a parallel computation, a web-server, or other network application) generates, and the paths that the original routing function implies. These pairs are known to (or can be computed by) a fabric manager, which stores original paths. When the fabric manager is informed about a link fault, it can compute which <input channel, output channel> pairs are affected. These pairs are then processed as if they were <input channel, destination node> pairs, while the fabric manager computes new output channels that reconnects the stream. The information about a link fault received by the fabric manager includes a message from a switch reporting to the fabric manager that one of its connected links is not working properly. A fabric manager will then compute/identify all the paths/flows that are affected by the fault.

It is clear that if it is possible to arrange the channels for a topology in a channel list, the routing function that built the dependencies is deadlock free. There cannot be a cycle in a linear sequence of dependencies. The task of arranging the channels initially can be achieved using a linear programming solver. Every dependency in the CDG can be represented as an inequality, where the first channel of a dependency has an index (i.e. position) less than the second channel of the dependency. The linear programming solution to these sets of inequalities is a valid channel list given the channel dependencies and routing algorithm.

The task of arranging the channels can also be achieved by applying a topological sorting algorithm on a CDG, resulting in a linear ordering of channels, also called a topological ordering.

Constructing the channel list is not more efficient than searching for cycles in a CDG. However, once the channel list has been constructed, it serves as a valuable tool for creating new deadlock free paths. In fact, any new path that can be created by moving only upwards in the channel list (i.e. the next hop channel is always above the current channel in the channel list), is by design deadlock free. By combining this property with a path searching algorithm such as Dijkstra's shortest path algorithm, it is possible to find a deadlock free shortest path given the existing dependencies in the channel list in an efficient manner.

The channel lists contain channel identifiers. A channel can conceptually be viewed as a link in the network, each physical link can be (and is often) implemented as a set of virtual channels. In these cases, the channel identifier in a channel list represents a virtual channel.

A channel list arrangement represents only a single possibility out of a large number of possible channel list arrangements. This means that for a given channel list there might not exist a deadlock free path for a specific source/destination pair, even though the path introduces no cyclic dependencies into the CDG. In this case, the fabric manager can check whether certain illegal dependencies may be permitted by rearranging the channel list. To permit a new dependency, the target channel of the new dependency is relocated to a higher position in the channel list. Furthermore, every channel to which the target channel has dependencies that are now below the target channel are also relocated to higher positions. This process continues until the channel list again is valid. The present embodiment describes two algorithms for checking whether a dependency can be permitted in the channel list, and for updating the channel list with the new dependency.

It should be noted that although the channel list is used to construct the routing function, in some cases, an existing routing function can be used as a starting point. For instance, when a well functioning routing function is available for the fault free case, and another function is needed that avoids the use of a faulty component, but otherwise changes as little as possible. Another example starts with the shortest path routing function, and extends it with as many alternative paths as possible, while still containing the shortest paths.

The reconfiguration mechanism described in the present embodiment is designated Dynamic Quick Configuration (DQR) because it is high-speed and the new paths are compatible with the existing routing function. These properties are guaranteed by the channel list described above, which ensures that any new dependency introduced by the new paths is compatible with the already existing dependencies, i.e. there can be no deadlock. Furthermore, the high-speed of the reconfiguration mechanism comes from the fact that it will only reconfigure paths that have become disconnected. All other paths will remain the same, minimizing the impact on the network. The mechanism does not require virtual channels for deadlock freedom, but where these are used by the routing algorithm, these can be utilized to increase the search space for a valid path by allowing to move a path between different virtual channels.

The reconfiguration mechanism is in its simplest form a topology agnostic mechanism that can be applied to any topology and routing function. The degree of fault tolerance depends on the topology and routing function used, and it can be enhanced by adding a topology specific "plug-in" to the mechanism. This plug-in will use topology specific information to identify a set of turns (dependencies) that can be safely added to the existing routing function to guarantee connectivity without introducing deadlocks. If, for some reason, this mechanism fails (for instance if there are more failures than it is designed to tolerate), the core topology agnostic functionality in DQR takes over with some probability of success.

The DQR mechanism consists of two parts. The first part is the mechanism responsible for building the channel list structure based on the dependencies caused by the paths that were set up by the routing algorithm. This task can be quite time consuming in large networks. Fortunately the task can be run in the background after network configuration has completed, in advance of any topology changes/faults.

The second part is the reconfiguration mechanism itself. This is invoked whenever the subnet manager detects a change in the network topology that requires some paths to be rerouted.

The general view of the algorithm is as follows:
1) Construct the channel list as soon as initial routing is complete;
2) Wait for topology change/failure;
3) Identify all disconnected paths;
4) Calculate new paths using the preconfigured channel list.

The present embodiment reviews topologies which do have cycles in them in order to identify efficient ways of using these topologies in non-cyclic ways. In particular, when the algorithm has succeeded, this results in structures that are topologically sortable.

The first part of the DQR algorithm includes generating the channel list. The first step is to identify all the flows in the network and the dependencies these cause between channels.

In the present example, it is assumed that the applications running on the network is fairly small in number (most often only one). One reason why identifying all the flows in the network is practical, is that there will be some S/D pairs for which there are no flows, thus no routing path between these pairs need be created. However, the present embodiment is not limited to a small number of applications but can be applied to any number of applications.

The term channels is used to encompass all channels including the virtual channels that might be utilized in the network. The result of this step is a list of channels (including virtual channels) and an indication of which channels these channels are dependent on. Based on this list, the channel list is constructed such that every channel is below (has lower index than) all channels to which the respective channel has dependencies. This may be accomplished using a linear programming solver where each dependency is directly translated to an inequality in the linear problem.

The second part of the algorithm is the reconfiguration mechanism itself. The first objective is to identify all the flows (source/destination pairs) that are disconnected because of the fault. Once this is done, the next step is to generate new paths for the disconnected flows. In order to generate the new paths, there is described three exemplary options:
1) Create a topology agnostic local reroute around the failed element and have all flows (if possible) use this reroute for connectivity.
2) Enable topology specific turns in the channel list to guarantee connectivity through a topology specific plug-in.
3) Reroute all disconnected flows end-to-end.

The performance of these options depends on the topology. As will be illustrated in detail below, the local reroute option works well for mesh and torus topologies, while the end-to-end reroute works better for fat trees. For guaranteed fault tolerance in the mesh, however, the topology specific plug-in should be considered.

When finding a new path for a disconnected flow, it is often necessary to introduce illegal turns into the channel list to create connectivity. For instance, if a link fails in a mesh that relies on XY routing, an illegal YX turn can be used to create a new path. Similarly, for fat trees that require switch to switch connectivity, a single link fault can lead to the need for introducing new downward to upward turns at different places in the topology which are illegal for the original routing algorithm. Consequently, the function that finds new paths for the disconnected flows can contain a mechanism to check whether a turn can be made legal by rearranging the channel list or not. Dijkstra's shortest path algorithm can be used to generate the shortest possible paths for the disconnected flows given the constraints of the channel list and existing paths.

In generating the shortest possible path, different options are available. For instance, the path can be in the same virtual layer as the original one or, alternatively the path can be moved to a different layer. Further, each illegal turn can be considered separately, or in combination with other illegal turns existing on the same path.

Each of these options represent trade-offs between runtime complexity and fault tolerance probability. Searching for paths in all virtual layers increases the runtime, but also increases the probability of finding a connected, deadlock free path. Similarly, checking the legality of a single illegal turn against the channel list is a relatively simple operation, while checking the sequence of legal turns required for a specific path is more complex. However, this added complexity leads to an increased probability that the resulting path is deadlock free.

The process for rerouting the affected paths is described below.

The main algorithm for quickly reconfiguring the network is as follows:
1) Identify all disconnected flows F;
2) If a plug-in is enabled, execute it to enable the required turns by reordering the channel list;
3) For each disconnected flow, find a valid path with the current channel list using Dijkstra's shortest path algorithm with the following modifications:
   a) Ensure that the next channel to be tested for a path is (or can be made) valid in the channel list
   b) Include the number of turns that have to be enabled in the cost function to prefer paths with fewer turns
   c) Include the specific new turns in the cost function to preference turns that have already been enabled by other paths
   d) Once a path has been selected, rearrange the channel list to enable the required turns;
4) Finally, update routing tables.

The core of the algorithm is the search for the new paths using Dijkstra shortest path algorithm. If a topology specific plug-in is utilized, this is a straightforward effort since there will always be a path that requires no additional turns to be enabled in the channel list (this has been taken care of by the plug-in).

The idea for the plug-in is to always ensure that the local paths around the disconnected link go towards the center of the mesh. So, instead of creating an arbitrary local reroute around a link, a specific rule for how to select this path is added. Furthermore, the turns required to enter and exit this path are enabled at either end of the failed link. In this manner, once the local reroute has been successfully established together with the additional turns, the subsequent search for paths for the disconnected flows can proceed without having to enable any new illegal turns. Of course, the agnostic reroute may be kept as a fallback mechanism if the plug-in mechanism fails.

If a topology specific plug-in is not available, or the current topology is not supported by the plug-in (e.g. too many faults), the path search performed by the shortest path algorithm will include paths that enable one or more illegal turns in the channel list. For the sake of speed, this is only done if it is reasonable to conclude that the resulting path will be shorter than any previously tested paths.

Figure 21:
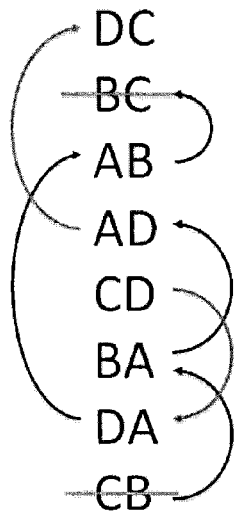
FIG. 21 illustrates an example of reordering of the channel list to allow the turns necessary to connect the topology after a failure.
Figure 21:
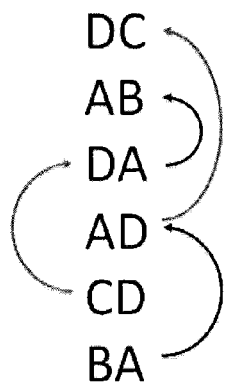
Figure 21:
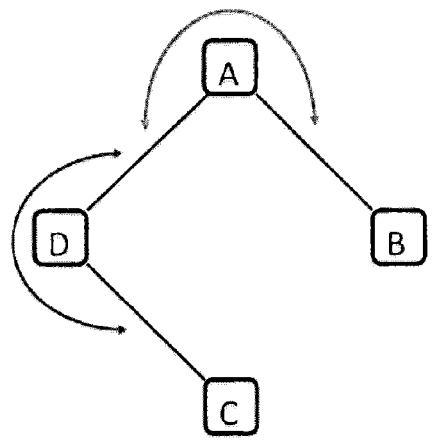

The algorithm also determines whether an illegal turn can be enabled and, based on the determination, subsequently reorders the channel list. An illegal turn creates a downward dependency in the channel list. However, it might be possible to reorder the channel list so that all dependencies again moved upwards. An example of this is presented in FIG. 21, where one link in the previous example of the 4-node ring shown in FIG. 20 has been removed. To restore connectivity, previously non-existent turns have to be used which lead to a downward dependency in the channel list. By moving the target channel of this dependency upwards in the channel list, and repeating this for the following dependencies, a new valid channel list is created.

The local reroute option can be viewed as a topology agnostic plug-in that tries to enable the necessary turns to create a legal path around the failed element. Similarly, whether to search for a path in the same virtual layer, or in other virtual layers can be implemented by considering the channel list for the different virtual layers separately and testing each one through a separate run of the shortest path algorithm.

Whether to consider each illegal turn separately, or combined with the others, is implemented by the shortest path algorithm by keeping a local copy of the channel list, which is continuously updated with the enable turns.

Complexity of the resulting reconfiguration function is $O(|F||T||V| \log |V|)$, where F is the number of flows that are rerouted, T is the small subset of channels that are moved in the channel list, and V is the number of switches/nodes in the network. The exact values of the number of flows that need to be rerouted, F, are very low, and are discussed below.

The main algorithm for quickly reconfiguring the network is presented as also illustrated herein as Algorithm 1.

The algorithm first identifies all the flows that are affected by the fault. If the local reroute or topology specific plug-in is enabled, the algorithm creates the appropriate paths and inserts the resulting dependencies into the channel list. This mechanism can either add specific paths to the channel list, or just enable specific turns by rearranging the channel list accordingly. This also specifies where the algorithm is allowed to attempt to create new illegal turns. For instance, if the topology agnostic local path mechanism is used, the only turns the path search algorithm can introduce are the ones required to enter or exit the local path, and for plug-ins, only the plug-in might be allowed to create new turns.

Then, for each disconnected flow, the Dijkstra shortest path algorithm is invoked to get the shortest path between the source and destination of the flow given the constraints of the channel list and pre-existing routing table entries for the current destination (this is necessary to support routing algorithms that only consider the current switch and the destination for the routing decisions). If the Dijkstra solution (a vector of previous hops for every node in the network to reach f.destination) has already been computed for the destination, and the algorithm is currently testing the same virtual layer as was used to place the previous flow with the same destination, the existing Dijkstra solution can be reused. If the previous Dijkstra solution for the same destination was calculated for one set of virtual channels, the same solution might not be valid for a different set of virtual channels, therefore the solution is recalculated.

In order to ensure that all flows with the same destination use the same output from a given switch, the Dijkstra algorithm is run on the reverse paths, i.e. the destination of the flow is the source in the Dijkstra algorithm and the source of the flow becomes the Dijkstra destination.

The function GET_PATH builds a path from the source to the destination for flow f given a Dijkstra solution for f.destination. The function also has to reorder the channel list if the path contains any previously illegal turns that have been introduced by get_dijkstra_paths. This is done by traversing the path from the source to the destination, and whenever the index of the next hop channel is less than or equal to the current channel, the index of the next hop channel and all following channels in the dependency chains following this are increased so that they are one larger than the previous channel in the chain. The exact algorithm is listed as Algorithm 4.

In other words, the function GET_PATH traverses the list of previous hops which is the output of the Dijkstra algorithm to create the path for the given source and destination.

The heavy lifting of the DQR algorithm is done by the function get_dijkstra_paths, listed as Algorithm 2. This exemplary implementation of the Dijkstra algorithm contains two important modifications to generate paths that are compliant with the channel list and previous routing table entries. This exemplary implementation of Dijkstra is one way of generating paths. An ordinary Dijkstra-implementation, or any variant thereof containing any other cost-metric may also be used.

In the exemplary implementation, the cost function is not simply the number of hops, but rather a 3-tuple consisting of the values (hops; illegal_turns; illegal_turn_index). Hops is a cost metric indicating the number of hops to the destination, illegal_turns is the number of illegal turns performed on the path from the source to the destination, and illegal_turn_index is the smallest index of the illegal turns performed on the path in a list of all the illegal turns included in the Dijkstra solution. This ensures that paths are grouped towards the same legal turn, which minimizes the number of such turns and increases the probability of finding a set of deadlock free paths. The cost matrix w used by RELAX contains '1' for every two connected nodes in the topology. The cost vector for every assigned path contains the 3-tuple defined above, and the RELAX function keeps track of the number of illegal turns performed on the path by checking whether the turn is in the allowed-turns vector. Similarly, the illegal_turn_index is the smallest index in allowed_turns of the illegal turns for the current path. When cost tuples are compared, the values at the first index are compared first. If these are identical, the values of the second index are compared, and if these also are identical, the values of the third index are compared. In this manner, a long path without illegal turns is preferred over a short one containing one or more illegal turns.

The second addition is the ALLOWED_TURN function. This function ensures that any single turn performed in the search for the shortest paths is legal. Note that it does not guarantee that the combination of multiple turns is legal. The contents of this function is listed as Algorithm 3. The ALLOWED_TURN function uses the channel indexes to verify whether the turn is legal. There are a number of cases where turns that are illegal in the current channel list can be introduced to maintain connectivity. The rest of the function determines whether the current turn (u, v, p[v]) can be introduced into the channel list without introducing a deadlock. In this case, the second channel of the turn (v, p[v]) will have an index which is smaller than or equal to the first channel (u, v). For this turn to be legal there can be no dependency chains leading from (v, p[v]) to (u, v) (the channel sequence guarantees this, but in this case the channel sequence is broken by reordering the channels to accommodate the turn). To verify that no such dependency chain exists, all dependencies from (v, p[v]) are followed to determine if any of these lead to (u, v). The indexes of the channels in the channel list can be used to prune the length of the followed dependency chains, because if the dependency chain passes the index of (u, v) without encountering it, it will never do so. This search is implemented in the while loop in ALLOWED_TURN.

ALLOWED_TURN can be further optimized by checking the cost of the path that will contain the new turn. If the cost of this new path is larger than or equal to the preexisting path from u, the legality check of the turn need not be executed, and ALLOWED_TURN returns false.

The listed version of the allowed_turn function only considers the legality of each single turn individually (option 1). In order to support the second option where the entire sequence of illegal turns for a given path is considered together, the channel list is updated (using the function update_path in Algorithm 4) for each successive illegal turn on the path. This increases the complexity by a relatively small constant factor (limited by path length) and has a marginal impact on the fault tolerance probability of the mechanism.

As is noted above, in order to guarantee that the mechanism is able to tolerate at least one fault for a specific topology, it is in some cases necessary to supply DQR with a topology specific plug-in. For a fat tree this is not necessary, even when enabling switch-to-switch routing as is shown in the next section. For a mesh, however, one fault tolerance cannot be guaranteed with the agnostic mechanism. A simple example of how to create such a plug-in for a XY routed mesh topology, which is also applicable to tori with E-Cube routing. This function is called plug-in( ) in Algorithm 1.

The result of Algorithm 1 is to update the routing tables. When a new channel list has been generated, a version of Dijkstra may be used that has the extra constraint that paths in one direction in the channel list are the only allowed paths. From these set of paths, the new routing table entries can be obtained.

Exemplary Algorithm 1—the Main DQR Algorithm:

```
Require: All channels have been assigned a valid channel ID
 1: shortest_path_list = dictionary to store computer Dijkstra solutions
 2: last_layer_used = dictionary to store the last virtual channel used for a destination
 3: F = the set of source/destination pairs disconnected by the fault
 4: if plug-in exists then
 5:     plug-in ( )
 6: end if
 7: if option_create_local_paths or plug-in failed then
 8:     for each used virtual layer do
 9:         {Create a local reroute path in every virtual layer}
10:         Create_local_paths(fault)
11:     end for
12: end if
13: for each f in F do
14:     if not f.destination in shortest_path_list or last_layer_used [f.destination] != f.layer then
15:         shortest_path_list [f.destination]= GET_DIJKSTRA_PATHS (G, f.destination, f.source, f.layer)
16:     end if
17:     f.new_path = GET_PATH (f, shortest_path_list [f.destination])
18:     if not f.new_path and try_other_layers then
19:         for each layer except f.layer do
20:             if not f.destination in shortest_path_list or last_layer_used [f.destination] != new_layer then
21:                 shortest_path_list [f.destination]= GET_DIJKSTRA_PATHS (G, f.destination, f.source, new_layer)
22:             end if
23:             f.layer= new_layer
24:             f.new_path = GET_PATH (f, shortest_path_list [f.destination])
25:         end for
26:     end if
27: end for
28: Update routing tables
```

Exemplary Algorithm 2 Function get_dijkstra_paths.

```
1: get_dijkstra_paths (G, s, layer)
2: INITIALIZE-SINGLE-SOURCE(G, s)
3: p is a vector containing the previous hop for every v ∈ S
4: allowed_turns is the list of all illegal turns committed during this run
5: S ← ø
6: Q ← G[s]
7: while Q ≠ ø do
8:     u gets EXTRACT_MIN(Q)
9:     S ← S ∪ {u}
10:    for each vertex v ∈ Adj[u] do
11:        if ALLOWED_TURN (u,v,p[v]) then
12:            if not (u,v,p[v]) in allowed_turns then
13:                allowed_turns.append ((u,v,p[v]))
14:            end if
15:            RELAX(u, v, w, allowed_turns)
16:        end if
17:    end for
18: end while
```

Exemplary Algorithm 3 Function ALLOWED_TURN.

```
1: ALLOWED_TURN (u,v,p[v]):
2: {Is the turn from u to p[v] through v legal?}
3: if CHANNEL_ID (CHANNEL (u,v)) < CHANNEL_ID (CHANNEL (v,p[v]))
   then
4:     return True
5: end if
6: if length of existing path from u ≤ length of this path including the
```

```
   new turn then
7:       return False
8:    end if
9:    if option_create_local_paths and v is not connected to a failed
      element then
10:      {Only add legal turns next to the disconnected elements to force
         use of the local paths if these are available.}
11:      return False
12:   end if
13:   {The turn is illegal, can it be legalised?}
14:   Q ← CHANNEL(v; p[v])
15:   while Q ≠ ø do
16:      c ← Q[0]
17:      if c = CHANNEL(u; v) then
18:         return False
19:      end if
20:      for each channel d with a dependency from c do
21:         if CHANNEL_ID (d) ≤ CHANNEL_ID (c) then
22:            Q.append(d)
23:         end if
24:      end for
25:   end while
26:   return True
```

Exemplary Algorithm 4 Function update_path.

```
1: update_path (path)
2: for each channel c in path do
3:    if CHANNEL_ID (c) ≥ CHANNEL_ID (c+1) then
4:       Q ← c
5:       while Q ≠ ø do
6:          c ← Q[0]
7:          for each channel j with a dependency from c do
8:             if CHANNEL_ID (c) ≥ CHANNEL_ID (j)
9:             then
10:               CHANNEL_ID (j) ← CHANNEL_ID (c)+1
11:               Q.append(j)
12:            end if
13:         end for
14:      end while
15:      return
16:   end if
17: end for
```

The reconfiguration algorithm is dominated by the modified Dijkstra function, get_dijkstra_paths, in addition to the time required to identify the network flows that are disconnected by the fault. The complexity of the Dijkstra algorithm with edges E and vertices V for a sparse graph where $|E| \ll O(|V|^2)$ is $O(|E|+|V| \log |V|)$. The ALLOWED_TURN function will in the worst-case examine all edges of the topology, although this is seldom the case. In fact, the algorithm follows the chain of dependencies from the last channel of the turn until it has examined all channels with an index less than or equal to the first channel in the turn. For most typical network topologies this will be a small subset T of all the edges in the network, $|T| \ll O(|E|)$. Furthermore, ALLOWED_TURN will in this case only run whenever it will lead to a shorter path. Still, the worst-case complexity of the modified Dijkstra algorithm is $O(|E||T|+|T||V| \log |V|) \approx O(|T||V| \log |V|)$.

The full algorithm also requires that new paths are generated from the Dijkstra solutions, and possibly that the channel indexes are updated each time new turns are introduced (GET_PATH). This function has to traverse a subset of all the channels in the network whose size depends on the size and number of dependency chains. In the worst case there are $|E|$ channels that have to be traversed. Furthermore, the modified Dijkstra function is run multiple times, once for each destination that is rerouted. If no flow is moved to a virtual layer different from its original layer, this is sufficient. However, if flows are moved between layers to maximize fault tolerance probability, the modified Dijkstra algorithm may have to run for every flow that needs to be rerouted. If the number of rerouted flows is $|F|$, the complexity of the full reconfiguration portion of the DQR algorithm is $O(|F|(|E|+|T||V| \log |V|))$. The controlling term is $O(|F||T||V| \log |V|)$. The exact values of the number of flows that need to be rerouted, F, are very low.

An evaluation of DQR for several of the most common topologies, mesh, torus, and fat tree will now be considered.

A purpose of the evaluation is to illustrate how efficient the mechanism is at reconfiguring the network with a connected routing algorithm after a fault event. Several of the options outlined through the description of the mechanism such as adding a local reroute path, adding topology specific dependencies, checking the validity of all illegal turns on the path or just each single turn, and doing this for all paths or just the local reroute are also considered.

The algorithm has been implemented in Python and is run on topologies with routing tables dumped by the latest version of OpenSM (OFED 1.5.3.2). Every data point in all the figures represents 500 separate runs which consists of introducing random faults, reconfiguring, and if successful, introducing a new fault and so on. The results are presented in the next sections for the different topologies.

Figure 22:
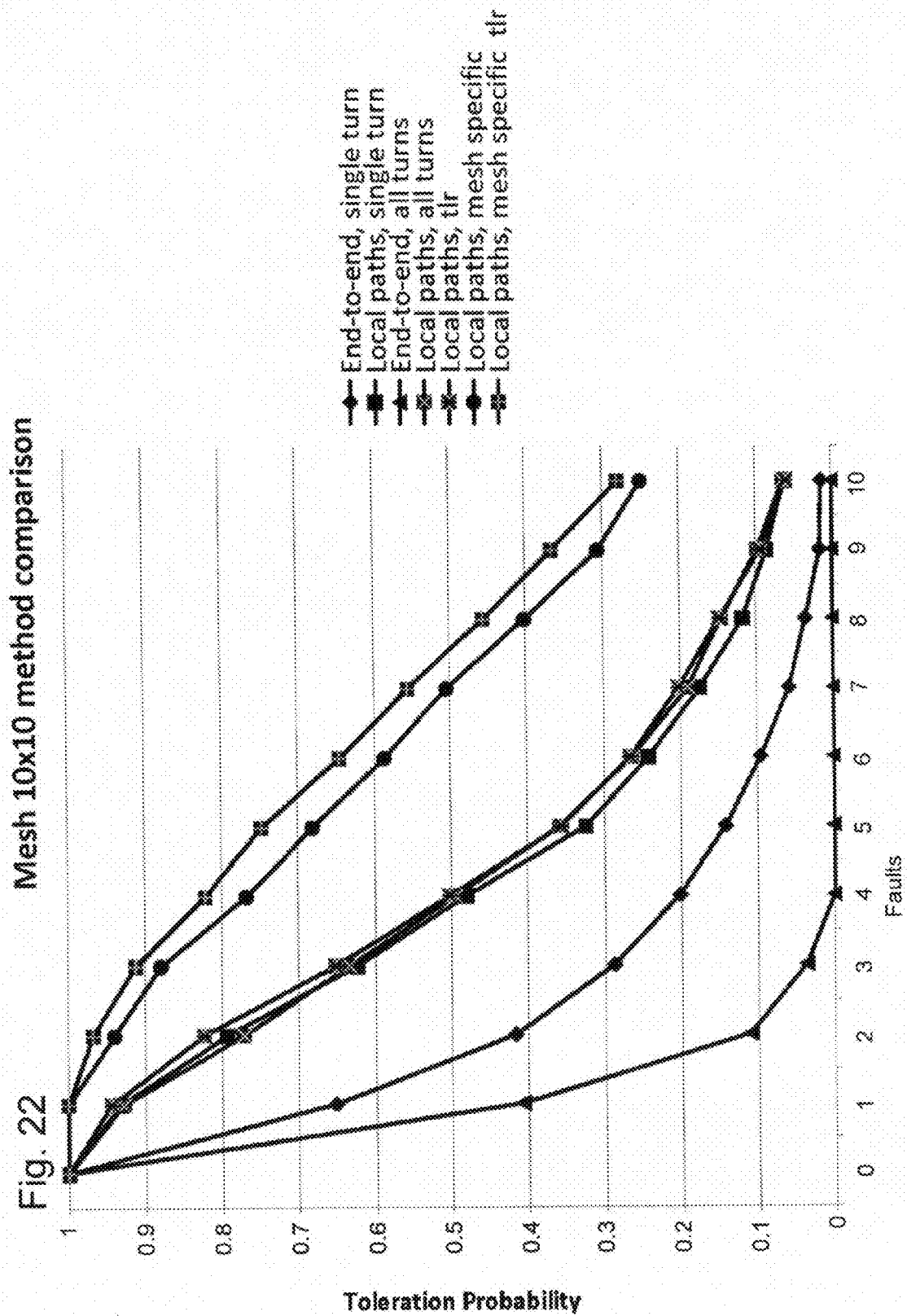
FIG. 22 illustrates a comparison between different variations of the dynamic quick reconfiguration mechanism in a 10×10 mesh.

The mesh is a well-known and simple topology where one link fault tolerance can be guaranteed. FIG. 22 compares all the different variations of the DQR mechanism in a 10×10 mesh. The x-axis is the number of link faults (inserted one after the other with reconfiguration in between) introduced into the topology and the Y axis is the probability of finding a connected and deadlock free solution. The keywords "end-to-end" and "local paths" signify whether the new paths are created with or without enforcing a local reroute around the failed link. "All turns" means that for every path that is created, all illegal turns along that path have been considered together, as opposed "single turn" where each turn is considered in isolation. Finally, for "turn local reroute (fir)" all turns along a path together are considered, but only for the local reroute path, not the full paths for the flows, and "mesh specific" is the mesh specific plug-in variation.

It is clear from FIG. 22 that the two mesh specific variations are the only variations that are able to guarantee toleration of one link fault, and they have the overall best probability of tolerating further faults. Of these two, the best solution is to consider the sequence of all illegal turns for the local reroute if the mesh specific plug-in fails. In the middle is found the rest of the variations around the local topology agnostic reroute solutions, and the best of these is also the one where all the illegal turns are considered on the path together rather than individually. The worst performance is found if the local reroute is not added and all the illegal turns are not considered on the path together. This is because this solution requires there to be a valid new path for all possible sources for a given destination, not just the ones that are disconnected by the fault.

The conclusion is that with a topology specific plug-in mechanism one link fault tolerance in a mesh can be guaranteed and a reasonable probability of tolerating several more subsequent faults can be obtained.

Figure 23:
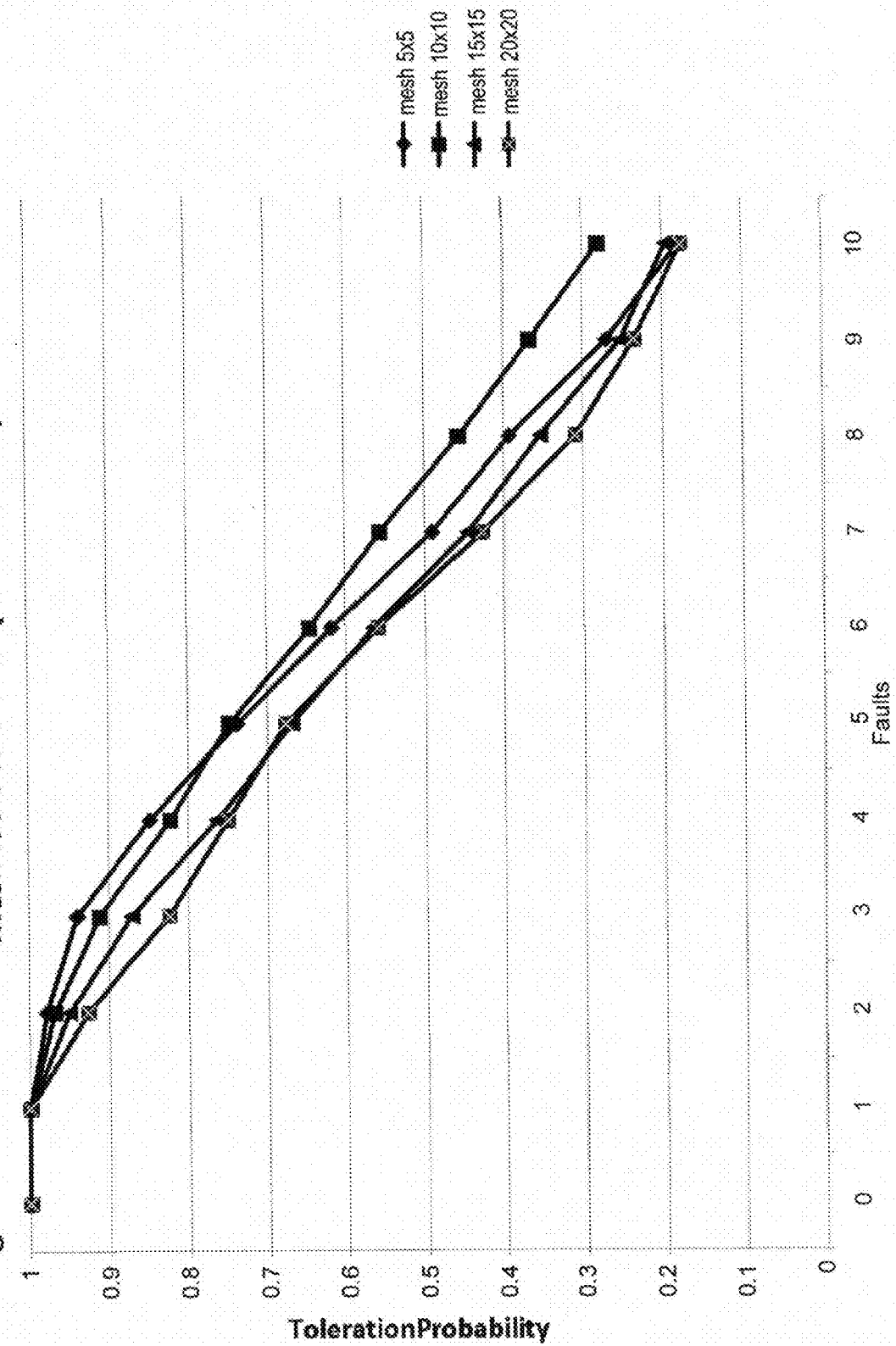
FIG. 23 illustrates an evaluation of the scalability of a solution for a mesh using different mesh sizes.

To evaluate the scalability of the solution for the mesh, a 5 by 5, 10×10, 15×15, and 20×20 mesh were tested using the mesh specific plug-in together with single turn local path. The results are presented in FIG. 23. This figure clearly shows that connectivity with one fault is able to be guaranteed. Furthermore, the degradation in probability is similar for every topology size which indicates quite good scalability properties.

To put the complexity of the reconfiguration algorithm into context, the number of flows that have to be reconfigured after a link has failed in the 20×20 mesh is considered. Specifically, the fraction is quite stable, it ranges from 1.7% to 2.2% when increasing the number of subsequent faults in the system from one to 10. Around 2% of all the flows are configured which ensures good runtime and scalability for the reconfiguration algorithm.

Figure 24:
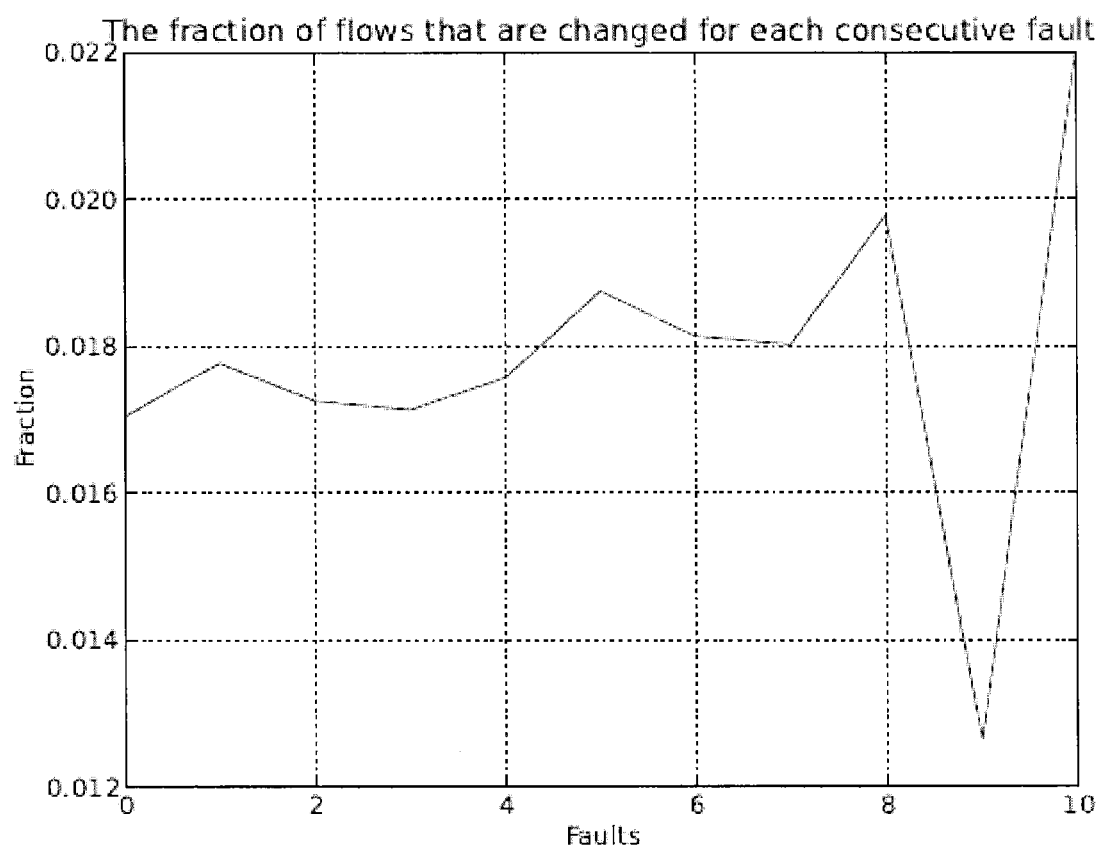
FIG. 24 illustrates the fraction of flows that are affected by the reconfiguration for each fault.

Finally, FIG. 24 shows that only a small amount of the paths in the topology are reconfigured. This shows the fraction of flows that are reconfigured in a 20×20 mesh for every subsequent fault. The X axis is the number of faults, and the Y axis is the fraction of flows that are reconfigured. The figure clearly shows that less than 2% of the flows are moved in the topology for each fault.

The torus is a mesh with wraparound links so that it is fully symmetric. This topology cannot be routed without using virtual channels to guarantee deadlock freedom. A possible way routing the torus is using the E-cube algorithm which mimics mesh routing and divides the traffic in various portions of the torus into different virtual layers. It is then possible to apply the mesh specific plug-in to every layer in the torus and achieve approximately the same probability of full toleration as for the regular mesh. In other words, using the E-cube routing algorithm DQR can guarantee one fault tolerance with a graceful degradation beyond one fault.

Figure 25:
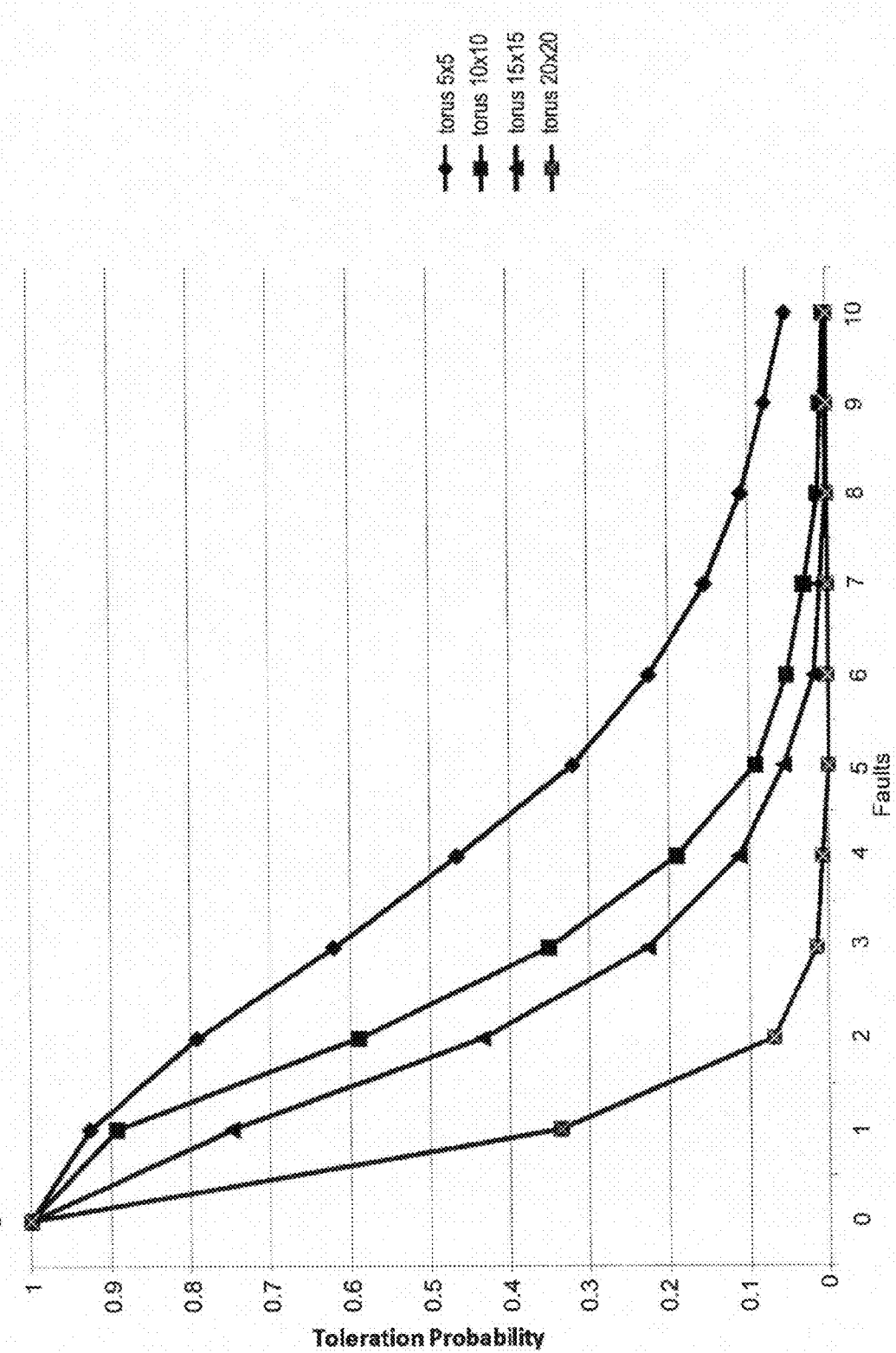
FIG. 25 illustrates a torus fault-tolerant capability.

Another possible way of routing a torus is using LASH. LASH is a topology agnostic routing algorithm that guarantees shortest path routing and divides conflicting paths (that may cause deadlock) into different virtual layers. It is therefore interesting to see how the topology agnostic DQR behaves together with the topology agnostic LASH. The results for a 5 by 5, 10×10, 15×15, and 20×20 torus are presented in FIG. 25 where every layer is searched for a path for a disconnected flow.

There is a striking difference to the mesh probability figure. No fault tolerance is guaranteed, and for the largest torus, 20×20, there is only a 33% chance of tolerating a single fault. The reason for this poor performance is that LASH uses arbitrary shortest paths and tries to pack the resulting paths into as few layers as possible. This gives very little room for creating different paths without causing deadlock. The results for not searching in different virtual layers from the original are significantly worse.

A two-tier fat tree constructed using 36-port switches has also been considered. This yields a fat tree with 648 ports. The current algorithm in OpenSM for fat tree routing only provides deadlock free node to node and node to switch connectivity. Deadlock free switch to switch connectivity is not supported, although it is required for several management systems that rely on running IP over Infiniband.

When evaluating the fat tree, the switch to switch paths have been considered as disconnected and DQR has been used to reconnect them. Thereafter faults have been introduced as for the other topologies. The challenge with switch to switch connectivity in the fat tree, is that it involves introducing U-turns in the leaf switches of the tree. Without careful consideration of where these U-turns are placed, deadlocks will occur. Including switch to switch communication makes the evaluation more challenging since link faults in a fat tree without switch to switch connectivity can always be handled without introducing any illegal turns. The fault tolerance is therefore only bounded by the physical connectivity.

Figure 26:
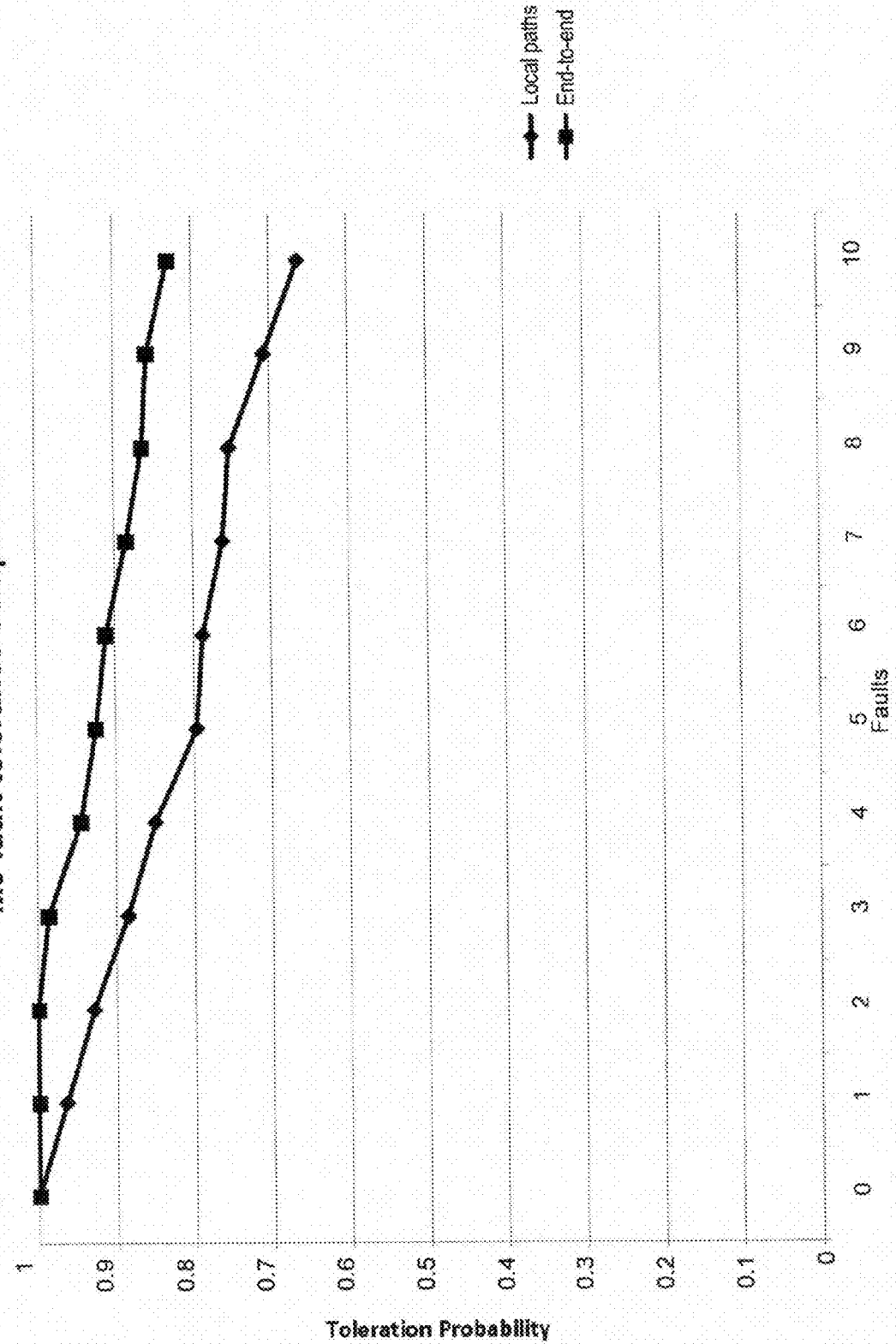
FIG. 26 illustrates a fat tree fault tolerance comparison.

The results of the evaluation are presented in FIG. 26. For the fat tree the comparison only uses pure end-to-end routing and creates local reroutes around the link fault without any topology specific plug-ins (a plug-in is not required to guarantee that the free connectivity).

First, it is noted that DQR was able to successfully create all the necessary switch-to-switch paths. Second, creating a local reroute around a link fault is not a good solution for the fat tree. In this case single fault tolerance is not guaranteed. The end-to-end algorithm can guarantee connectivity with at least one link fault, and shows a much smaller degradation with increasing number of faults.

To summarize, DQR performs better for some topologies than others, but with topology specific plug-ins connectivity can be guaranteed. The fat tree with switch-to-switch connectivity is supported with the pure topology agnostic solution, while the mesh and torus topologies require a topology specific plug-in to guarantee connectivity. Still, even the topology agnostic solution could tolerate a single link fault with 93% chance and two faults with 80% chance in a mesh. In these cases the best topology agnostic solution is to create a local path around the faulty elements and check that the entire sequence of illegal turns on this path is deadlock free. The LASH routing mechanism is more difficult to work with because the tight packing of paths into as few virtual layers as possible means there is little leeway for creating new paths. However, LASH is a very time-consuming algorithm with a significant deadlock probability when reconfiguring, so it is often worthwhile to run DQR before doing a full LASH reconfiguration on the chance that LASH can be avoided.

Having an efficient and deadlock free reconfiguration algorithm for large interconnection networks is important to maintain good utilization of the computer system. Existing solutions either require virtual channels or have severe performance issues during the reconfiguration. Furthermore, these solutions often rely on topology agnostic routing algorithms to create connectivity. In contrast DQR is a topology agnostic dynamic reconfiguration mechanism that guarantees a deadlock free reconfiguration if connected paths are available, reconfigures only disconnected paths, requires no virtual channels or reconfiguration protocol for updating forwarding tables, has simple support for topology specific functionality through a plug-in architecture to guarantee fault tolerance, and has low complexity.

The evaluations have shown that with this architecture connectivity with single faults in mesh and torus topologies can be guaranteed. Fat trees with switch-to-switch connectivity are supported even with only the topology agnostic solution.

Figure 27A:
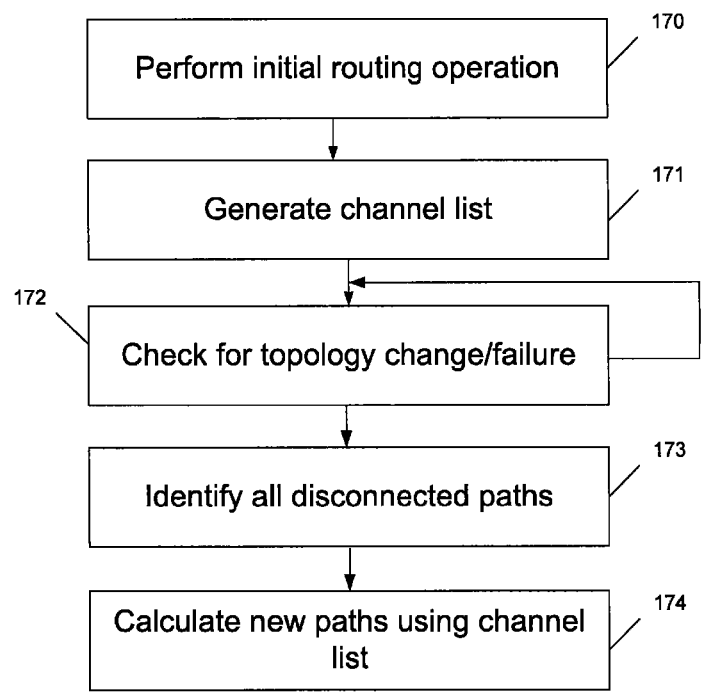
FIG. 27A illustrates a method of implementing dynamic quick reconfiguration according to one embodiment of the present disclosure.

The method of implementing dynamic quick reconfiguration is described with respect to the flow chart illustrated in FIG. 27A.

In step 170, an initial routing operation is performed.

In step 171, the channel list is generated after the initial routing is complete.

In step 172, the system checks for a topology change/failure. When no change/failure is found, the flow returns to step 172. When a change/failure is detected, the flow proceeds to step 173.

In step 173, all disconnected paths are identified.

In step 174, new paths are calculated using the preconfigured channel list.

Figure 27B:
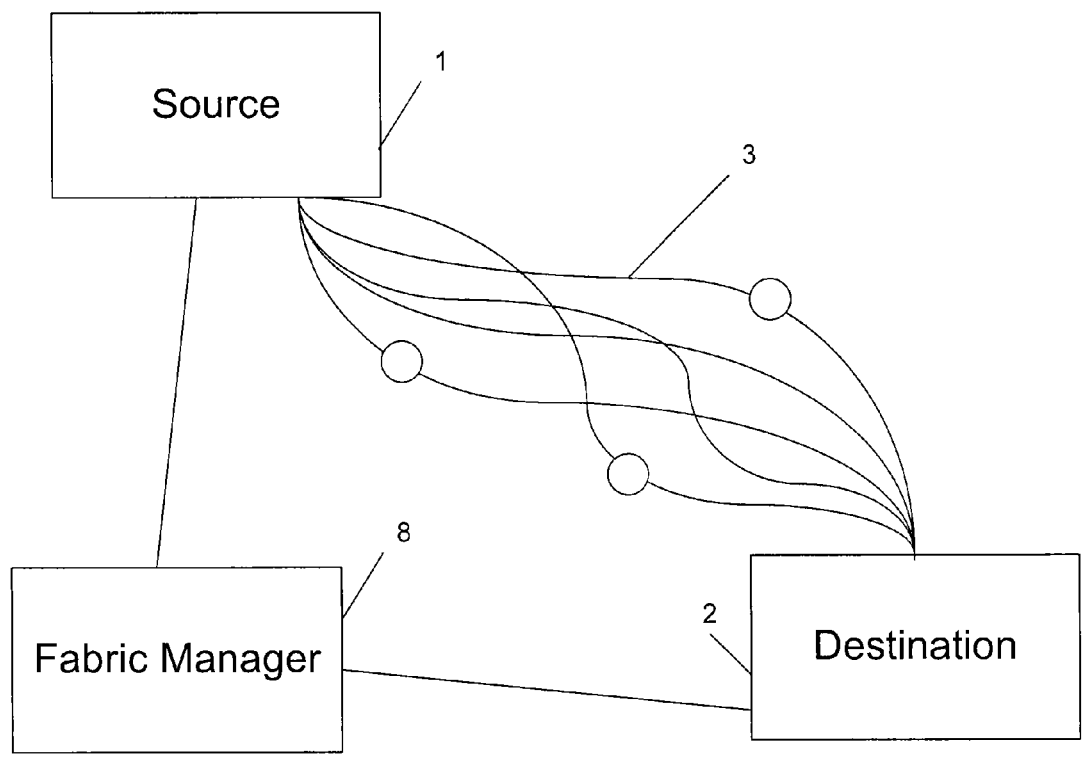
FIG. 27B illustrates a block diagram according to one embodiment of the present disclosure.

FIG. 27B illustrates a microprocessor implemented Fabric Manager 8 which determines the updated paths based, at least, on the Dynamic Quick Configuration algorithm. When the Fabric Manager 8 is informed about a fault by a fault detecting mechanism, the Fabric Manager 8 is able to compute what channel pairs are effected and can provide updated paths for the interrupted path. The fault detecting mechanism may be located, for example, in the switches/routers. This fault detecting mechanism is able to detect that a link attached to the switch/router is no longer operating properly or is inactive. When a fault has been detected, a message with information regarding this fault is transmitted to the Fabric Manager 8.

Features of the invention can be implemented using some form of computer microprocessor. As one of ordinary skill in the art would recognize, the computer microprocessor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer microprocessor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 28:
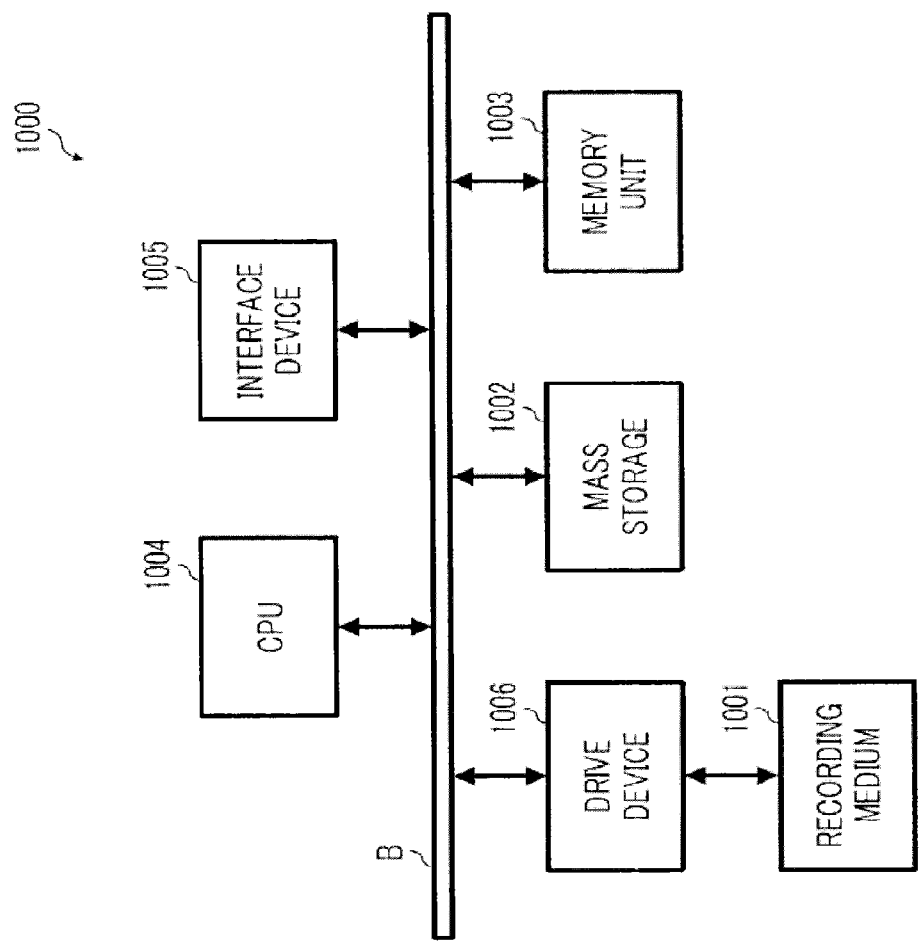
FIG. 28 illustrates computer hardware implementation according to one embodiment of the disclosure.

In addition, the invention can be implemented using a computer based system 1000 shown in FIG. 28. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 1000 may be, a mobile device such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of determining paths in a network topology using a computer including a microprocessor, comprising:
   providing at least one source/destination pair, each pair representing a source and a destination in the topology;
   providing a node list comprising a topological ordering of node identifiers representing communication nodes in the network topology;
   providing at least one path connecting the source and the destination based on the node list;
   selecting a source from the topology;
   identifying the position of the source in the node list; and
   generating at least one path from the selected source to the destination based on traversing the node list from the identified position to a first position.

2. The method according to claim 1, wherein the providing a node list further comprises:
   a) selecting the first position in the node list;
   b) selecting a destination from the at least one source/destination pairs;
   c) associating the selected destination with the first position;
   d) determining a subset of nodes, the subset comprising nodes directly connected to the destination;
   e) selecting a current position in the node list higher than the first position;
   f) selecting, based on a constraint function, a next node from the subset;
   g) associating the next node with the current position;
   h) for each selected node in the subset, extending the subset with a next subset including further nodes connected to the selected node;
   i) selecting a further position in the node list higher than the first and current positions, the further position hereafter being the current position; and
   j) repeating steps f)-i) until all nodes in the topology have been associated with a position in the node list.

3. The method according to claim 2, wherein the constraint function is defined to realize a routing objective.

4. The method according to claim 3, wherein generating the at least one path comprises generating a plurality of paths.

5. The method according to claim 4, wherein the routing objective comprises an objective to maximize routing choices at each node.

6. The method according to claim 4, wherein the routing objective comprises an objective to balance the traffic load of each link at each node.

7. The method according to claim 1, further comprising:
   storing the at least one path connecting the source and the destination in one or more routing tables in at least one network router or switch.

8. The method according to claim 1, wherein the providing at least one path further comprises:
   generating at least one path connecting the source and the destination of each pair based additionally on a pre-defined traffic pattern utilizing the at least one path.

9. The method according to claim 1, wherein the providing at least one path further comprises:
   generating at least one path connecting the source and the destination of each pair based additionally on a traffic load utilizing the at least one path.

10. The method according to claim 1, wherein the providing at least one path comprises:
    selecting, from a pre-computed set of paths, at least one path compatible with the node list.

11. The method according to claim 2, wherein the associating comprises storing an identifier of the node at the current position in the node list.

12. A method of determining paths in a network topology using a computer including a microprocessor, comprising:
    providing at least one source/destination pair, each pair representing a source and a destination in the topology;
    providing a channel list comprising a topological ordering of channel identifiers representing communication channels in the network topology;
    providing at least one path connecting the source and the destination based on the channel list; and
    selecting a source from the topology;
    identifying channels whose ingress node is the source;
    identifying positions associated with the identified channels;

generating at least one path from the selected source to the destination based on traversing the channel list from the identified positions to a position associated with a channel whose egress node is the destination.

13. The method according to claim 12, wherein the providing a channel list further comprises:
a) selecting a first position in the channel list;
b) selecting a destination from the at least one source/destination pairs;
c) associating the selected destination with the first position;
d) determining a subset of channels, the subset comprising channels whose egress node is the destination;
e) selecting a current position in the channel list higher than the first position;
f) selecting, based on a constraint function, a next channel from the subset;
g) associating the next channel with the current position;
h) for each selected channel in the subset, extending the subset with a next subset including further channels whose egress node is the ingress node of the selected channel;
i) selecting a further position in the channel list higher than the first and current positions, the further position hereafter being the current position; and
j) repeating steps f)-i) until all channels in the topology have been associated with a position in the channel list.

14. The method according to claim 13, wherein the constraint function is defined to realize a routing objective.

15. The method according to claim 14, wherein generating the at least one path comprises generating a plurality of paths.

16. The method according to claim 15, wherein the routing objective comprises an objective to maximize routing choices at each node.

17. The method according to claim 15, wherein the routing objective comprises an objective to balance the traffic load of each channel.

18. The method according to claim 12, further comprising:
storing the at least one path connecting the source and the destination in one or more routing tables in at least one network router or switch.

19. The method according to claim 12, wherein the providing at least one path further comprises:
generating at least one path connecting the source and the destination of each pair based additionally on a predefined traffic pattern utilizing the at least one path.

20. The method according to claim 12, wherein the providing at least one path further comprises:
generating at least one path connecting the source and the destination of each pair based additionally on a traffic load utilizing the at least one path.

21. The method according to claim 12, wherein the providing at least one path comprises:
selecting, based on the channel list, the at least one path from a pre-computed set of paths.

22. The method according to claim 13, wherein each associating comprises storing an identifier of the channel at the current position in the channel list.

23. A device for determining paths in a network topology, comprising:
a microprocessor configured to
provide at least one source/destination pair, each pair representing a source and a destination in the topology,
provide a node list comprising a topological ordering of node identifiers representing communication nodes in the network topology,
provide at least one path connecting the source and the destination based on the node list,
select a source from the topology,
identify the position of the source in the node list, and
generate at least one path from the selected source to the destination based on traversing the node list from the identified position to a first position.

24. The device according to claim 23, wherein the microprocessor is configured to provide the node list by being further configured to
a) select the first position in the node list,
b) select a destination from the at least one source/destination pairs,
c) associate the selected destination with the first position,
d) determine a subset of nodes, the subset comprising nodes directly connected to the destination,
e) select a current position in the node list higher than the first position,
f) select, based on a constraint function, a next node from the subset,
g) associate the next node with the current position,
h) for each selected node in the subset, extend the subset with a next subset including further nodes connected to the selected node,
i) select a further position in the node list higher than the first and current positions, the further position hereafter being the current position, and
j) repeat f)-i) until all nodes in the topology have been associated with a position in the node list.

25. The device according to claim 24, wherein the constraint function is defined to realize a routing objective.

26. The device according to claim 25, wherein the microprocessor is configured to generate the at least one path by being further configured to generate a plurality of paths.

27. The device according to claim 26, wherein the routing objective comprises an objective to maximize routing choices at each node.

28. The device according to claim 26, wherein the routing objective comprises an objective to balance the traffic load of each link at each node.

29. The device according to claim 23, further comprising:
storing the at least one path connecting the source and the destination in one or more routing tables in at least one network router or switch.

30. The device according to claim 23, wherein the microprocessor is configured to provide at least one path by being further configured to
generate at least one path connecting the source and the destination of each pair based additionally on a predefined traffic pattern utilizing the at least one path.

31. The device according to claim 23, wherein the microprocessor is configured to provide at least one path by being further configured to
generate at least one path connecting the source and the destination of each pair based additionally on a traffic load utilizing the at least one path.

32. The device according to claim 23, wherein the microprocessor is configured to provide at least one path by being further configured to
select, from a pre-computed set of paths, at least one path compatible with the node list.

33. The method according to claim 24, wherein the microprocessor is configured to associate the selected destination with the first position or associate the next node with the current position by being further configured to store an identifier of the node at the current position in the node list.

34. A device for determining paths in a network topology, comprising:
a microprocessor configured to
provide at least one source/destination pair, each pair representing a source and a destination in the topology,
provide a channel list comprising a topological ordering of channel identifiers representing communication channels in the network topology,
provide at least one path connecting the source and the destination based on the channel list,
select a source from the topology,
identify channels whose ingress node is the source,
identify positions associated with the identified channels, and
generate at least one path from the selected source to the destination based on traversing the channel list from the identified positions to a position associated with a channel whose egress node is the destination.

35. The device according to claim 34, wherein the microprocessor is configured to provide a channel list by being further configured to
a) select a first position in the channel list,
b) select a destination from the at least one source/destination pairs,
c) associate the selected destination with the first position,
d) determine a subset of channels, the subset comprising channels whose egress node is the destination,
e) select a current position in the channel list higher than the first position,
f) select, based on a constraint function, a next channel from the subset,
g) associate the next channel with the current position,
h) for each selected channel in the subset, extend the subset with a next subset including further channels whose egress node is the ingress node of the selected channel,
i) select a further position in the channel list higher than the first and current positions, the further position hereafter being the current position, and
j) repeat f)-i) until all channels in the topology have been associated with a position in the channel list.

36. The device according to claim 35, wherein the constraint function is defined to realize a routing objective.

37. The device according to claim 36, wherein the microprocessor is configured to generate the at least one path by being further configured to generate a plurality of paths.

38. The device according to claim 37, wherein the routing objective comprises an objective to maximize routing choices at each node.

39. The device according to claim 37, wherein the routing objective comprises an objective to balance the traffic load of each channel.

40. The device according to claim 34, wherein the microprocessor is further configured to
store the at least one path connecting the source and the destination in one or more routing tables in at least one network router or switch.

41. The device according to claim 34, wherein the microprocessor is further configured to provide at least one path by being further configured to
generate at least one path connecting the source and the destination of each pair based additionally on a predefined traffic pattern utilizing the at least one path.

42. The device according to claim 34, wherein the microprocessor is further configured to provide at least one path by being further configured to
generate at least one path connecting the source and the destination of each pair based additionally on a traffic load utilizing the at least one path.

43. The device according to claim 34, wherein the microprocessor is further configured to provide at least one path by being further configured to
select, based on the channel list, the at least one path from a pre-computed set of paths.

44. The device according to claim 35, wherein the microprocessor is configured to associate the selected destination with the first position or associate the next channel with the current position by being further configured to store an identifier of the channel at the current position in the channel list.

* * * * *